US007936476B2

(12) United States Patent
Kofman et al.

(10) Patent No.: US 7,936,476 B2
(45) Date of Patent: May 3, 2011

(54) FONT PITCH ADJUSTMENT DURING PRINT PROCESS

(75) Inventors: Gene I. Kofman, Parkland, FL (US); Josh L. Fabel, Boca Raton, FL (US); Warren M. Fabel, Boca Raton, FL (US)

(73) Assignee: Laser Substrates, Inc., Boca Raton, FL (US)

( * ) Notice: Subject to any disclaimer, the term of this patent is extended or adjusted under 35 U.S.C. 154(b) by 1195 days.

(21) Appl. No.: 10/392,240

(22) Filed: Mar. 19, 2003

(65) Prior Publication Data

US 2003/0210415 A1 Nov. 13, 2003

Related U.S. Application Data

(63) Continuation-in-part of application No. 10/272,161, filed on Oct. 15, 2002, now Pat. No. 7,379,203, which is a continuation-in-part of application No. 10/172,154, filed on Jun. 14, 2002, now Pat. No. 7,196,808, which is a continuation-in-part of application No. 10/133,100, filed on Apr. 26, 2002, now Pat. No. 7,085,998.

(60) Provisional application No. 60/367,118, filed on Mar. 22, 2002.

(51) Int. Cl.
*G06K 15/02* (2006.01)

(52) U.S. Cl. ...... 358/1.18; 358/1.11; 358/1.8; 358/1.15; 345/467; 382/138; 382/174

(58) Field of Classification Search .................. 400/306, 400/65, 61; 382/9, 48, 174, 138, 187; 395/167, 395/169, 172; 235/384; 705/5; 358/1.18, 358/1.15, 1.11, 1.8; 345/174, 467
See application file for complete search history.

(56) References Cited

U.S. PATENT DOCUMENTS

| 4,326,813 | A | * | 4/1982 | Lomicka et al. | 358/1.8 |
| 4,635,290 | A | * | 1/1987 | Tsuji et al. | 382/174 |
| 4,946,299 | A | * | 8/1990 | Shimada | 400/306 |
| 5,077,804 | A | * | 12/1991 | Richard | 382/138 |
| 5,108,206 | A | * | 4/1992 | Yoshida | 400/61 |
| 5,825,999 | A | * | 10/1998 | Uzaki et al. | 345/467 |
| 5,970,225 | A | * | 10/1999 | Jackson et al. | 358/1.18 |
| 6,031,625 | A | * | 2/2000 | Sherman et al. | 358/1.18 |
| 6,282,524 | B1 | | 8/2001 | Kramer | |
| 6,337,743 | B1 | | 1/2002 | Brown et al. | |
| 6,490,051 | B1 | * | 12/2002 | Nguyen et al. | 358/1.15 |
| 6,496,600 | B1 | * | 12/2002 | Huang | 382/187 |
| 6,910,628 | B1 | * | 6/2005 | Sehr | 235/384 |

OTHER PUBLICATIONS

U.S. Appl. No. 10/133,100, filed Apr. 26, 2002, Kofman et al.

(Continued)

*Primary Examiner* — Edward L Coles
*Assistant Examiner* — Ashish K Thomas
(74) *Attorney, Agent, or Firm* — Jon A. Gibbons; Fleit Gibbons Gutman Bongini & Bianco PL

(57) ABSTRACT

A system, method and computer readable medium for adjusting font pitch during a print process is disclosed. The method on a computer system includes observing a print command issued by an application. The method further includes generating an output file in response to the print command and modifying the output file to conform to a template. The method further includes determining the type of each character in the output file and adjusting the font pitch of characters in the output file based on their type. The method further includes sending the output file to an output destination. In one alternative, the method includes determining whether each character in the output file is at least one of a numerical character and an alphabetic character and 1) adjusting the font pitch of numerical characters to be fixed font pitch, and 2) adjusting the font pitch of alphabetic characters to be variable font pitch.

19 Claims, 40 Drawing Sheets

OTHER PUBLICATIONS

U.S. Appl. No. 10/172,154, filed Jun. 14, 2002, Kofman et al.

MSN Money, "Standard Register and HarrisData Announce Strategic Marketing Alliance to Provide Secure Document Delivery", Dayton, Ohio—(Business Wire)—May 3, 2002, http://news.moneycentral.msn.com/ticker/article.asp?Feed=BW&Date=20020503&ID=1611076&Symbol=US:SR.

http://www.mindgate.com/mindgate.html.

http://www.mindgate.com/print2mail/DataDoorway.html.

* cited by examiner

402 401
Invoice 410

Atek
113 NW 78th Place
Parkland, FL 33067

| DATE | INVOICE # |
|---|---|
| 4/9/2001 | 84 |

BILL TO

404 406

| | P.O. NO. | TERMS | PROJECT |
|---|---|---|---|
| | | | CollMethod Posting |

| QUANTITY | DESCRIPTION | RATE | AMOUNT |
|---|---|---|---|
| 4 | Fixed GL JE corrupted records. Changed wrong company from ID, merged spleted documents. 04/03/2001. | 1.00 | 4.00 |
| 2 | Analysed double posting on Acct 1007 for bad check 121221,121242 in view of Chart of Accounts Period Detail Inquiry results. 04/03/2001. | 1.00 | 2.00 |

408

| | Total | $6.00 |
|---|---|---|

FIG. 4

Laser Substrates, Inc.
6251-C Park of Commerce Blvd
Boca Raton, FL  33487-8202

Acct. No.:

PLACE POSTAGE HERE

702 — Please return this portion with your payment in the envelope provided
SOLD TO:   DATE:   INV. #   AMOUNT   PAYMENTS   AMOUNT OWED
704   706

STATEMENT
Account Number

Statement Date

708

TOTALS:

Laser Substrates, Inc.
6251-C Park of Commerce Blvd
Boca Raton, FL 33487-8202
EIN# 59-2686933

Please retain this portion for your records
Toll Free: 800-538-4900

710   STATEMENT   712

Statement Date:
Account No.:

DATE   INVOICE NUMBER   AMOUNT   PAYMENTS   AMOUNT OWED

714

TOTALS:

Laser Substrate, Inc.
6251-C Park of Commerce Blvd
Boca Raton, FL 33487-8202
EIN#59-2686933

2704

Please retain this portion for
your records
Toll Free: 800-538-4900

| 2706 Date | 2708 Invoice # | 2710 Amount | 2712 Payments | 2714 Amount Owed |
|---|---|---|---|---|
| 10-07-01 | 98636598 | $252.36 | $200.00 | $150.00 |
| 10-24-01 | 98563659 | $598.36 | $230.00 | $198.00 |
| 10-25-01 | 98563658 | $252.36 | $250.00 | $122.00 |
| 10-26-01 | 98565653 | $895.65 | $200.00 | $140.00 |
| Totals | | $2322.00 | $2032.00 | $102.00 |

Laser Substrate, Inc.
6251-C Park of Commerce Blvd
Boca Raton, FL 33487-8202
EIN#59-2686933

3104

Please retain this portion for
your records
Toll Free: 800-538-4900

| Date | Invoice # | Amount |
|---|---|---|
| 10-07-01 | 98636598 | $150.00 |
| 10-24-01 | 98563659 | $198.00 |
| 10-25-01 | 98563658 | $122.00 |
| 10-26-01 | 98565653 | $140.00 |
| Total | | $2140.00 |

Laser Substrate, Inc.
6251-C Park of Commerce Blvd
Boca Raton, FL 33487-8202
EIN#59-2686933

3404

Please retain this portion for
your records
Toll Free: 800-538-4900

| 3406 Date | 3408 Invoice # | 3410 Amount |
|---|---|---|
| 10-07-01 | 98636598 | $150.00 |
| 10-24-01 | 98563659 | $198.00 |
| 10-25-01 | 98563658 | $122.00 |
| 10-26-01 | 98565653 | $140.00 |
| Total | | $2140.00 |

3412

Do know about our new payment plan? Call customer service today.

FONT PITCH ADJUSTMENT DURING PRINT PROCESS

CROSS-REFERENCED APPLICATIONS

This non-provisional application is a continuation in part of the non-provisional patent application Ser. No. 10/272,161 with inventors Kofman et al., entitled "DATA CAPTURE DURING PRINT PROCESS" filed Oct. 15, 2002, now U.S. Pat. No. 7,379,203, which is hereby incorporated by reference in its entirety. The aforementioned non-provisional application is a continuation in part of the non-provisional patent application Ser. No. 10/172,154 with inventors Kofman et al., entitled "PRINTING IN A SECURE ENVIRONMENT" filed Jun. 14, 2002, now U.S. Pat. No. 7,196,808, which is hereby incorporated by reference in its entirety. The aforementioned non-provisional application is a continuation in part of the non-provisional patent application Ser. No. 10/133,100 with inventors Kofman et al., entitled "MAPPING A PRINT STREAM FOR PRINTING ON MAILERS FROM A FIRST APPLICATION FOR INPUT TO A SECOND APPLICATION" filed Apr. 26, 2002, now U.S. Pat. No. 7,085,998, which is hereby incorporated by reference in its entirety. The aforementioned non-provisional application is based on the provisional patent application serial No. 60/367,118 with inventors Kofman et al., entitled "MAPPING A PRINTER STREAM FOR PRINTING ON POSTAL FORMS" filed Mar. 22, 2002, which is hereby incorporated by reference in its entirety.

The subject matter of the present application is related to the following commonly owned U.S. Patents: U.S. Pat. No. 5,865,717, filed Jun. 7, 1995, issued Feb. 2, 1999 to Fabel for a Mailing Form for Non-Impact Printing, U.S. Pat. No. 6,095,919, filed Oct. 27, 1998, issued Aug. 1, 2000 to Fabel for an Extendible Form for Non-impact Printer and U.S. Pat. No. 6,173,888, filed Feb. 2, 1999, issued Jan. 16, 2001 to Fabel for a Mailing Form for Non-impact Printing. The subject matter of the present application is related to the following commonly owned U.S. Application: U.S. application Ser. No. 09/557,492, filed Apr. 24, 2000, to Fabel for a Mailing Form for Non-impact Printing. The U.S. Application and each of the U.S. Patents described above are hereby incorporated by reference in their entirety.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

This invention generally relates to the field of automating business forms and mailers and more specifically to automating business forms and mailers by mapping print stream data from a first application and for printing onto a business form or mailer.

2. Description of Related Art

As technology progresses, the business office is becoming more and more automated. Faxes, file servers, email, teleconferencing and cell phones have revolutionized the way firms do business. Mailers, in particular, have enjoyed increasing popularity. A mailer is a consumable paper product that allows for quick and easy printing and mailing of information. A mailer can include an envelope, an insert and a return envelope, which may be created by folding the original document. For example, mailers are used to send account statements, invoices, checks, and tax forms to customers and employees of a business. The commonly owned U.S. Patents and U.S. Patent Application described above provide more information on mailers. A mailer allows a firm or small business to print directly onto one product all of the information necessary for mailing to a customer, client or employee. This is advantageous as it eliminates the separate printing of an envelope, an insert and a return envelope, as well as the need for the insertion of the return envelope and the insert into the envelope. Mailers, however, do not come without their drawbacks.

One problem with the use of a mailer is producing the mailer. Mailers often require folding and sealing before sending out. Current folding/sealing machines are bulky and costly. Thus, businesses are forced to buy additional hardware, apart from software and printers, in order to produce a mailer. This is cost prohibitive for medium and small businesses. Therefore, a need exists to provide a cost effective method of producing mailers for medium and small businesses.

One problem with the production of business forms, such as mailers, is the compatibility of business forms with the applications providing the information. Currently, various applications providing information, such as QuickBooks, support only certain business forms that are provided by the same entity that provides the application. This is disadvantageous as it limits the range of business forms available to the users that are utilizing the application of the providing entity. It would be advantageous to allow additional firms to provide business forms on which to print the information that is provided by these entities. Therefore, a need exists for a method for printing information from various applications onto various business forms provided by separate entities.

Yet another problem with the production of business forms is that current business form printing software often does not allow for the extraction of information from multiple source documents or the placement of extracted information into multiple business forms. Typically, information is garnered from a source document and printed onto a business form or mailer. However, users of business form printing software sometimes desire to garner information from more than one source document. In addition, users sometimes desire to print garnered information into alternate business form(s). Therefore, a need exists for a system that supports the garnering of information from multiple source documents and the placement of garnered information into multiple business forms.

Yet another problem with the production of business forms is that current business form printing software does not allow for the printing of customized information onto the business form. Users of business form printing software often desire to print customized information, such as logos or signatures, onto business forms. It would be advantageous to allow the printing of such information as it would increase the customizability of the business form printing software and further automate the printing of information onto business form. Therefore, a need exists for a system that allows for the printing of customized information onto a business forms.

Yet another problem with the production of business forms is that current business form printing software requires duplex or multiple pass printers. This is disadvantageous and the current installed base of printers substantially comprises simplex or single pass printers. It would be advantageous for business form printing software to support the current installed base of single printers as it is cost effective for those users to continue using their current printers, as opposed to purchasing new printers. Therefore, a need exists for a business form printing system that supports simplex or single pass printers.

Yet another problem with the production of business forms is that current business form printing software often does not allow for importing or exporting from or to other software packages or operating systems. Users of business form printing software sometimes desire to garner information from more than one document over more than one application or over more than one operating system. In addition, users of business form printing software sometimes desire to print information onto more than one business form over more than one application or over more than one operating system. Therefore, a need exists for a system that imports multiple source documents over multiple applications and operating systems and that exports information into multiple business forms over multiple applications and operating systems.

Yet another problem with the production of business forms is that current business form printing software that uses OCR does not distinguish between text requiring a fixed pitch font and font using a variable pitch font. Certain types of data, such as numbers written in columns spanning multiple rows or currency values written over several rows, require the use of fixed pitch font in order to properly align values on the printed page. However, when information is input into a computer system using OCR, the printing software often does not distinguish between the different types of data and a variable pitch font is used for all printed information. This leads to a misalignment of numerical data written over multiple rows, which makes it difficult to read. Therefore, a need exists for a system that distinguished between information that requires fixed pitch font and information requiring variable pitch font.

Yet another problem with the production of business forms is that current business form printing software that uses OCR does not handle floating lines adequately. A floating line is a final row in a column or a series of columns that contains additional information, such as a "Total" row. These rows are called floating lines because the location of these rows, or lines, is dependant on the amount of information in the column. That is, the row position of a floating line depends on the length of the column of which it is a member.

However, when information including floating lines is input into a computer system using OCR or another system for inputting information, it is difficult to specify beforehand in the printing software the location of a floating zone due to its variable nature. This leads to difficulty in reading floating line information in source documents that are input into a computer system. Therefore, a need exists for a system that correctly identifies floating line information in source documents.

Yet another problem with the production of business forms is that current business form printing software that uses OCR does not handle floating zones adequately. A floating zone is a group of text or images that is not located in a constant position in the source document. Zones such as these are called floating zones because the location of these zones is dependant on the location and/or size of other zones. That is, the physical position of a floating zone depends on the physical position and/or size of adjacent zones in the source document. For example, a first zone may be required to be located one inch below a second zone. The size of the second zone is variable such that its length may vary according to the amount of data in the second zone. In this example, therefore, the location of the first zone is dependant on the length of the second zone.

However, when information including floating zones is input into a computer system using OCR or another system for inputting information, it is difficult to specify beforehand in the printing software the location of a floating zone due to its variable nature. This leads to difficulty in reading floating zone information in source documents that are input into a computer system. Therefore, a need exists for a system that correctly identifies floating zones in source documents.

Yet another problem with the production of business forms is print alignment. Often, the alignment of information on a printed page can vary with each printer, even if each printer is the same model. It has been determined that many factors affect the alignment of printed data on a printed page. Some of these factors include the specific printer on which the data is printed (regardless of printer model), the printer driver used for the printer, the printer drum used in the printer, the direction of the feed of the printer paper and the rotation of the printer paper fed into the printer. The foregoing aberrations in printed data alignment leads to difficulty in printing documents that require precise alignment of information, such as postal documents. Therefore, a need exists for a system that correctly aligns print data in an output document.

Yet another problem with the production of business forms is collation of postal documents having varying postages. Typically, when large amounts of postal documents having varying postage requirements are printed in one print job, the printed documents are placed in the exit tray of the printer all in one heap. There is normally no automatic collation that occurs among the printed documents that have varying postage requirements such as domestic and international or registered and unregistered. This results in an individual having to manually sort out the documents in order to separate them so that the proper postage can be applied. This can be tedious and time consuming. Therefore, a need exists for a system that correctly collates printed postal documents having different postal documents.

Yet another problem with the production of business forms is that business form printing software often does not allow for the application of PC postage. Typically, PC postage is printed onto a predefined location on a business form or mailer. In addition, the PC postage aspect of a business form or mailer is protected by security measures limiting a user's access to the PC postage information. This is disadvantageous as it limits the customizability of the formatting of information on the business form or mailer. Therefore, a need exists for a system that allows for the relocation and rearrangement of PC postage while complying with security measures protecting PC postage.

Another problem with multi-user computer systems, such as a fully staffed business office, is variable security. Multi-user computer systems often include individual user account permissions such that different users can have different permissions to execute certain actions. For example, an administrator can have full permissions to read and write to any file and access any device. A guest user, however, will only have permissions to read and write certain files and to access only certain devices. This can pose an obstacle in certain situations. For example, an executable that is initiated by a dynamically linked library (DLL) or by another executable may inherit permissions of a user account different from the user account pertaining to the initiating entity. If the permissions of the inherited user account hold permissions different than the current user account, the current user can experience a problem when he attempts to read or write certain files where the permissions differ. This is disadvantageous as it confuses the user and consumes his time in rectifying the problem. Therefore, a need exists for a system that allows for the easy inheritance of permissions of the current user by child applications Yet another problem with multi-user computer systems is enforcement of variable security. Multi-user computer systems that include individual user account permissions must enforce individual permissions on each user. Typically, this is accomplished by matching the user account permissions with the permissions defined on an individual file. When a file is created with incorrect permissions, the intended permissions can no longer be enforced. This is disadvantageous as it inhibits the enforcement of security. Therefore, a need exists to enforce security on individual files without using defined file permissions.

Therefore, a need exists to overcome the problems with the prior art as discussed above.

SUMMARY OF THE INVENTION

Briefly, in accordance with the present invention, disclosed is a system, method and computer readable medium for mapping print stream data for printing on business forms or mailers. In an embodiment of the present invention, the method on a computer system includes the definition of a source template and a target, or destination, template. A source template defines the zones of a source document and the content in each zone. A source document is a document comprising a statement of account, an account report or an invoice. A target template defines the zones of a target document and the content that is placed in each zone. A target document is the document that is printed onto a business form or mailer. The mapping operation begins with the reception of print stream data. Using the source template, the print stream data is parsed and content is extracted. Then, the extracted content is placed in predefined zones in the target template to produce a target document. The target document is then printed onto a business form or mailer.

The described embodiments of the present invention are advantageous as they allow for the automation of printing of business forms or mailers. Target documents are printed using the print stream data of a source document. This allows for the quick and easy printing of a business form or mailer. Another advantage of the present invention is that the method of the present invention is transparent to the user. Because the user simply prints a source document to produce a printed business form or mailer, little or no interaction is needed with the proposed system. This results in increased usability. Yet another advantage of the present invention is the mapping of information between incompatible applications. This is beneficial as it facilitates the use of information across different applications and formats.

Also, in accordance with the present invention, disclosed is a system, method and computer readable medium for adjusting font pitch during a print process. In an embodiment of the present invention, the method on a computer system includes observing a print command issued by an application. The method further includes generating an output file in response to the print command and modifying the output file to conform to a template. The method further includes determining the type of each character in the output file and adjusting the font pitch of characters in the output file based on their type. The method further includes sending the output file to an output destination.

In one embodiment of the present invention, the method includes determining whether each character in the output file is either a numerical character or an alphabetic character and 1) adjusting the font pitch of numerical characters to be fixed font pitch, and 2) adjusting the font pitch of alphabetic characters to be variable font pitch. In another embodiment of the present invention, the method includes determining whether each character in the output file is either of a first type used to denote currency or a number of items or of a second type used to denote all else and 1) adjusting the font pitch of characters of the first type to be fixed font pitch, and 2) adjusting the font pitch of characters of the second type to be variable font pitch.

The described embodiments of the present invention are advantageous as they allow for the printing of various types of characters while maintaining proper alignment. The present invention distinguishes between characters of different type, such as alphabetic or numerical, and adjusts the font pitch accordingly in order to maintain proper alignment. This is beneficial as data that is printed onto mailers or other forms often include both standard text not requiring alignment and numerical or currency information that requires alignment. Thus, the present invention allows for proper printing of information including various types of data having different alignment requirements.

Also, in accordance with the present invention, disclosed is a system, method and computer readable medium for mapping print data in column format to an output destination. In an embodiment of the present invention, the method on a computer system includes observing a print command issued by an application. The method further includes generating an output file in response to the print command and modifying the output file to conform to a template. The method further includes identifying a floating line in a column of the output file, the floating line including data, and adjusting the location of the data of the floating line so as to be located underneath the first column of the output file. The method further includes sending the output file to an output destination.

The described embodiments of the present invention are advantageous as they allow for the printing of floating line information in an output document. The present invention identifies floating line information and allows for the placement of such information in specific locations in the output document. This is beneficial as floating lines are common in, for example, financial and accounting documents that include multiple rows of variable length. Thus, the present invention allows for the printing of floating line information in pre-specified locations in an output document.

Also, in accordance with the present invention, disclosed is a system, method and computer readable medium for mapping print data arranged in zones to an output destination. In an embodiment of the present invention, the method on a computer system includes observing a print command issued by an application. The method further includes generating an output file in response to the print command and modifying the output file to conform to a template. The method further includes identifying a floating zone in the output file, the floating zone including data, and adjusting the location of the data of the floating zone so as to be located in the output file according to a target template that defines content in the output file. The method further includes sending the output file to an output destination.

The described embodiments of the present invention are advantageous as they allow for the printing of floating zone information in an output document. The present invention identifies floating zone information and allows for the placement of such information in variable locations in the output document, depending on the location of other zones in the output document. This is beneficial as floating zones are common in, for example, financial and accounting documents that include multiple zones of variable length. Thus, the present invention allows for the printing of floating zone information in pre-specified locations in an output document.

Also, in accordance with the present invention, disclosed is a system, method and computer readable medium for mapping print data to an output destination. In an embodiment of the present invention, the method on a computer system includes observing a print command issued by an application. The method further includes generating an output file in response to the print command and modifying the output file to conform to a template organizing data in the output file into zones. The method further includes individually adjusting the location of zones in the output file. The method further includes sending the output file to an output destination.

The described embodiments of the present invention are advantageous as they allow for the individual adjustment of the location or position of a zone in an output document. The present invention allows for one zone to be moved while allowing the other zones to remain in their current position. This is beneficial as certain documents, such as postal documents, have very precise requirements for the location of zones in the output document.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 4 is a representation of a source document, of FIG. 3 of the present invention.

FIG. 7 is a representation of a target document of FIG. 6, in one embodiment of the present invention.

FIG. 27 is a representation of a source document in one embodiment of the present invention.

FIG. 31 is a representation of a source document in one embodiment of the present invention.

FIG. 34 is another representation of a source document in one embodiment of the present invention.

DETAILED DESCRIPTION OF THE PREFERRED EMBODIMENTS

I. Overview

Figure 1:
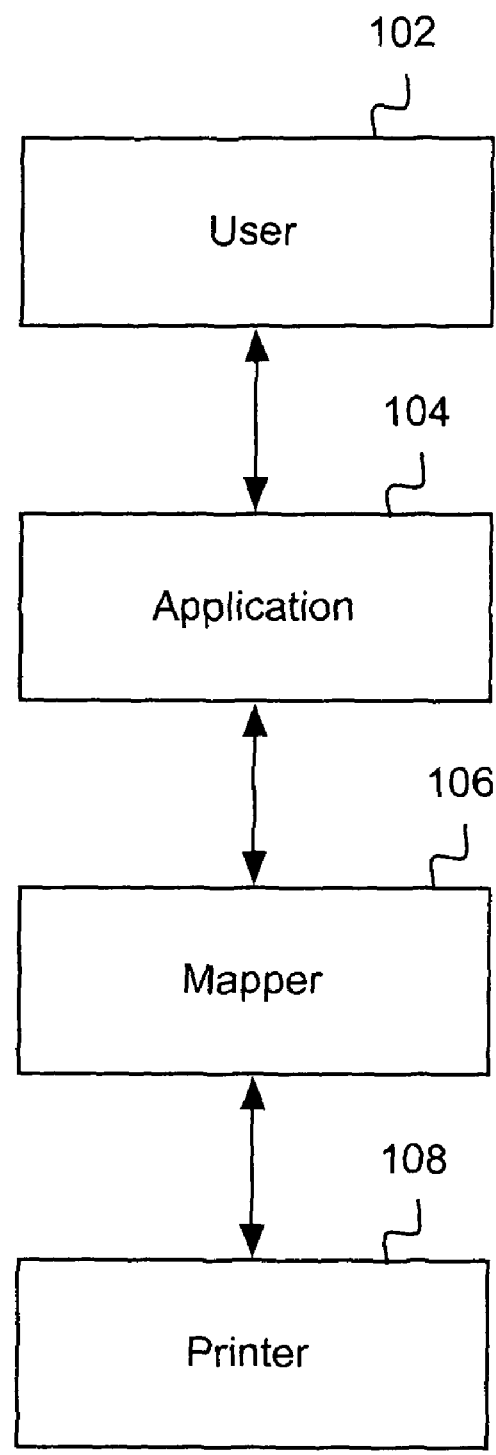
FIG. 1 is a block diagram illustrating the overall system architecture of one embodiment of the present invention.

FIG. 1 is a block diagram illustrating the overall system architecture of one embodiment of the present invention. A user 102 utilizes a client computer system to execute an application 104. A mapper 106 performs the mapping operation of the present invention, i.e., capturing the print stream and mapping to a business form or mailer, and prints to a printer 108. In an embodiment of the present invention, application 104 and mapper 106 execute on the same client computer system. In another embodiment of the present invention, application 104 and mapper 106 execute on separate computer systems that are connected via a network. An example network is described below.

The application 104 is a financial software application such as QuickBooks or Peachtree. In another embodiment of the present invention, application 104 is any application that routinely sends information to a printer 108, such as a word processor, a spreadsheet program, a presentation program or a graphic art design application.

The computer systems on which application 104 and mapper 106 execute comprise one or more Personal Computers (PCs) (e.g., IBM or compatible PC workstations running the Microsoft Windows 95/98/2000/ME/CE/NT/XP operating system, Macintosh computers running the Mac OS operating system, or equivalent), Personal Digital Assistants (PDAs), game consoles or any other computer processing devices. In another embodiment of the present invention, the computer systems on which application 104 and mapper 106 execute are one or more server systems (e.g., SUN Ultra workstations running the SunOS or AIX operating system or IBM RS/6000 workstations and servers running the AIX operating system). The printer 108 is a commercially available printer, such as a non-impact printer, a laser printer, an inkjet printer, a bubble jet printer, a dot matrix printer, a thermal printer, or the like.

In an alternate embodiment of the present invention, FIG. 1 includes a network for connecting application 104, mapper 106 and printer 108. The network is a circuit switched network, such as the Public Service Telephone Network (PSTN). In another embodiment of the present invention, the network is a packet switched network. The packet switched network is a wide area network (WAN), such as the global Internet, a private WAN, a local area network (LAN), a telecommunications network or any combination of the above-mentioned networks. The network is a wired network, a wireless network, a broadcast network or a point-to-point network.

II. The Print Processing Operation

Figure 2:
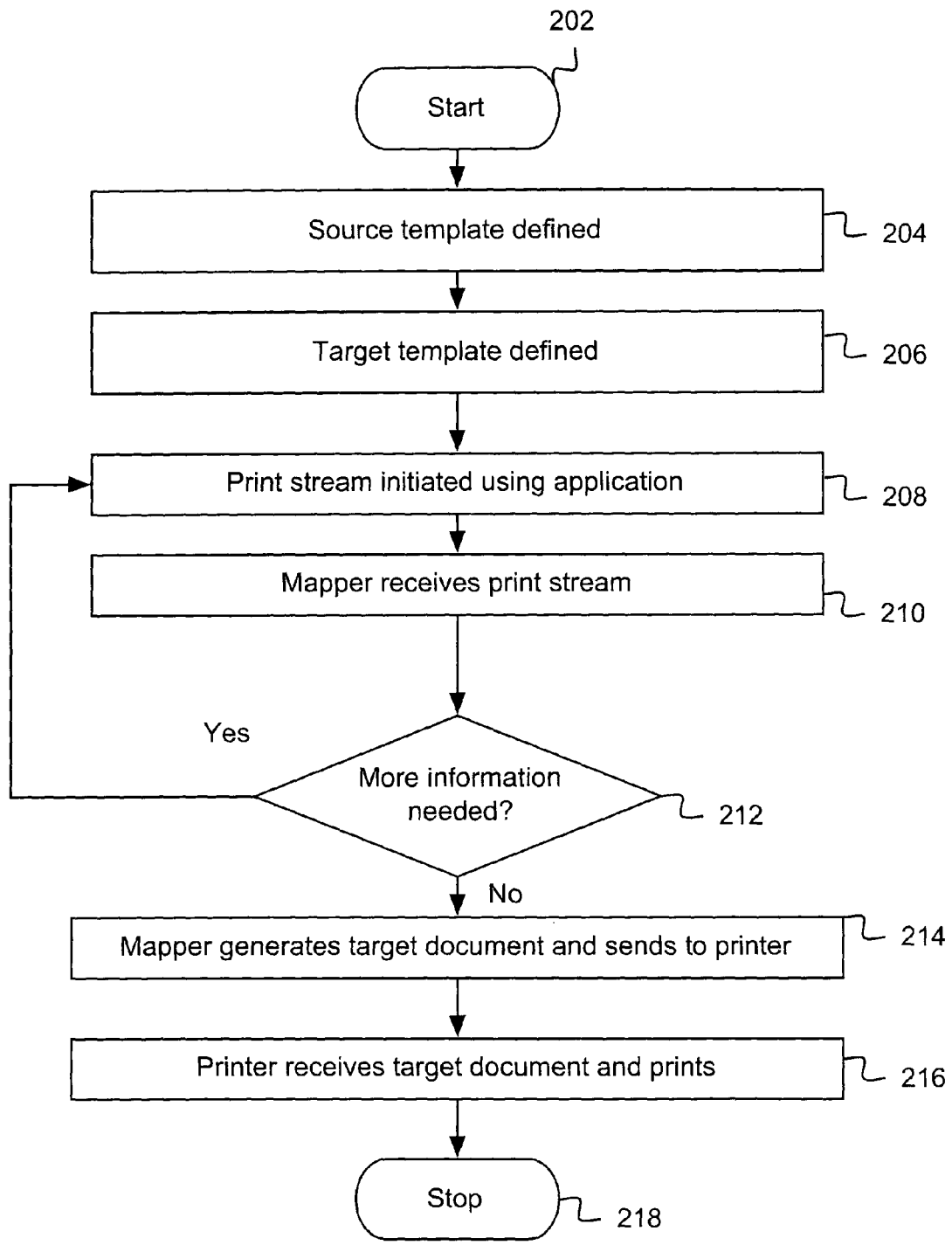
FIG. 2 is a flowchart depicting the operation and control flow of the overall process of FIG. 1 of the present invention.

FIG. 2 is a flowchart depicting the operation and control flow of the overall process of FIG. 1 of the present invention. The control flow of FIG. 2 begins with step 202 and flows directly to step 204. In step 204, a source template is defined. A source template is a file that defines the zones and content of a source document. Source templates and source documents are described in greater detail below (see FIG. 3 and FIG. 4). In one alternative, the user 102 defines the source template using an application, such as one described below in greater detail (see FIG. 5). In another alternative, the source template is defined by another entity, such as a service provider, separate from user 102. In this alternative, the service provider can be the same entity as the entity, which provided the system of the present invention.

In step 206, a target, or destination template, is defined. A target template is a file that defines the zones and content of a target document. Target templates are described in greater detail below (see FIG. 6 and FIG. 7). In one alternative, the user 102 defines the target template using an application, such as one described below in greater detail (see FIG. 8). In another alternative, the target template is defined by another entity, such as a service provider, separate from user 102. In this alternative, the service provider can be the same entity as the entity, which provided the system of the present invention.

In an optional step after step 206, the user 102 defines set-up information. In this step, the user 102 defines information that is used in the printing process, described in greater detail below. Set-up information can include static information that is printed onto the business form or mailer. Static information is defined as information that is printed on a business form or mailer and that does not change over a set of business forms or mailers. Dynamic information, on the other hand, is defined as information that is printed on a business form or mailer and that may change over a set of business forms or mailers. For example, if a user 102 prints a set of mailers including a check to a customer, the static information includes such information as the return address on the mailer, the bank information on the check and the postage on the mailer. The dynamic information includes such information as the address on the mailer, the recipient's name and the amount of the check. Other examples of set-up information that may be specified by a user 102 in this optional step includes one or more of the following:

Company logos

PC postage conforming to the Information Based Indicium Program (IBIP) standard

Bar codes used to identify other information in the mailer, such as an account number, a check number or an invoice number Signatures printed on a letter or on a check Bank information conforming to the Magnetic Ink Character Recognition (MICR) standard and using a standard font, such as E13B MICR font, including:

Bank routing number

Bank account number

Check number

Account name

Account address

In an embodiment of the present invention, security measures are taken during the input and modification of set-up information in this optional step. In this embodiment, a user is authenticated, such as via a login name and password, before he is able to input or modify set-up information. This allows sensitive information, such as one or more signatures printed on a check, to be protected from unauthorized access by a user.

In step 208, a print stream including a source document is initiated using application 104. Source documents are described in greater detail below. In one embodiment of the present invention, the user 102 issues a print command via application 104. In step 210, the mapper 106 receives the source document in the print stream data. It should be noted that in this document, the terms "file" and "document" are used interchangeably. Both terms are used to refer to a single sequence of bytes of finite length stored in a non-volatile storage medium.

In step 212, the mapper 106 determines whether the target document to be printed requires information that is not present in the source document. If the result of this determination is positive, control flows back to step 208. If the result of this determination of is negative, control flows to step 214. If the result of the determination of step 212 is positive, in one embodiment of the present invention, mapper 106 determines that mapper 106 must receive additional information in order to complete the target document to be printed. Subsequently, mapper 106 acquires the required information by searching for and reading a document or documents that hold the required information. Alternatively, mapper 106 communicates to application 104 the information it requires and application 104 provides the required information to mapper 106 in step 208. This may be, for example, printing one type of output from an application 104 such as an invoice followed by a second type of action such as printing a check. The mapper 106 assembles the information needed from the one or more output print jobs from the application 104.

In another embodiment of the present invention, if the result of the determination of step 212 is positive, mapper 106 communicates to the user 102 that mapper 106 must receive additional information in order to complete the target document to be printed. The user 102 subsequently provides the additional information to the mapper 106 by printing in step 208 an additional source document, which includes the information the mapper 106 requires to complete the target document to be printed. In this embodiment of the present invention, the mapper 106 provides to the user 102 a pop-up window indicating the additional information necessary to complete the target document to be printed.

In step 214, the mapper 106 generates the target document to be printed, and sends the target document to printer 108. This operation is described in greater detail below. In step 216, the printer 108 receives the target document from mapper 106 and proceeds to print the target document. In step 216, the target document is printed onto a business form or mailer. In step 218, the control flow of FIG. 2 ceases.

III. The Source Template

Figure 3:
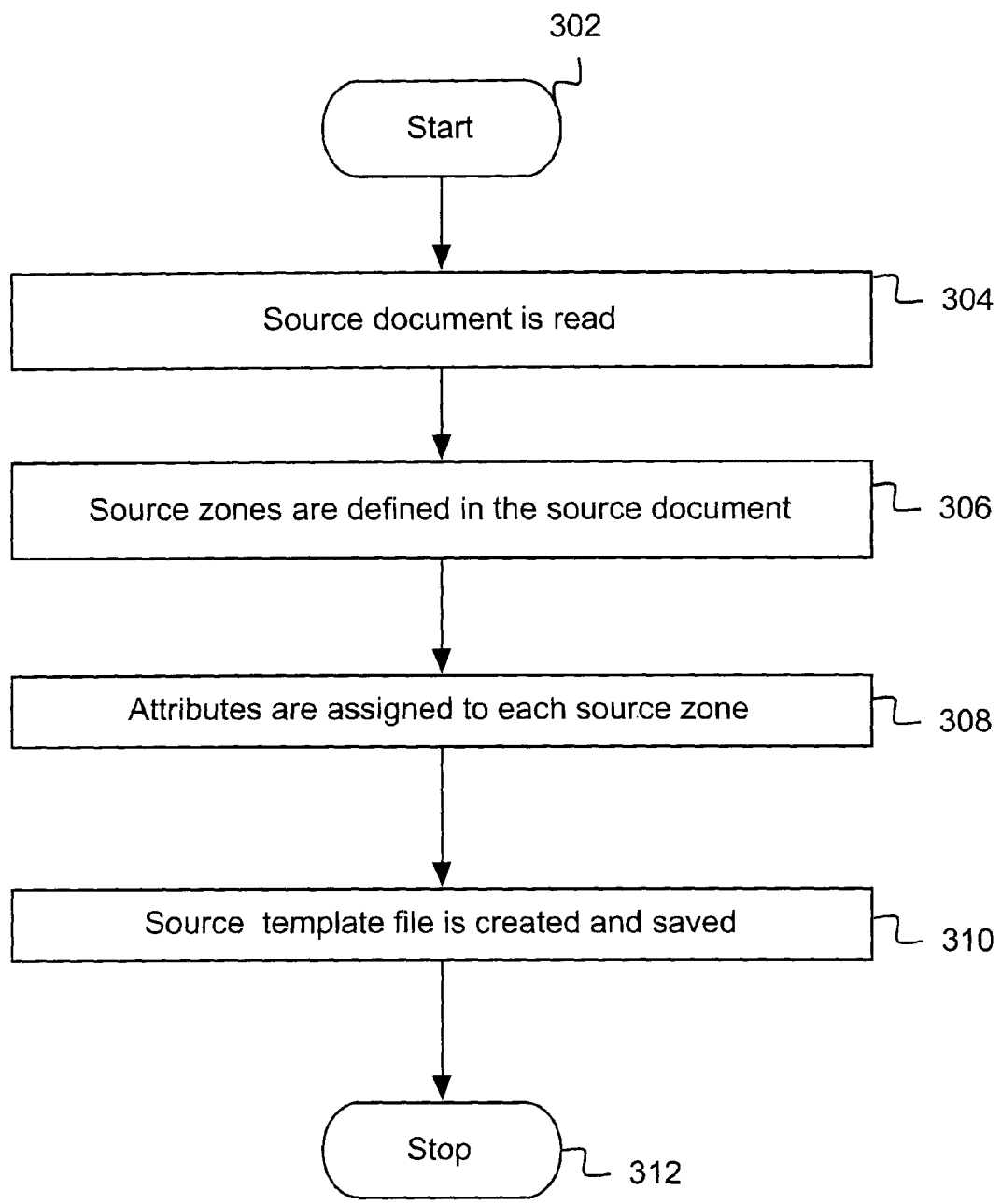
FIG. 3 is a flowchart depicting the operation and control flow of the source template generation process of FIG. 2 according to the present invention.

FIG. 3 is a flowchart depicting the operation and control flow of the source template generation process of FIG. 2, according to the present invention. FIG. 3 describes in more detail the step 204 of FIG. 2. The control flow of FIG. 3 begins with step 302 and flows directly to step 304. In step 304, a source document is read by an application program used for generating a source template. Such an application is described in greater detail below in FIG. 5. It should be noted that the present invention supports various types of source documents. Typically, the source document is a document including information that is directed to clients, customers or employees of a business. In addition, the source document is generated by an application 104. As explained above, application 104 is, for example, a financial software application such as QuickBooks or Peachtree or any other software application containing financial or account information. Thus, in this example, the source document is an invoice, a client account statement, a billing statement, an account report, a check or the like.

In step 306, source zones are defined in the source document. A source zone is an area of a source document that provides content information that may be placed in a target document. The content information in a source zone is considered dynamic content information. Several types of source zones are defined, wherein each type of source zone contains a certain type of content information. The following are examples of source zone types:

Key Zone: Contains keywords associated with the source document
    Text Zone: Contains text
    Picture Zone: Contains an image
    Table Zone: Contains a table or other tabular data
    Address Zone: Contains a mailing address In step 308, attributes are assigned to each source zone. Examples of attributes that may be assigned to a source zone are the name of a source zone, the location of a source zone (expressed in pixel coordinates) and the format of the content information in the source zone.

In step 310, a source template file is generated and saved. The source template file contains, at a minimum, a list containing each source zone and the pixel coordinates defining the location of each source zone in the source document. The source template file is a text file, an HTML file, an SGML file, an XML file, or any other file format conducive to holding a hierarchical structured data set. An example of a source template file written in text format, is shown below:

[Zones]
    key1=key,5.991,0.719,1.011,0.146!
    address=text,0.865,0.146,2.563,1.323!
    bill to=text,0.542,1.833,3.365,1.198!
    date=text,6.002,0.938,0.844,0.198!
    invoice=text,7.116,0.917,0.761,0.208!
    terms=text,5. 117,3.683,1.2,0.317!
    project=text,6.418,3.646,1.532,0.365!
    total=text,6.95,9.51,1.011,0.354!
    note=text,0.05,9.482,5.408,0.425!
    description=text,1.032,4.396,4.428,0.604!
    quantity=text,0.479,4.406,0.479,0.604!
    rate=text,6.418,4.396,0.26,0.604!
    amount=text,7.429,4.406,0.448,0.625!
    pono=text,3.959,3.656,1,0.354!
    key_invoice=key,6.845,0.177,1.115,0.292!
    key_quantity=key,0.042,4.125,0.875,0.198!

In step 312, the control flow of FIG. 3 ceases.

FIG. 4 is a representation of a source document, of FIG. 3 of the present invention. As described above, a source document is any document that is printed from application 104. In this example, a source document is a document that contains financial or account information that the user 102 desires to access. In FIG. 4, the source document is an invoice that is printed from a financial management software application, such as QuickBooks. The source document of FIG. 4 shows a title for the document at 401—an invoice. FIG. 4 further shows a client address 402 and an invoice number 410. The invoice of FIG. 4 also shows a transaction description column 404, which provides information on a transaction for which the customer is being charged, and an amount column 406, which defines the amount the customer is being charged for each transaction. Lastly, the invoice of FIG. 4 shows a total price 408, which defines the total amount the customer is being charged.

Figure 5:
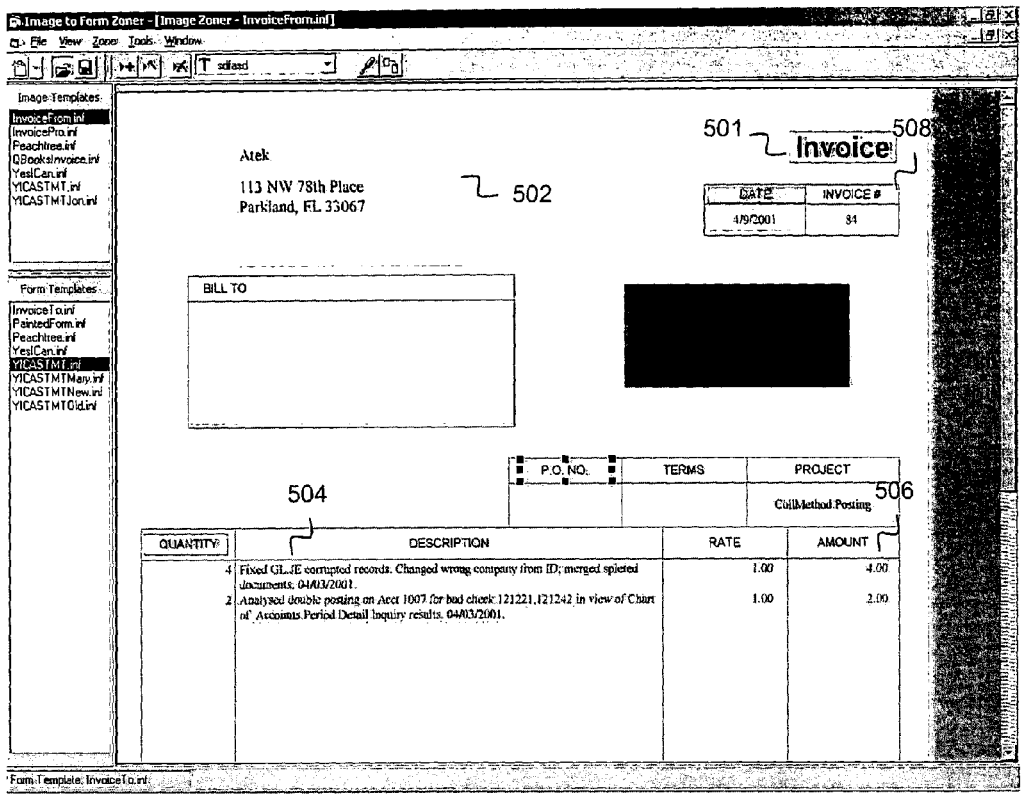
FIG. 5 is a screenshot of one embodiment of a GUI of an application of FIG. 3 used for generating a source template, according to the present invention.

FIG. 5 is a screenshot of one embodiment of a Graphical User Interface (GUI) of an application of FIG. 3 used for generating a source template. The GUI of FIG. 5 is used for performing the steps 306 and 308 of FIG. 3. The GUI shows that the invoice of FIG. 4, the source document, is graphically displayed in the window of FIG. 5. A user or programmer utilizing the GUI of FIG. 5 proceeds to select areas of the invoice using a highlighted box and then specify the type of source zone that is associated with that area. Based on the type of source zone selected for each area, the mapper 106 processes the data in each source zone in a particular way. This is described in greater detail below.

FIG. 5 shows that the user or programmer has created a highlighted box 501 over title 401. Box 501 is defined by the user or programmer as a Key Zone 502 because the title 401 contains a keyword associated with the source document. In addition, a highlighted box 502 is created over client address 402. Box 502 is defined as an Address Zone because it clearly contains an address. A highlighted box 504 has been created over transaction description column 404. Box 504 is defined as a Table Zone because box 504 contains a table of information regarding transactions. A highlighted box 506 is created over amount column 406. Box 506 is defined as a Table Zone because box 506 contains a table of information regarding the amount charged for each particular item. Lastly, a highlighted box 508 has been created over invoice number 410. Box 508 is defined as a Text Zone because box 508 contains text pertaining to the invoice number of the source document.

As explained above for step 310 of FIG. 3, once the source document is fully defined using the highlighted boxes, a source template file is generated. An example of a source template file, in text format, is shown above.

IV. The Target Template

Figure 6:
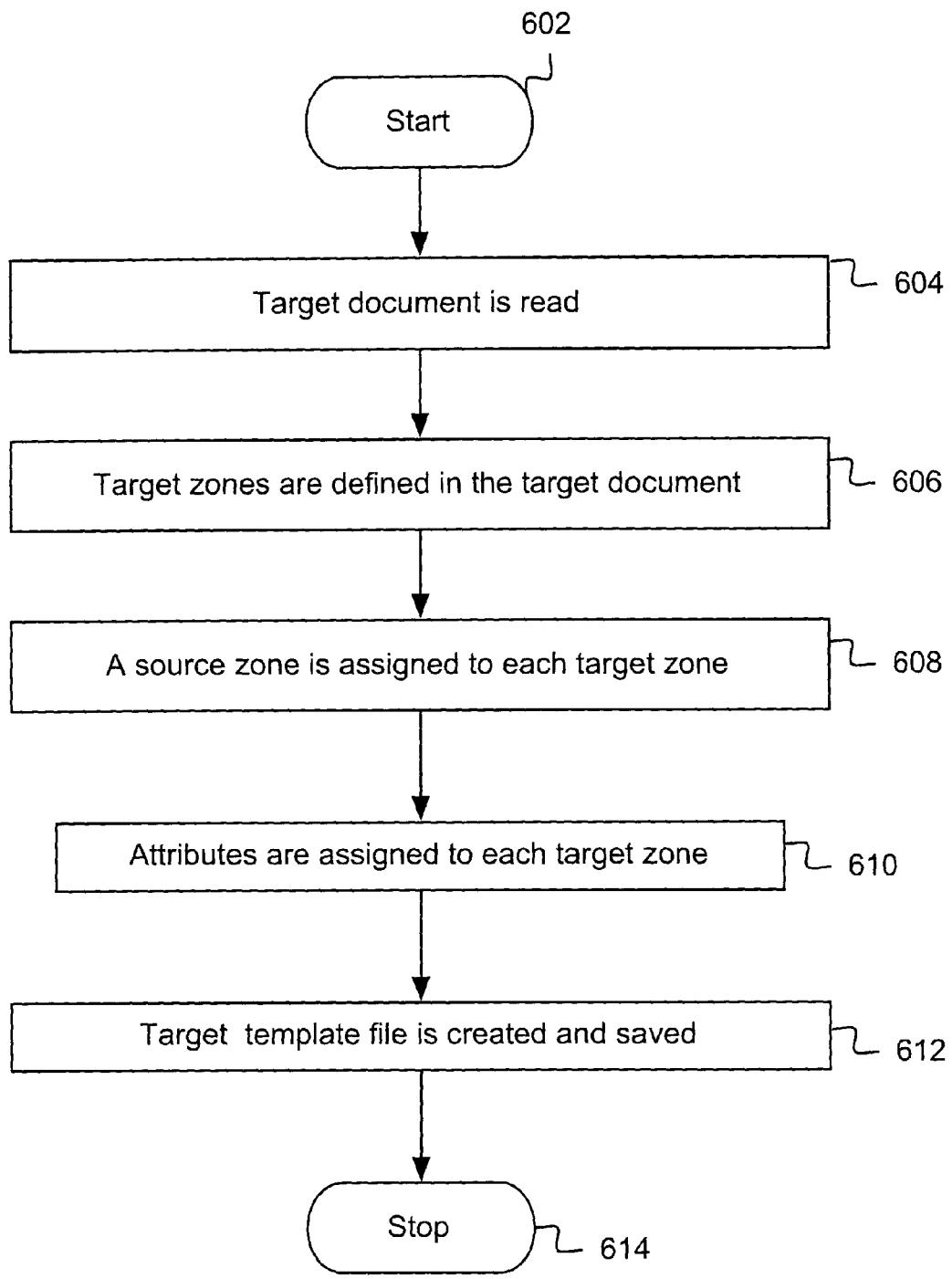
FIG. 6 is a flowchart depicting the operation and control flow of the target template generation process of one embodiment of the present invention.

FIG. 6 is a flowchart depicting the operation and control flow of the target template generation process of one embodiment of the present invention. FIG. 6 describes in more detail the step 206 of FIG. 2. The control flow of FIG. 6 begins with step 602 and flows directly to step 604. In step 604, a target document is read by an application program used for generating a target template. Such an application is described in greater detail below in FIG. 8. It should be noted that the present invention supports various types of target documents. Typically, the target document is a document containing the information from a source document and which is printed onto a business form or mailer. As explained above, the source document is an invoice, a client account statement, a billing statement, a report or the like. Thus, the target document must contain any such information. In an embodiment, the source document is an invoice, a client account statement, a billing statement, an account report, a check, a tax form (such as a 1099 Div or a 1099 R), a Customs Declaration postal form or the like. An example target document is shown below in FIG. 7.

In step 606, target zones are defined in the target document. A target zone is an area of a target document in which content information from the source document is placed. Several types of target zones are defined, wherein each type of target zone contains a certain type of content information. The following are examples of target zone types:

Key Zone: Contains keywords associated with the source document
Text Zone: Contains text
Picture Zone: Contains an image
Table Zone: Contains a table or other tabular data
Address Zone: Contains a mailing address
Locked Zone: A zone on the target document that is locked and may not be overwritten with any data
Postage Zone: Contains PC postage In step 608, a source zone is assigned to each target zone. In this step, the source content for each target zone is defined. As explained above, a target zone defines an area in which content from a source document is placed. Thus, in this step, the content from a source document, defined as a source zone, is linked to each target zone. This is explained in greater detail below.

In step 610, attributes are assigned to each target zone. The following attributes are supported for each target zone:
Parameters: Pixel coordinates defining the location of the target zone
Alignment: The horizontal or vertical alignment of the content in the target zone
Font: The font of any text that will be entered into the target zone
Expand/Crop Image: If the target zone is an Image Zone, this describes how to expand or crop the image
Image rotation: If the zone is an Image Zone, this describes how to rotate the image In step 612, a target template file is generated and saved. The target template file contains, at a minimum, a list containing each target zone, the pixel coordinates defining the location of each target zone in the target document and the source zone corresponding to each target zone. The target template file is a text file, an HTML file, an SGML file, an XML file, or any other file format conducive to holding a hierarchical structured data set. An example of a target template file written in text format, is shown below:

[Lock]
[Zones]
address=4.506,1.972,3.494,1.826,Crop,180,Right,Bottom,,,0,Times New Roman!10!
date=0.73,5.54,1.46,0.209,Crop,0,Center,Top,,,,Times New Roman!10!;5.737,6.78,0.855,0.156,Crop,0,Left,Top,,,0,Times New Roman!8!
invoice=0.73,5.874,1.471,0.198,Crop,0,Center,Top,,, Times New Roman!10!;5.747,6.927,0.855,0.146,Crop, 0,Left,Top,,, Times New Roman!8!
description=0.428,4.382,3.588,0.855,Crop,0,Left,Top,,, 0,Times New Roman!7!;3.035,7.355,2.91,1.002,Crop, 0,Left,Top,,,,Times New Roman!8!
amount=4.057,4.382,0.741,0.876,Crop,0,Right,Top,,,0, Courier New!7!;7.28,7.355,0.793,1.002,Crop,0,Right, Top,,,0,Courier New!8!
quantity=1.773,7.355,0.615,1.002,Crop,0,Center,Top,,,0, Courier New!8!;2.42,7.355,0.584,1.002,Crop,0,Center, Top,,,0,Courier New!8!
bill to=1.439,0.115,3.87,1.596,Crop,180,Right,Bottom,,, 0,Times New Roman!10!;2.545,5.613,2.274,0.824, Crop,0,Left,Top,,,,Times New Roman!9!;0.407,8.67, 4.819,2.045,Crop,0,Left,Top,,,0,Times New Roman!10!
total=4.057,5.268,0.741,0.136,Crop,0,Right,Top,,,0,Courier New!7!B;7.468,9.097,0.605,0.167,Crop,0,Right, Top,,,0,Times New Roman!7!
pono=7.468,6.906,1.001,0.219,Crop,0,Left,Top,,,,Times New Roman!8!
rate=5.956,7.355,0.772,1.002,Crop,0,Right,Top,,,0,Courier New!8!

In step 614, the control flow of FIG. 6 ceases.

FIG. 7 is a representation of a target document of FIG. 6, in one embodiment of the present invention. As described above, a target document is a business form or mailer such as those described by the section entitled Cross Referenced Applications and each incorporated herein in their entirety. The mailer of FIG. 7 is a client account statement form that used to provide a client, or customer with information regarding activity on the client's account. An invoice, such as the invoice of FIG. 4, can generate activity that is described in the client account statement of FIG. 7.

Note that the mailer of FIG. 7 already includes information including a return address and other text that indicates the type of information in the various tables. In an embodiment of the present invention, the information present in the mailer of FIG. 7 is static information that is specified by the user 102 in an optional step after step 206 of FIG. 2. This is described in greater detail above. In one alternative, the static information is pre-printed onto the mailer before the process of FIG. 2 is executed. This is advantageous in instances where the user 102 does not have the ability to print certain articles, such as magnetic ink or color logos. In another alternative, the static information is printed onto the mailer at the time that the dynamic information is printed onto the mailer in step 216 of FIG. 2.

In any case, the empty areas of the mailer of FIG. 7 will be populated with dynamic information—that is, the content extracted by the source document—in step 214 of FIG. 2. This process is described in greater detail below.

The target document of FIG. 7 shows a customer identification area 702 for identifying the party receiving the mailer. FIG. 7 also shows an invoice number column 704 for indicating the invoice number for each item purchased and an item amount column 706 for indicating the cost of each item purchased. Column 704 corresponds to column 710 and column 706 corresponds to column 712 as the client account statement duplicates this information in the target document. The total amount 708 indicates the combined cost of all items purchased. Cell 708 corresponds to cell 714.

Figure 8:
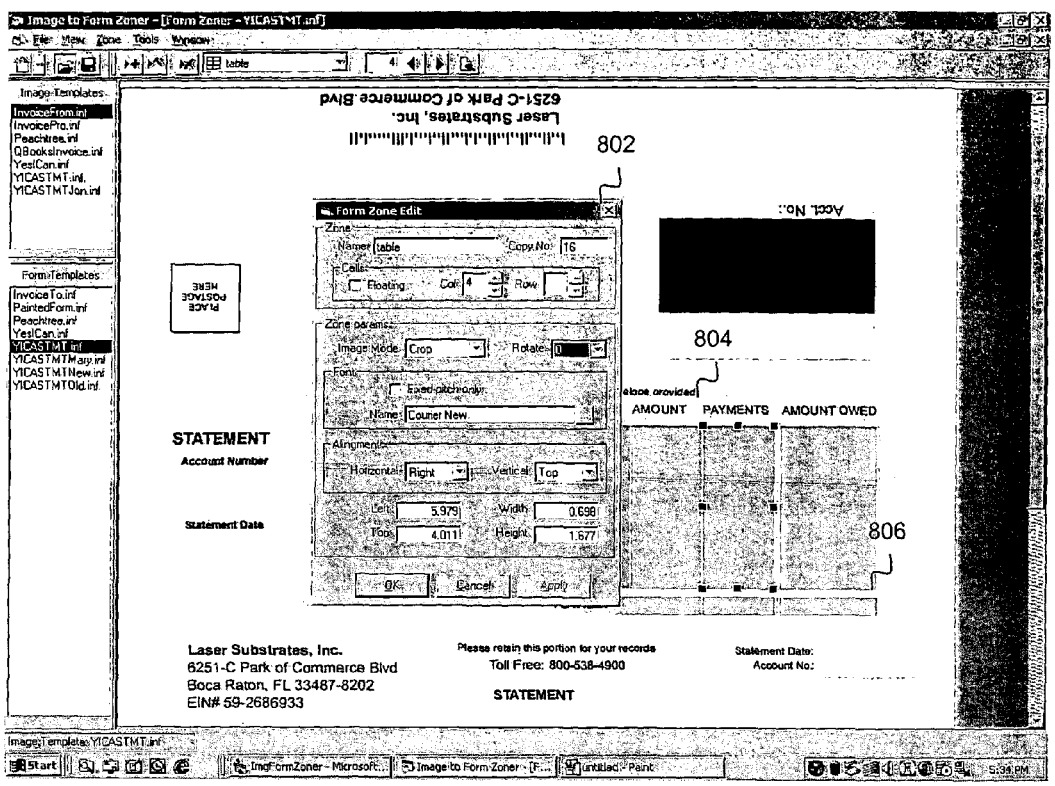
FIG. 8 is a screenshot of one embodiment of a GUI of an application used for generating a target template of FIG. 6, according to the present invention.

FIG. 8 is a screenshot of one embodiment of a GUI of an application used for generating a target template of FIG. 6, according to the present invention. The GUI of FIG. 8 is used for performing the steps 606-610 of FIG. 6. The GUI of FIG. 8 shows that the target document of FIG. 7 is graphically displayed in the window of FIG. 8. A user or programmer utilizing the GUI of FIG. 8 selects an area in the target document using a highlighted box and then specifies the type of target zone that is associated with that area. A list of target zones is given above. Further, the user or programmer also defines for each target zone the content that is entered into that area. That is, each target zone is assigned a source zone from which content is used to populate the target zone. The user accomplishes this by selecting for each target zone a source zone from a master list of source zones. The master list is created during the process of source template generation, such as described in FIG. 3. Based on the source zone selected for each target zone, the mapper 106 populates each target zone accordingly. This is described in greater detail below.

FIG. 8 illustrates that the user or programmer has created a highlighted box 804 over an item amount column (corresponding to column 706 of FIG. 7) for indicating the cost of each item purchased. Box 804 is defined by the user or programmer as a Table Zone because box 804 contains a table of information regarding item costs. A highlighted box 806 has been created over the total amount cell (corresponding to cell 708) for indicating the combined cost of all items purchased. Box 806 is defined as a Text Zone because box 806 contains simple text.

In an embodiment of the present invention, in addition to specifying the source zone associated with each target zone, the user or programmer can also specify attributes for each target zone. For example, using the pop-up GUI 802, the user or programmer can modify various attributes of each target zone. Popup GUI 802 shows that the following target zone attributes can be specified: the location of the target zone, the alignment of the text in the target zone, the font of the text in the target zone, the manner in which to expand or crop an image that is placed in the target Image Zone and the manner in which to rotate an image that is placed in the target Image Zone.

In an embodiment of the present invention, once the target document is fully defined using the highlighted boxes and pop-up GUI 802, a target template file is created. The target template file contains, at a minimum, a list of each target zone, the location of each target zone and the source zone associated with the target zone. An example of a target template file, in text format, is shown above.

V. The Mapper

Figure 9:
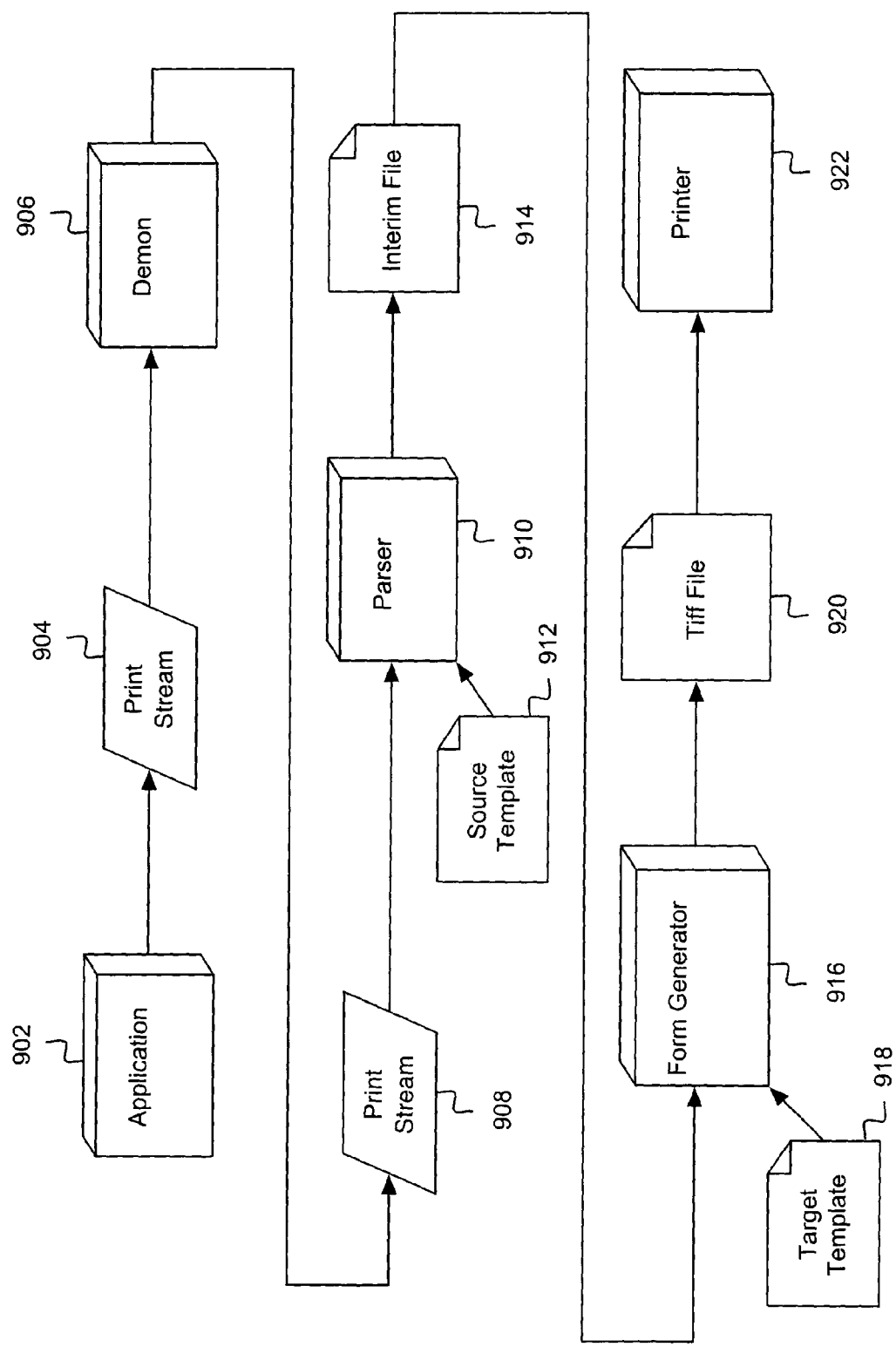
FIG. 9 is a functional diagram illustrating the mapping process of FIG. 1 according to one embodiment of the present invention.

FIG. 9 is a functional diagram illustrating the mapping process of FIG. 1 according to the present invention. FIG. 9 provides more detail of the process represented by step 214 of FIG. 2. FIG. 9 shows that an application 902, corresponding to application 104, has sent a print stream 904 containing a source document. The print stream 904 is subsequently captured by a demon 906. A demon 906 is an application program that resides on a client computer system for the purpose of performing a specified process at a predefined time or in response to a particular event. The demon, in one example, is a specialized printer driver. In this case, demon 906 receives the print stream 904, initiates the mapper 106 and redirects the print stream 904 as print stream 908 to the mapper 106. Mapper 106 is represented in FIG. 9 by functional block 910 representing the parser function and functional block 916 representing the form generating function. In an embodiment of the present invention, demon 906 is not present. In this embodiment, the print stream 904 is received directly by parser 910 from application 902.

The first operation performed by mapper 106 is the parsing of the print stream 908 by parser 910 using the source template 912, which was defined in the process of FIG. 3. In an embodiment of the present invention, parser 910 converts the format of the print stream 908 to a TIFF file format before parsing. In any event, the product of the operation of parser 910 is an interim file 914 containing the content that has been extracted from the print stream 908 in accordance with the source template 912. In an embodiment of the present invention, interim file 914 is a text file containing a list of source zones and the content contained in each source zone. In this embodiment, the interim file 914 is similar to the example source template file in text format shown above in the section entitled Source Template.

Form generator 916 receives interim file 914 and proceeds to populate the target template 918 using the content contained in interim file 914. The target template 918 defines the manner and format in which the content is entered into the specified target zones of the target template 918, as described in FIG. 6 above. The product of form generator 916 is a TIFF file 920. The TIFF file 920 is then sent to printer 922 for printing.

Figure 10A:
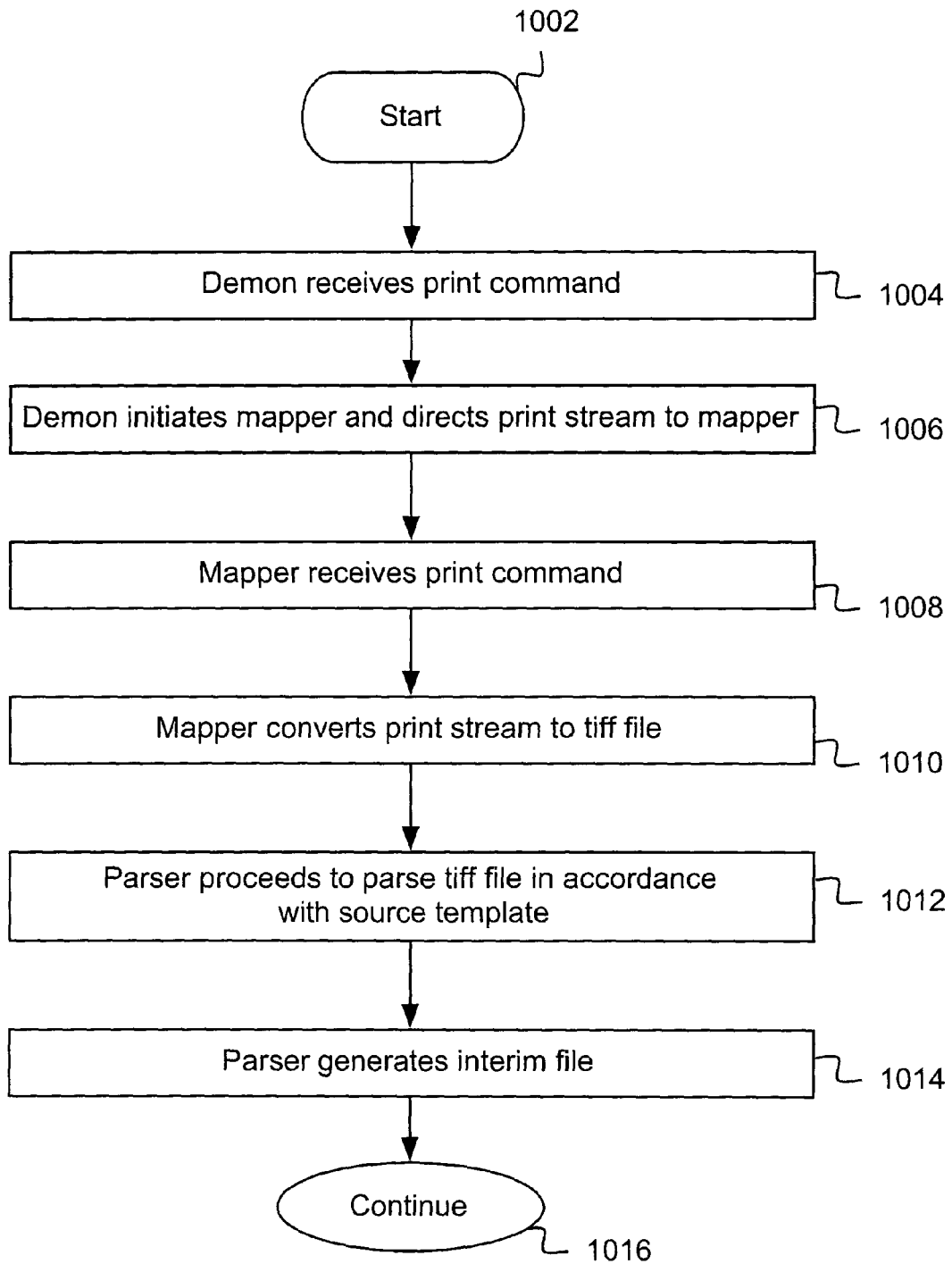
FIG. 10A is a flowchart depicting the operation and control flow of the mapping process of FIG. 8 according to the present invention.
Figure 10B:
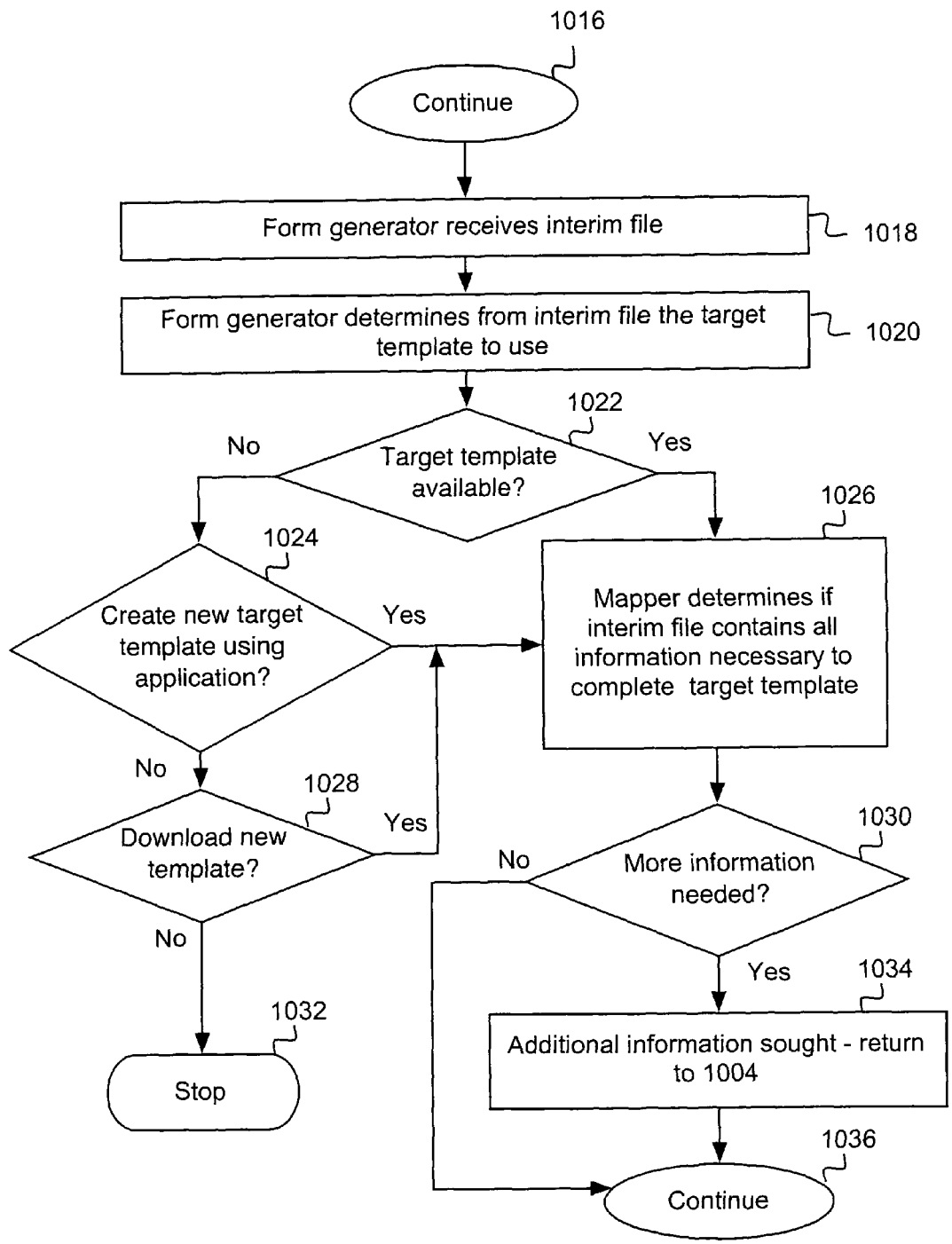
FIG. 10B is a continuation flowchart if FIG. 10A, in one embodiment of the present invention.
Figure 10C:
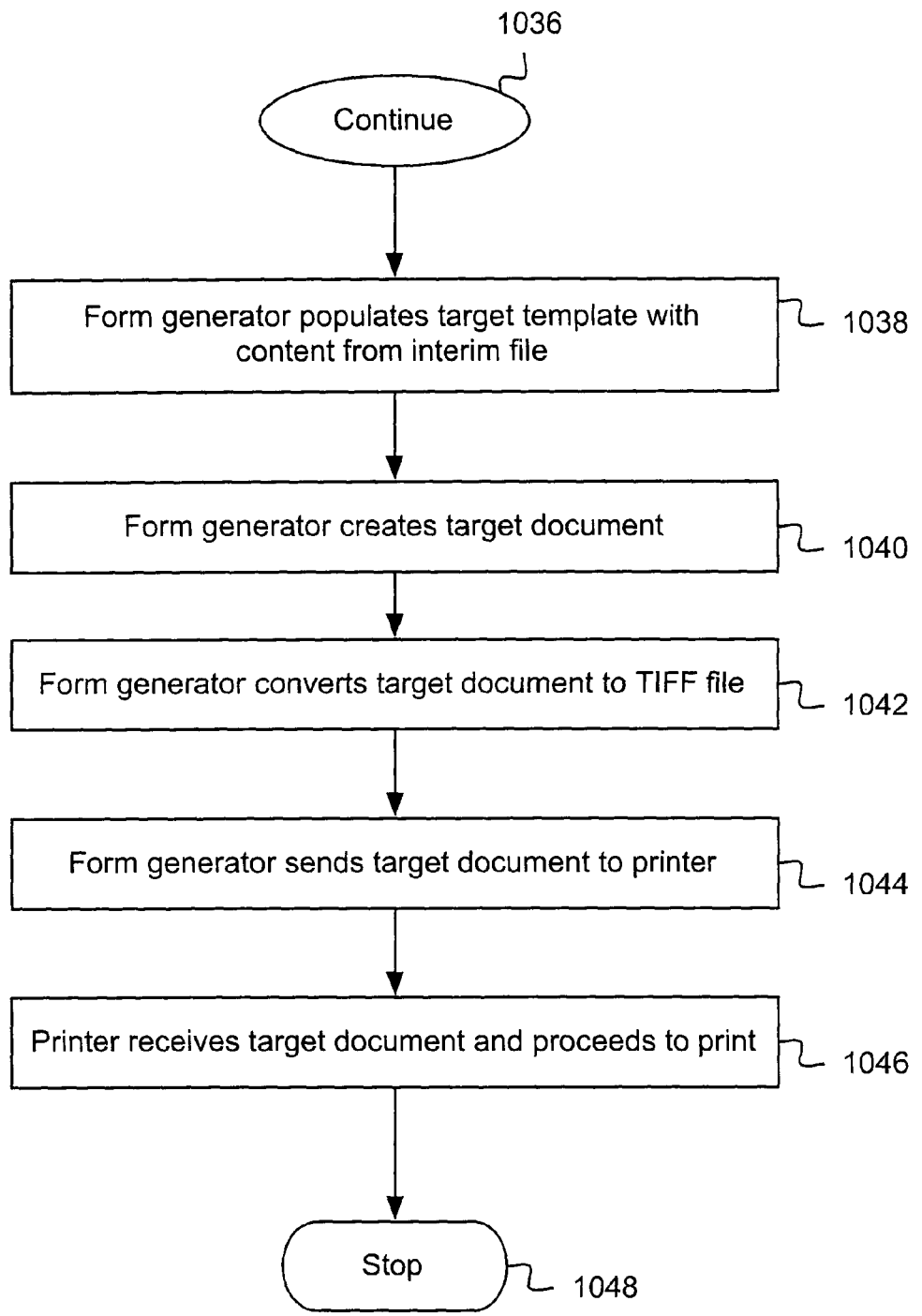
FIG. 10C is a continuation flowchart if FIG. 10B, in one embodiment of the present invention.

FIGS. 10A, 10B and 10C are flowcharts depicting the operation and control flow of the mapping process of one embodiment of the present invention. FIGS. 10A, 10B and 10C provide additional detail of the process represented by step 214 of FIG. 2. The control flow of FIGS. 10A, 10B and 10C begins with step 1002 and flows directly to step 1004. In step 1004, the demon 906 receives the print stream 904. In step 1006, the demon 906 initiates the matter 106 and redirects the print stream 904, now print stream 908, to the mapper 106. In step 1008 the parser 910 of mapper 106 receives the print stream 908. In step 1010, in an embodiment of the present invention, parser 910 converts the format of the print stream 908 to a TIFF file format before parsing.

In step 1012, the parser 910 of mapper 106 parses the print stream 908 in accordance with a predefined source template 912. In this step, the parser 910 performs Optical Character Recognition (OCR) procedures on Text Zones of the source document as defined by the source template 912. Alternatively, the parser 910 extracts text from Text Zones of the source document in EMF format, as defined by the source template 912. In addition, the parser 910 generates image format copies for all other specified source zones of the source document as defined by the source template 912. In step 1014, the output of step 1012 is an interim file 914 that contains all content (image, text, and more) extracted from the source document. Control flows from step 1014 to step 1016 and immediately continues with step 1018 of FIG. 10B.

In an embodiment of the present invention, the parser 910 of mapper 106, in step 1012, determines the source template 912 to use for each particular source document by performing OCR in Key Zones of the source document. The parser 910 subsequently attempts to match the text extracted from a Key Zone with text defined in source templates 912. Once a match is made, the corresponding source template 912 is used to parse the source document. This is useful when there are multiple source templates 912 defined for source documents.

In step 1018, the form generator 916 receives interim file 914. In step 1020, the form generator 916 determines from the interim file 914 the target template 918 to use in generating a target document. The form generator 916 makes this determination by reviewing the text found in a Key Zone or related source zone in the source document. The form generator 916 subsequently attempts to match the text extracted from a Key Zone in the source document with text defined in target templates 918. Once a match is made, the corresponding target template 918 is used to create the target document. This is useful when there are multiple target templates 918 defined for target documents.

In step 1022, the form generator 916 determines whether the appropriate target template 918 (chosen as the appropriate target template 918 in step 1020) is available. If the result of this determination is positive, the form generator 916 accesses the appropriate target template 918 and control flows to step 1026. If the result of this determination is negative, control flows to step 1024. In step 1024, the form generator 916 determines whether an appropriate target template 918 can be produced using an application, such as the target template generation application described in FIG. 8. If the result of the determination of step 1024 is positive, a user or a programmer uses an application such as described in FIG. 8 to produce the appropriate target template 918 and control flows to step 1026. If the result of the determination of step 1024 is negative, control flows to step 1028. In step 1028, the form generator 916 determines whether an appropriate target template 918 can be downloaded from a web site or other entity via a network. If the result of the determination of step 1028 is positive, the appropriate target template 918 is downloaded and control flows to step 1026. If the result of the determination of step 1028 is negative, control flows to step 1028.

In step 1026, the form generator 916 reviews the information interim file 914 and compares it to the information required to complete the target template 918. In step 1030, the form generator 916 determines whether the interim file 914 contains all of the information necessary to complete the target template 918. If the form generator 916 determines that more information is necessary, the form generator 916 seeks the required information and control flows to step 1034. If the form generator 916 determines that more information is not necessary, control flows to step 1036.

In an embodiment of the present invention, in step 1034, the mapper 106 automatically seeks the required information. Mapper 106 can accomplish this task by searching for a file or data set that contains the required information. Alternatively, the mapper 106 can communicate to application 104 the data that it requires and subsequently receive the required information from the application 104. In another embodiment, the mapper 106 can prompt the user 102 to provide the required information by providing another print stream that contains the required information. As explained above, the mapper 106 can communicate with the user 102 via a pop-up window that describes to the user 102 the required information. In step 1032, the control flow of FIG. 10 ceases. Control flows from step 1034 to step 1036 and immediately continues with step 1038 of FIG. 10C.

In step 1038, the form generator 916 of mapper 106 produces a target document by populating the target zones of target template 918 using the content in interim file 914, as specified by the target template 918. In an embodiment of the present invention, in step 1038, the form generator 916 also populates the target document with static content information specified by the user in an optional step after step 206 of FIG. 2. In step 1040, the form generator 916 generates the target document.

In step 1042, the form generator 916 converts the target document to a final format, such as a TIFF file 920. In an embodiment of the present invention, the form generator 916 may also convert the target document into a printer format that is supported by printer 922, such as an EMF or other graphical format. For example, the original print stream 904 may have been directed towards a particular type of printer, such as a non-impact printer, a laser printer, an inkjet printer, a bubble jet printer, a dot matrix printer, a thermal printer, or the like. In this case, the form generator 916 converts the target document into a printer format that is supported by printer 922. In step 1044, the form generator 916 sends the TIFF file 920 to the printer 922 for printing. In step 1046, the printer 922 receives the TIFF file 920 and proceeds to print the file. In step 1048, the control flow of FIG. 10 ceases.

VI. File Format Conversion

In an embodiment of the present invention, mapper 106 performs file format conversion between applications and/or operating systems having incompatible file format. In this embodiment, the mapper 106 captures a print stream containing a source document that was sent to a printer by a first application executing in a first operating system (OS). Subsequently, the mapper 106 proceeds to generate a target document in a file format that is supported by a second application executing in a second operating system. This is described in greater detail below.

This process is advantageous as it provides for increased compatibility between different applications and operating system's. Unlike the previous embodiments, the output destination here is an application or OS. As an example of a situation wherein the aforementioned process is advantageous, consider a small business that utilizes a PC-based small business financial software application such as Quickbooks. As the small business grows into a middle sized business, the firm decides to utilize a Unix-based financial software application. As a result, the firm is faced with the problem of porting all of its' current PC-based Quickbooks files and databases to a Unix-based software application. Using the proposed invention, the business sends the PC-based QuickBooks files in a print stream to a converter module. The converter module then converts the information in the print stream into a format that is compatible with the Unix-based software application.

Figure 11:
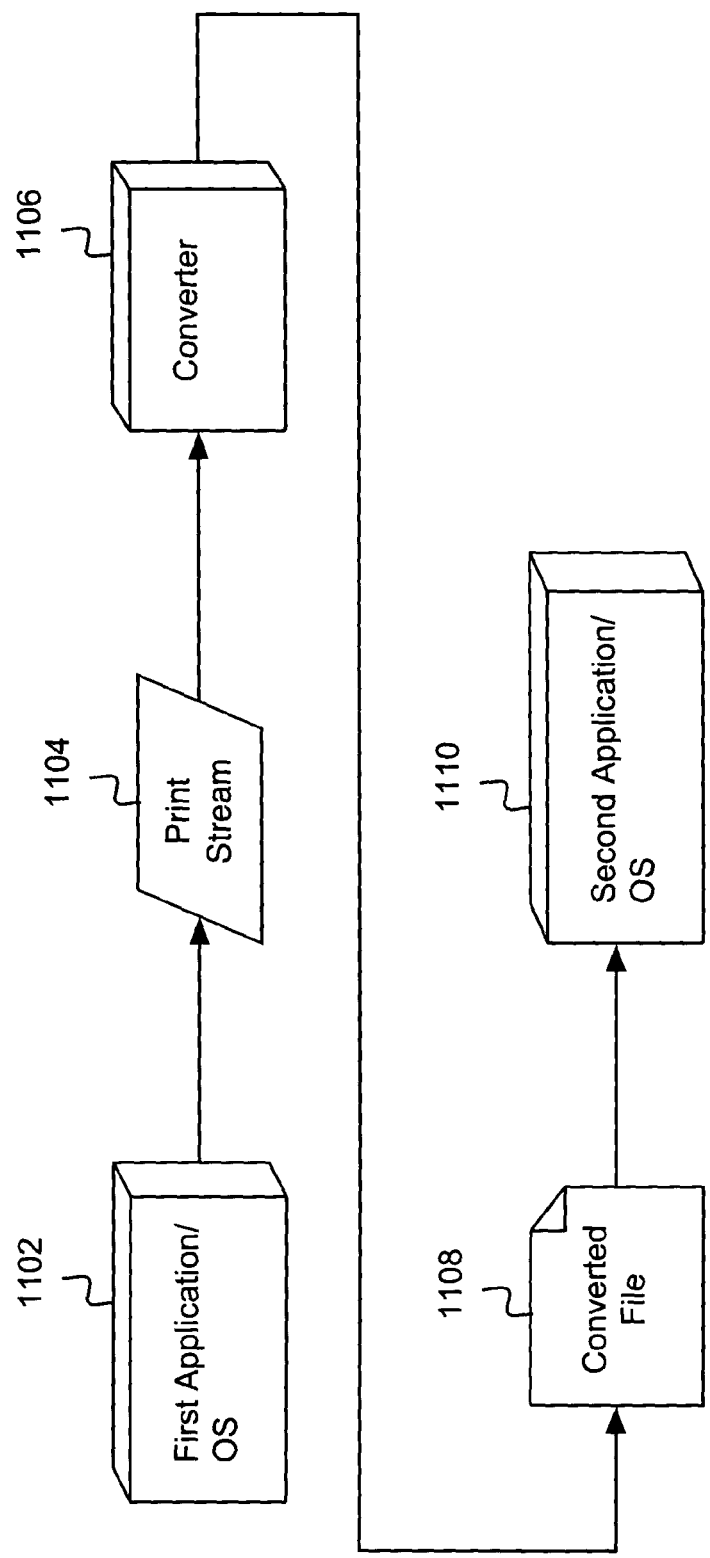
FIG. 11 is a functional diagram illustrating the file conversion process of another embodiment of the present invention.

FIG. 11 is a functional diagram illustrating the file conversion process of another embodiment of the present invention. FIG. 11 shows a first application executing in a first OS 1102. In this embodiment, the first application/OS 1102 produces files and/or databases that are not compatible with a second application executing in a second OS 1110. First application/OS 1102 subsequently produces print stream 1104 containing a source document. Then, print stream 1104 is received by converter 1106, representing a module of mapper 106. Converter 1106 proceeds to convert print stream 1104 into a converted file 1108, which conforms to a format supported by second application/OS 1110. The manner in which converter 1106 converts the print stream 1104 is described in greater detail below. Subsequently, second application/OS 1110 receives the converted file 1108.

In an embodiment of the present invention, the first application is not compatible with the second application and the first OS is not compatible with the second OS. In this case, the converter 1106 must convert between incompatible applications and operating systems. In another embodiment of the present invention, the first application is identical to the second application and the first OS is not compatible with the second OS. In this case, the converter 1106 must convert only between incompatible operating systems. In yet another embodiment of the present invention, the first application is not compatible with the second application and the first OS is identical to the second OS. In this case, the converter 1106 must convert only between incompatible applications.

In another embodiment of the present invention, the conversion process executed by converter 1106 also includes the conversion of a print stream into a format compatible with a particular type of printer. This embodiment is advantageous in situations where the first application/OS 1102 does not support a particular type of printer, such as an impact printer. Using the proposed invention, the print stream 1104 is converted into a format that is compatible with impact printers and provided to second application/Os 1110 for printing.

In yet another embodiment of the present invention, the converter 1106 is a separate software application that is available to user 102 for converting files. In this embodiment, upon the recognition that the documents produced by a first application/OS 1102 are not compatible with a second application/OS 1110, a user 102 accesses the converter 1106 and executes converter 1106 to convert the incompatible files at issue. In one alternative, the converter 1106 is available to user 102 on removable storage medium such as a CD or a floppy disk. In another alternative, the converter 1106 is available to user 102 for download from a web page or web site.

Figure 12:
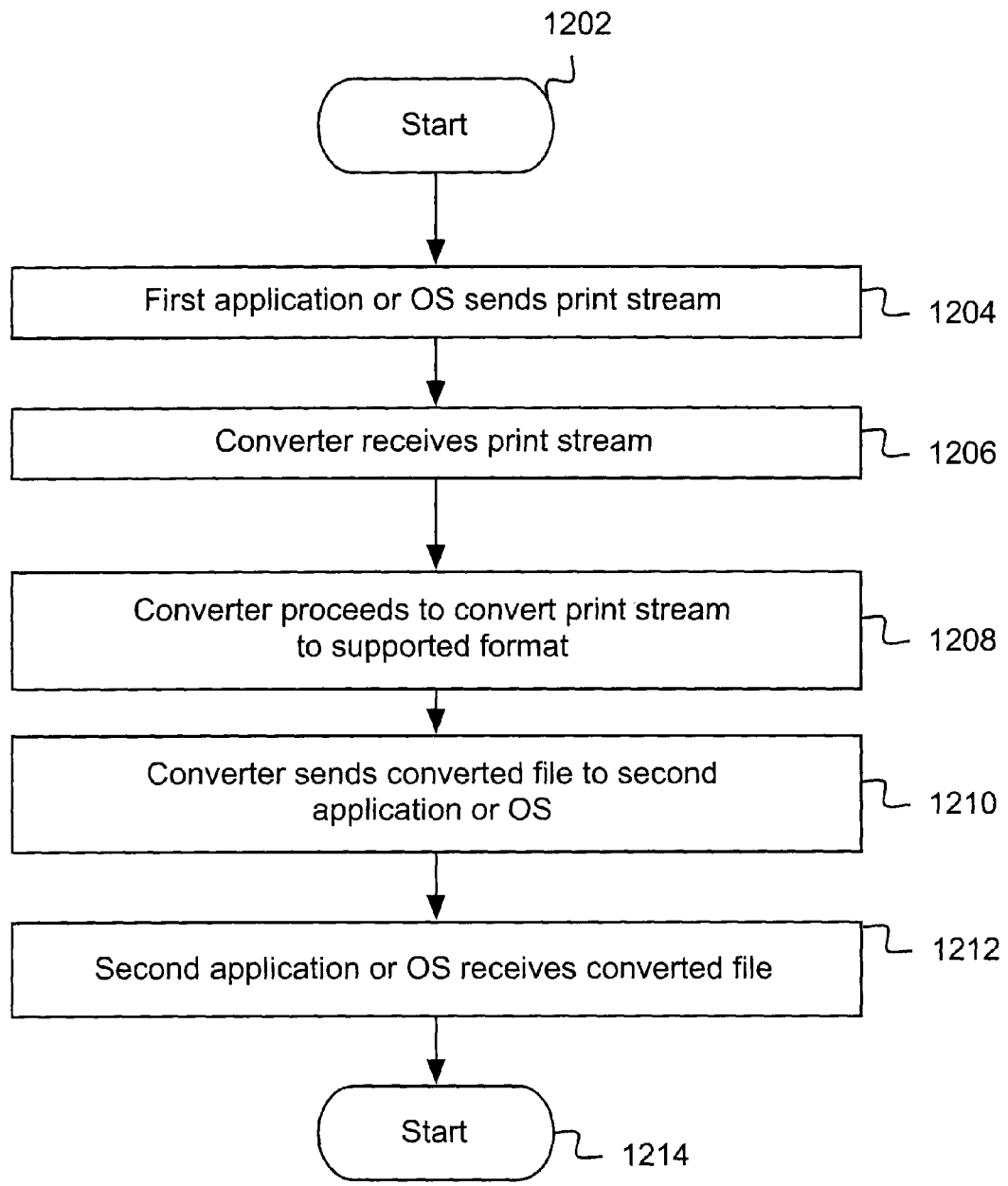
FIG. 12 is a flowchart depicting the operation and control flow of the file conversion process of FIG. 11 according to the present invention.

FIG. 12 is a flowchart depicting the operation and control flow of the file conversion process of FIG. 11 according to the present invention. FIG. 12 provides additional detail of the process represented by functional module 1106 of FIG. 11. The control flow of FIG. 12 begins with step 1202 and flows directly to step 1204. In step 1204, first application/OS 1102 produces a print stream 1104 containing a source document. In step 1206, converter 1106 receives the print stream 1104. In step 1208, converter 1106 converts the print stream 1104 into a format supported by second application or OS 1110.

In one embodiment of the present invention, converter 1106 accomplishes the task of step 1208 using a process similar to the process defined in FIG. 2 above. That is, for each type of source document, a template is generated which defines the content in the source document, and for each target document, a template is generated which defines the source of the content in the target document. Subsequently, the target document is generated upon the provision of a source document via a print stream. In another embodiment of the present invention, the converter 1106 accomplishes the task of step 1208 by modifying file header information or other file metadata information of the document extracted from print stream 1104 in order to generate a file that is compatible and readable by the second application/OS 1110. In step 1210, converter 1106 sends the converted file 1108 to the second application/ OS 1110. In step 1212, the second application/OS 1110 receives the converted file 1108. In step 1214, the control flow of FIG. 12 ceases.

VII. PC Postage

In an embodiment of the present invention, the proposed invention can modify PC postage printed onto a business form or mailer, while adhering to security measures protecting PC postage from tampering. In this embodiment, the form generator 916 of the mapper 106 receives the PC postage for insertion into the target document. The form generator 916 receives the PC postage either from the source document in step 210 of FIG. 2 or directly from PC postage software provided by a PC postage provider during the target document generation step 214. Examples of current PC postage providers are Pitney-Bowes, Endicia, Stamps.com and Neopost. In the case where the PC postage is received directly from PC postage software, the user 102 is given the option of selecting the PC postage provider. Once the PC postage is received, the form generator 916 can proceed to reposition or rotate the PC postage during the target document generation step 214. In doing so, the security measures protecting the PC postage are followed. Furthermore, the postal regulations defining the proper placement of the PC postage are complied with. This allows the user 102 more flexibility in positioning the PC postage onto the business form or mailer.

VIII. Printing in a Secure Environment

Figure 14:
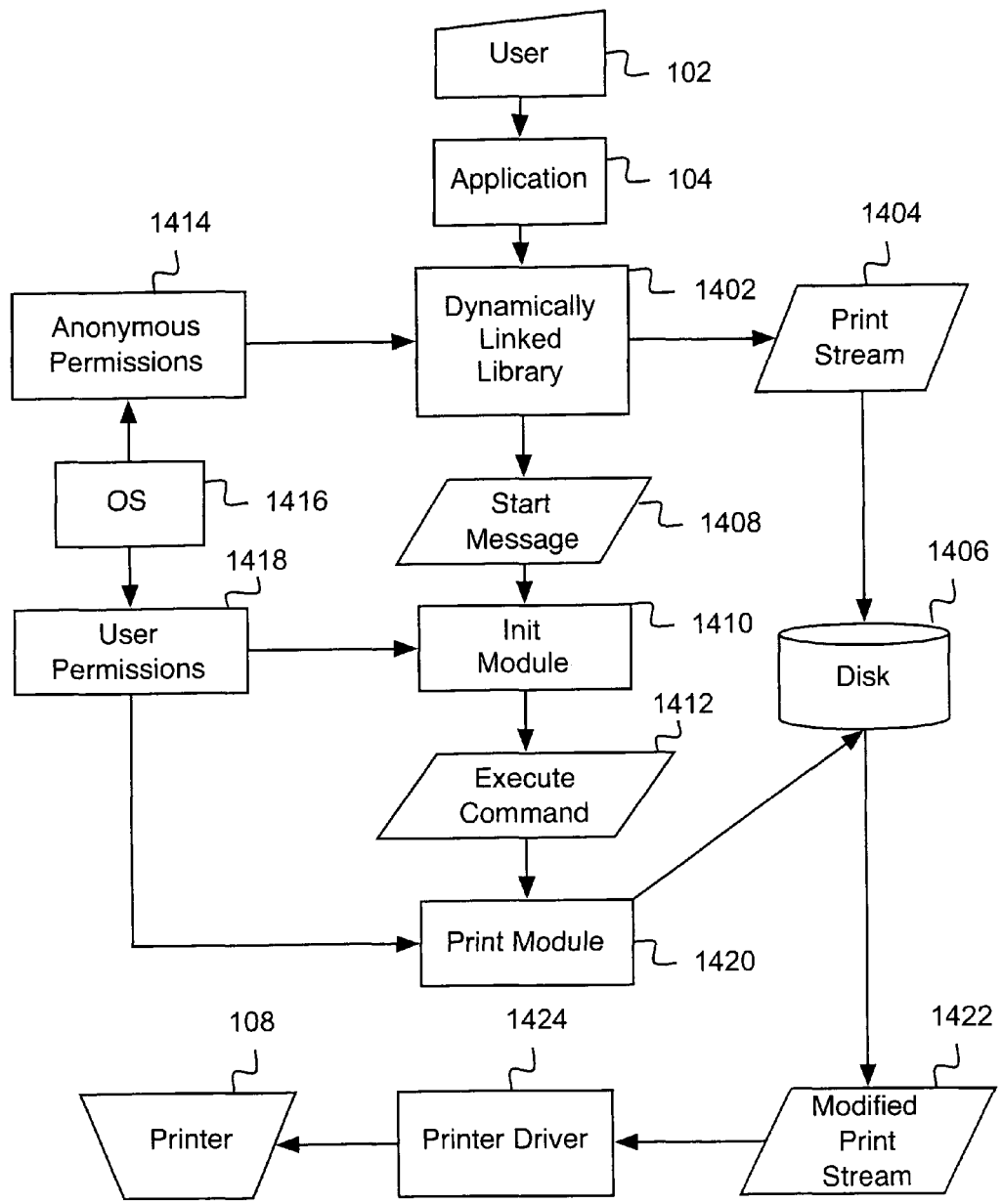
FIG. 14 is a functional diagram illustrating one embodiment of the printing process of the present invention.

FIG. 14 is a functional diagram illustrating one embodiment of the printing process of the present invention. The process illustrated in FIG. 14 begins with the user 102 using the application 104 to issue a print command. The print command is received by the dynamically linked library (DLL) 1402. Upon execution, the DLL 1402 is automatically assigned the permissions 1414 of the anonymous user account. This poses a problem as conflicts can arise between the permissions 1414 of the anonymous user account and the permissions 1418 of the current user account. For example, the current user account may have permission to print on certain printers, whereas the anonymous user account may not have such permission. Thus, it would be advantageous for the process of the present invention to adhere to the permissions of the current user account.

The DLL 1402 subsequently proceeds to produce a print data stream 1404 that is saved onto a floppy or a hard disk 1406. Next, the DLL 1402 sends a start message 1408 to the initiation module 1410. The initiation module 1410 receives the start message 1408 and proceeds to execute. Because the initiation module 1410 is spawned or executed by a DLL, it is automatically assigned the permissions 1418 of the current user account from the operating system 1416. Next, the initiation module 1410 issues an execute command 1412 to the print module 1420. In addition, the initiation module 1410 sends the permissions 1418 of the current user account to the print module 1420. The print module 1420 receives the execute command 1412 and the permissions 1418 and proceeds to execute. This solves the problem posed above, as the print module 1420, which will initiate the print process, adheres to the permissions of the current user account.

Upon execution, the print module 1420 proceeds to retrieve the print data stream 1404 from the disk 1406. Next, the print module 1420 modifies the print data stream 1404 to conform to a template that is specified by the user 102. The process of modifying a print stream to conform to a predefined template is discussed in greater detail above. Subsequently, a modified print data stream 1422 is generated by print module 1420. The modified print data stream 1422 is then sent to printer driver 1424 for printing. It should be noted that upon reception of the modified print data stream 1422 by printer driver 1424, the permissions of the current user account are evaluated. The printer driver 1424 proceeds to initiate printing of the modified print data stream 1422 on the printer 108 in compliance with the permissions of the current user account.

Figure 15:
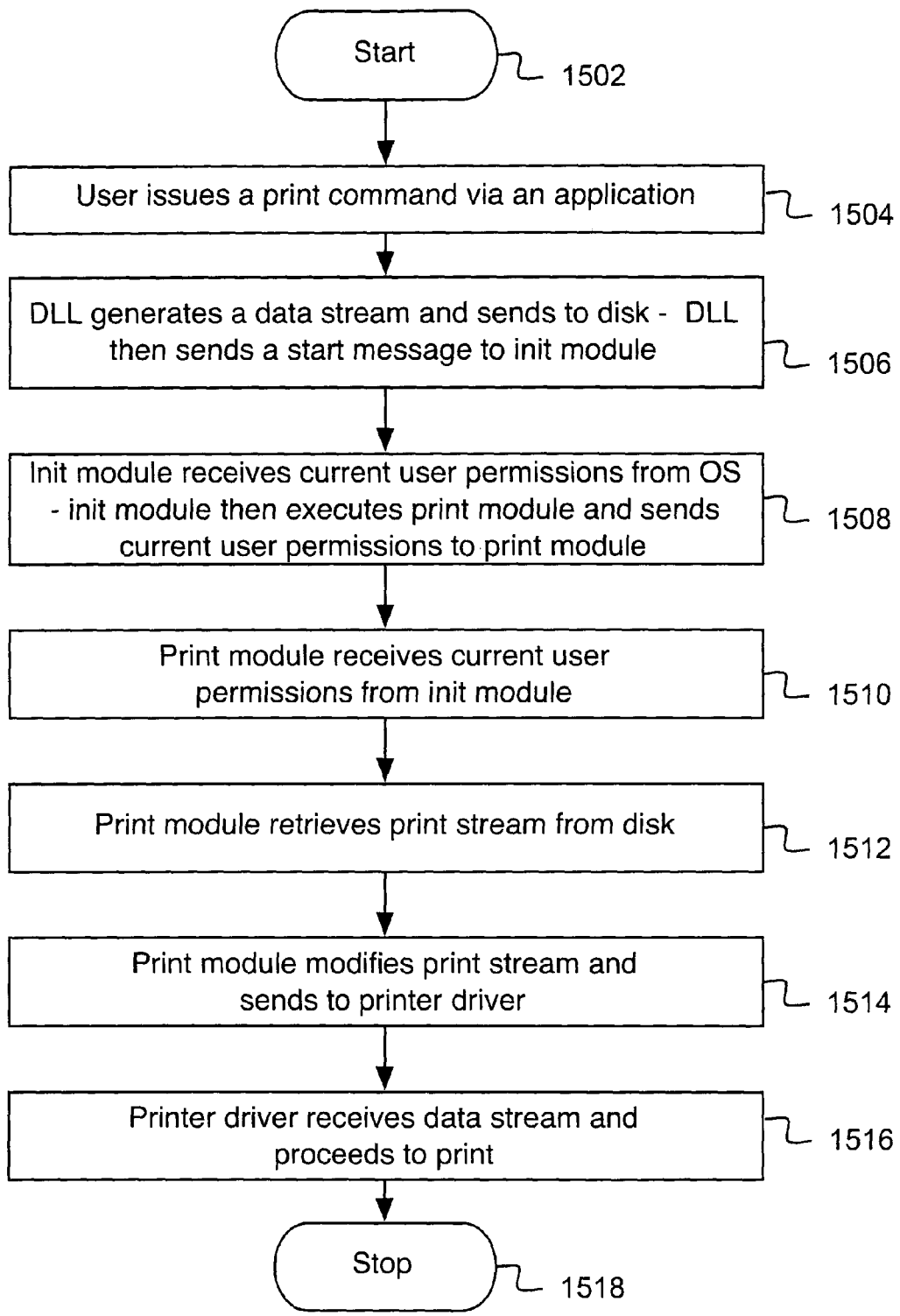
FIG. 15 is a flowchart depicting the operation and control flow of the embodiment of FIG. 14.

FIG. 15 is a flowchart depicting the operation and control flow of the embodiment of FIG. 14. The control flow of FIG. 15 begins with step 1502 and flows directly to step 1504. In step 1504, the user 102 issues a print command via an application 104. In step 1506, the print command is received by a DLL 1402. Upon execution, the DLL 1402 is automatically assigned the permissions 1414 of the anonymous user account. Subsequently, the DLL 1402 generates a print data stream 1404 and sends it to a disk 1406 for storage. Lastly, the DLL 1402 sends a start message 1408 to an initiation module 1410.

In step 1508, the initiation module 1410 executes in response to the start message 1408 and proceeds to receive current user account permissions 1418 from the operating system 1416. Subsequently, the initiation module 1410 issues an execute command 1412 to print module 1420. In addition, the initiation module 1410 sends the permissions 1418 of the current user account to the print module 1420. In step 1510, the print module 1420 executes in response to the execute command 1412 and proceeds to receive current user account permissions 1418 from the initiation module 1410.

In step 1512, the print module 1420 retrieves the print data stream 1404 from the disk 1406. Next, in step 1514, the print module 1420 modifies the print data stream 1404 to conform to a template that is specified by the user 102. Subsequently, a modified print data stream 1422 is generated by print module 1420 and sent to printer driver 1424 for printing. In step 1516, the printer driver 1424 proceeds to initiate printing of the modified print data stream 1422 on the printer 108 in compliance with the permissions of the current user account. In step 1518, the control flow of FIG. 15 ceases.

Figure 16:
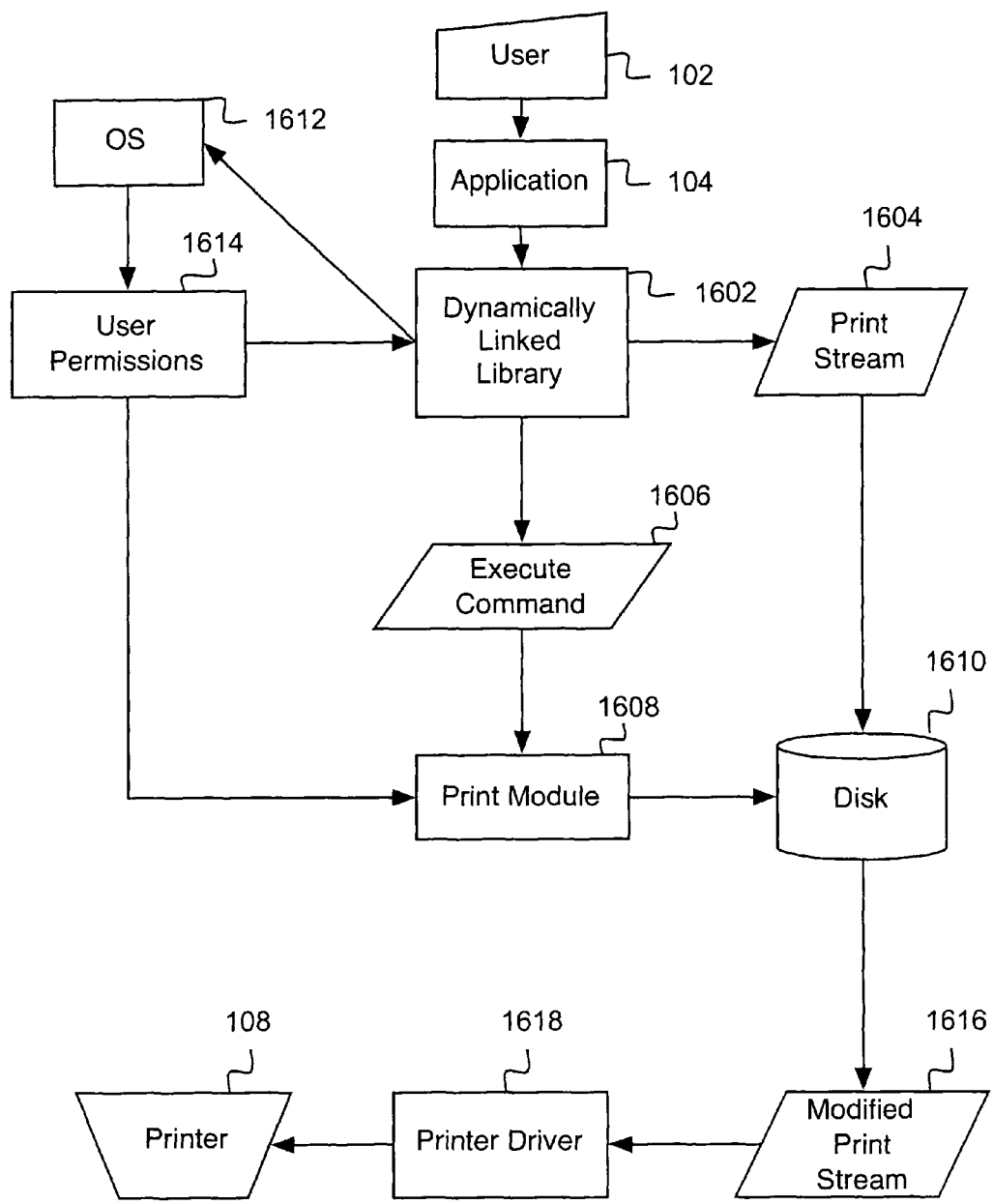
FIG. 16 is a functional diagram illustrating another embodiment of the printing process of the present invention.

FIG. 16 is a functional diagram illustrating another embodiment of the printing process of the present invention. The process illustrated in FIG. 16 begins with the user 102 using the application 104 to issue a print command. The print command is received by the DLL 1602.

Next, the DLL 1602 acquires access to the permissions 1614 of the current user account. The DLL 1602 can accomplish this task in a variety of ways. In one embodiment, the DLL 1602 prompts the user 102 to enter his authentication information (such as login and password), which is then used to acquire the permissions 1614 of the current user. In another embodiment, the DLL 1602 can read the operating system files associated with user accounts and determine the authentication information for the current user. The authentication information is then used to acquire the permissions 1614 of the current user account. In yet another embodiment, the DLL 1602 presents to the operating system 1612 a pointer to the permissions 1614 of the current user account. These permissions are then attributed to the user 102 by the operating system 1612. This feature solves the problem posed above, as the DLL 1602 adheres to the permissions of the current user account.

The DLL 1602 then proceeds to produce a print data stream 1604 that is subsequently saved onto a floppy or a hard disk 1610. Subsequently, the DLL 1602 sends an execute command 1606 to the print module 1608, as well as the permissions 1614 of the current user account. The print module 1608 receives the execute command 1606 and permissions 1614 and thus proceeds to execute.

Upon execution, the print module 1608 proceeds to retrieve the print data stream 1604 from the disk 1610. Next, the print module 1608 modifies the print data stream 1604 to conform to a template that is specified by the user 102. Subsequently, a modified print data stream 1616 is generated by print module 1608. The modified print data stream 1616 is then sent to printer driver 1618 for printing. It should be noted that upon reception of the modified print data stream 1616 by printer driver 1618, the permissions 1614 of the current user account are evaluated. The printer driver 1618 proceeds to initiate printing of the modified print data stream 1616 on the printer 108 in compliance with the permissions 1614 of the current user account.

Figure 17:
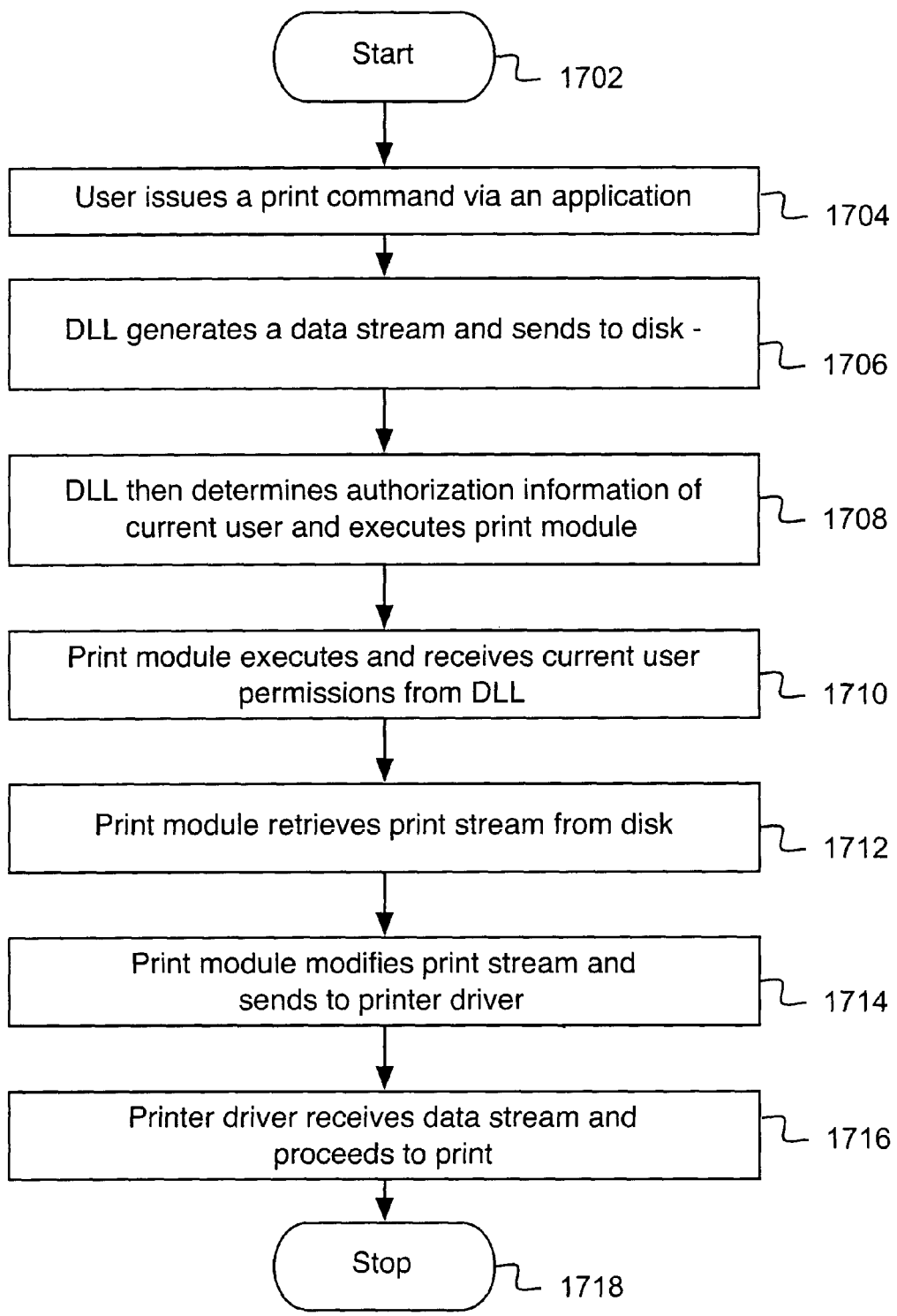
FIG. 17 is a flowchart depicting the operation and control flow of the embodiment of FIG. 16.

FIG. 17 is a flowchart depicting the operation and control flow of the embodiment of FIG. 16. The control flow of FIG. 17 begins with step 1702 and flows directly to step 1704. In step 1704, the user 102 issues a print command via an application 104. In step 1706, the DLL 1602 generates a print data stream 1604 and sends it to a disk 1610 for storage. In step 1708, the DLL 1602 determines the authentication information of the current user and acquires the permissions 1614 of the current user account. This is described in greater detail above. Also, the DLL 1602 sends an execute command 1606 to the print module 1608.

In step 1710, the print module 1608 executes in response to the execute command 1606 and proceeds to receive current user permissions 1614 from the DLL 1602. In step 1712, the print module 1608 retrieves the print data stream 1604 from the disk 1610. Next, in step 1714, the print module 1608 modifies the print data stream 1604 to conform to a template that is specified by the user 102. Subsequently, a modified print data stream 1616 is generated by print module 1608 and sent to printer driver 1618 for printing. In step 1716, the printer driver 1618 proceeds to initiate printing of the modified print data stream 1616 on the printer 108 in compliance with the permissions 1614 of the current user account. In step 1718, the control flow of FIG. 17 ceases.

IX. Content Protection in a Multi-User Computer System

Figure 18:
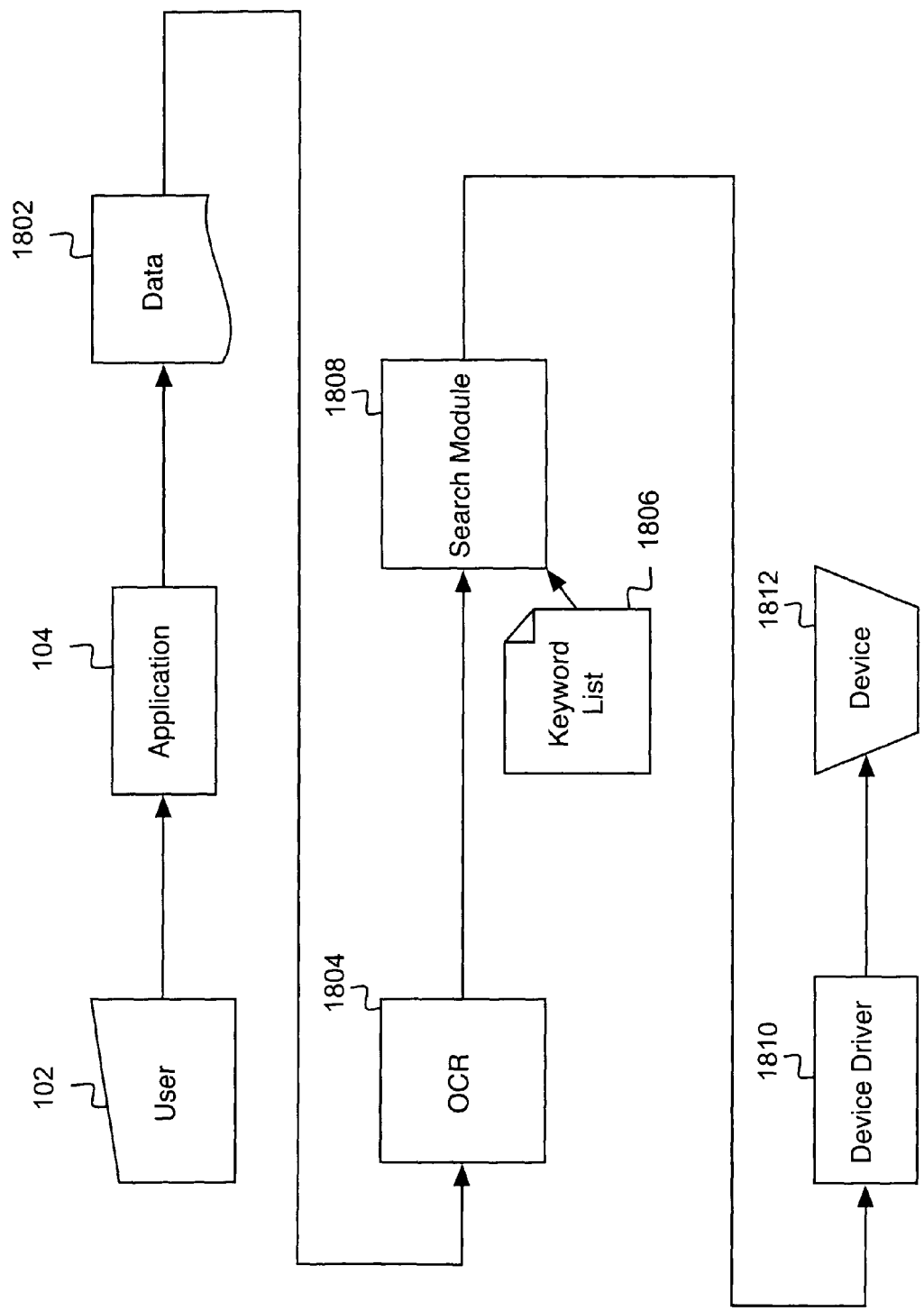
FIG. 18 is a functional diagram illustrating the content protection process of one embodiment of the present invention.

FIG. 18 is a functional diagram illustrating the content protection process of one embodiment of the present invention. The content protection process of FIG. 18 begins with the user 102 utilizing application 104 to send data 1802 to a device 1812 via a device driver 1810. The data 1802 is any file containing data, such as a document, a text file, an audio file and a video file. The device 1812 is any computer data storage or output device. For example, device 1812 can be a hard drive, a floppy drive, removable storage media, a printer, an audio speaker, a network location or an Internet location. The process of FIG. 18 is performed when an attempt or a request is made to send data 1802 to any such device 1812.

Upon reception of the request, an optical character recognition (OCR) module 1804 receives the data 1802 and proceeds to generate a text representation of the information in data 1802 using OCR techniques. OCR techniques are commonly known to one of ordinary skill in the art. It should be noted that the OCR step is only executed if the data 1802 is in a binary form that can be processed by OCR. A PostScript file format or a TIFF file format are examples of formats that can be processed by OCR. If the data 1802 were, for example, text data, then the OCR process would be unnecessary and the search process of search module 1808 would be initiated.

Next, the text representation of data 1802 is provided to search module 1808. Search module 1808 then reads in a keyword list 1806. The keyword list 1806 comprises a list of text words that are typically associated with documents or files that should be kept confidential or secret. An example of a keyword list is shown below:

confidential
    secret
    trade secret
    privileged

Subsequently, the search module 1808 searches the text representation of data 1802 for the keywords in the keyword list 1806. If the search module 1808 finds any of the keywords in keyword list 1806 in the text representation of data 1802, then the user 102 is denied access to the device 1812. In one alternative, the user 102 is prompted to enter authentication information in order to gain access to the device 1812. If the entered information is deemed to be authentic, then the user 102 is granted access to the device 1812.

If the search module 1808 does not find any of the keywords in keyword list 1806 in the text representation of data 1802, then the user 102 is granted access to the device 1812. Consequently, the data 1802 is sent to device driver 1810, which proceeds to process the data 1802 on the device 1812.

Figure 19:
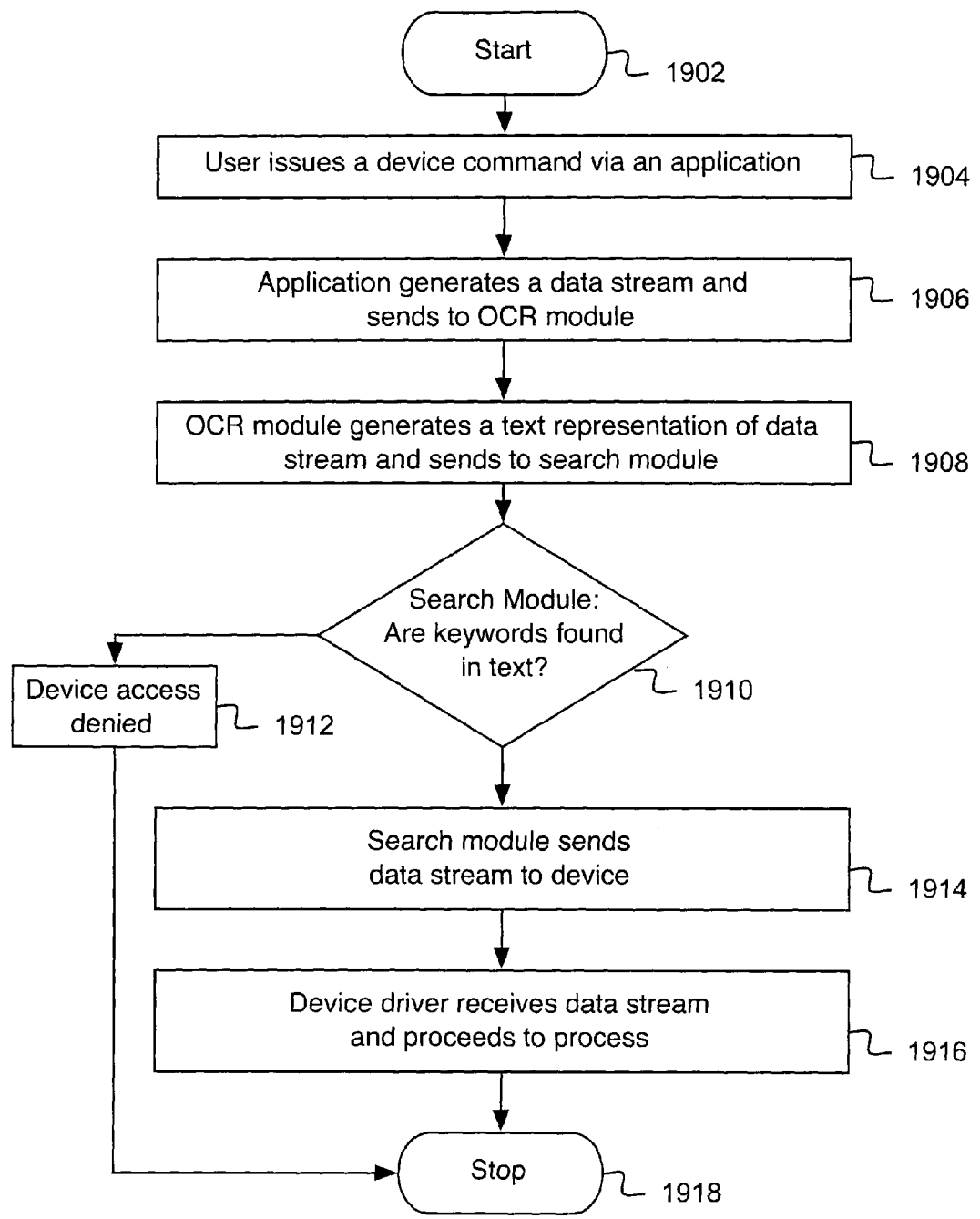
FIG. 19 is a flowchart depicting the operation and control flow of the embodiment of FIG. 18.

FIG. 19 is a flowchart depicting the operation and control flow of the embodiment of FIG. 18. The control flow of FIG. 19 begins with step 1902 and flows directly to step 1904. In step 1904, a user 102 issues, via an application 104, a data process command to a device 1812. The data process command involves the use of data 1802. A data process command is any command issued to a device that involves the processing of data. Examples of a data process command includes, a command for storing data on a hard disk, a command for printing data on a printer and a command for playing audio data on an audio speaker.

In step 1906, the application 104 generates data 1802, which is received by the OCR module 1804. In step 1908, the OCR module 1804 generates a text representation of the information in data 1802 using OCR techniques. Next, the text representation of data 1802 is provided to search module 1808. As explained above, if the data 1802 is not in a format that can be processed by OCR, then the OCR step 1908 would not be executed and no text representation of data 1802 would be generated for search module 1808. If, however, the data 1802 were already in a text format, then the data 1802 would be immediately provided to search module 1808 and the OCR step 1908 would be bypassed altogether. In this case, control would flow from step 1906 directly to step 1910.

In step 1910, the search module 1808 searches the text representation of data 1802 for the keywords in the keyword list 1806. If the search module 1808 finds any of the keywords in keyword list 1806 in the text representation of data 1802, then the user 102 is denied access to the device 1812 in step 1912. Optionally, in step 1912, the user 102 is prompted to enter authentication information in order to gain access to the device 1812 in steps 1914-1916. If the entered information is deemed to be authentic, then the user 102 is granted access to the device 1812. If the search module 1808 does not find any of the keywords in keyword list 1806 in the text representation of data 1802, then the user 102 is granted access to the device 1812 in steps 1914-1916.

In step 1914, the data 1802 is sent to device driver 1810. In step 1916, device driver 1810 proceeds to process the data 1802 on the device 1812. In step 1918, the control flow of FIG. 19 ceases.

X. Data Capture During the Print Process

Figure 20A:
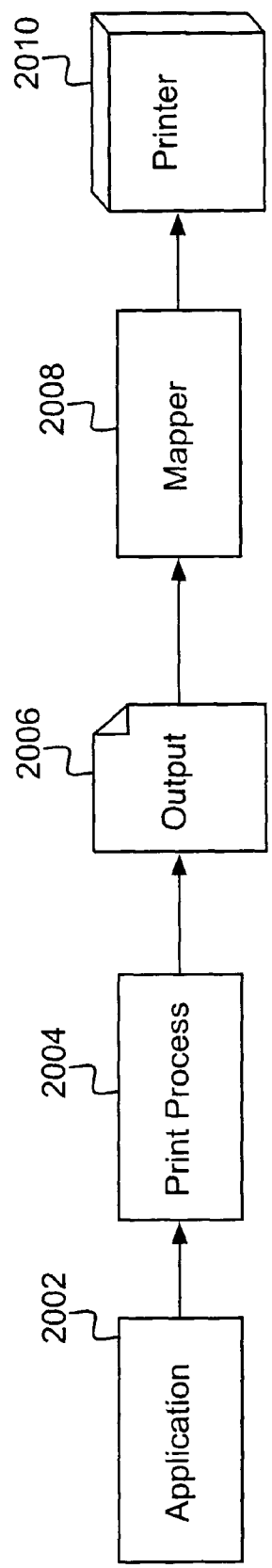
FIG. 20A is a block diagram illustrating a printing system architecture according to one embodiment of the present invention.

FIG. 20A is a block diagram illustrating a printing system architecture according to one embodiment of the present invention. The FIG. 20A shows a printing system architecture as used by the embodiments of the present invention depicted in Section V The Mapper (see FIG. 9) and Section VIII Printing in a Secure Environment (see FIG. 14). The FIG. 20A shows an application 2002, which is a word processor, a financial management suite, or the like. The application 2002 commences a print process 2004, which ultimately produces an output 2006—a print data stream. The intermediate processes performed by print process 2004 are inconsequential as only the print data stream, output 2006, is necessary. Next, the mapper 2008 reads and processes the print data stream, output 2006, to conform to a predetermined template, as described in greater detail above. Then, the processed print data stream is sent to printer 2010 for printing.

Figure 20B:
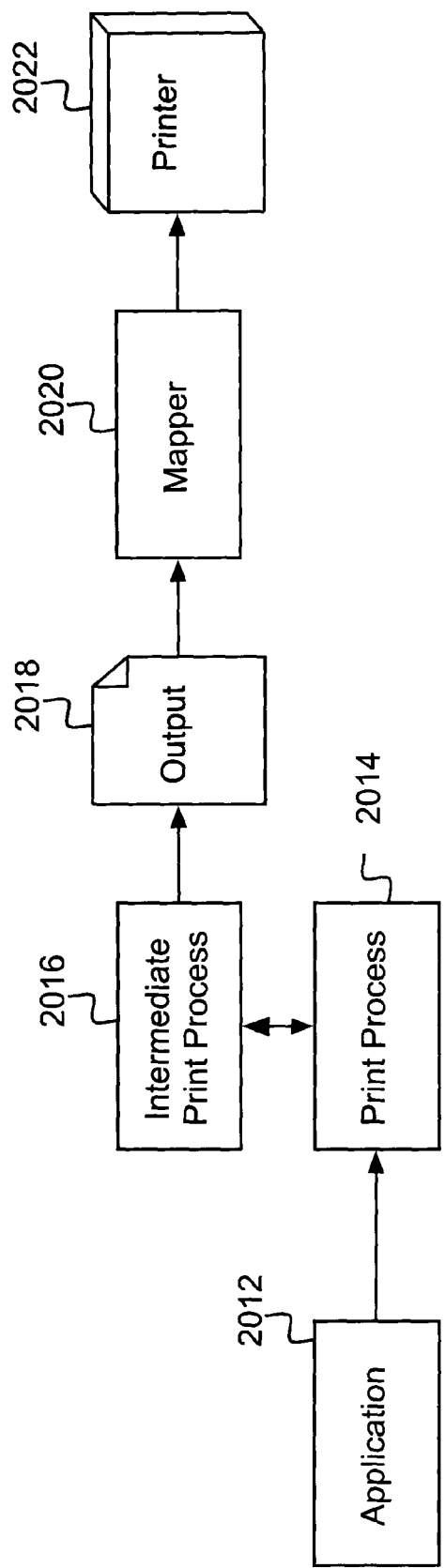
FIG. 20B is a block diagram illustrating a printing system architecture according to another embodiment of the present invention.

FIG. 20B is a block diagram illustrating a printing system architecture according to another embodiment of the present invention. In contrast to FIG. 20A, the FIG. 20B shows a printing system architecture as used by another embodiment of the present invention, described below. The FIG. 20B also shows an application 2012, which is a word processor, a financial management suite, or the like. The application 2012 commences a print process 2014. The data capture portion of the present embodiment becomes involved in the print process 2014 before a print data stream is created by the print process 2014. This is described in greater detail below. Intermediate print process 2016 communicates with the print process 2014 before a print data stream is created by the print process 2014. Intermediate print process 2016 then produces an output file 2018. Next, the mapper 2020 reads and processes the output file 2018, to conform to a predetermined template, as described in greater detail above. Then, the processed output file 2018 is sent to printer 2022 for printing.

Figure 21:
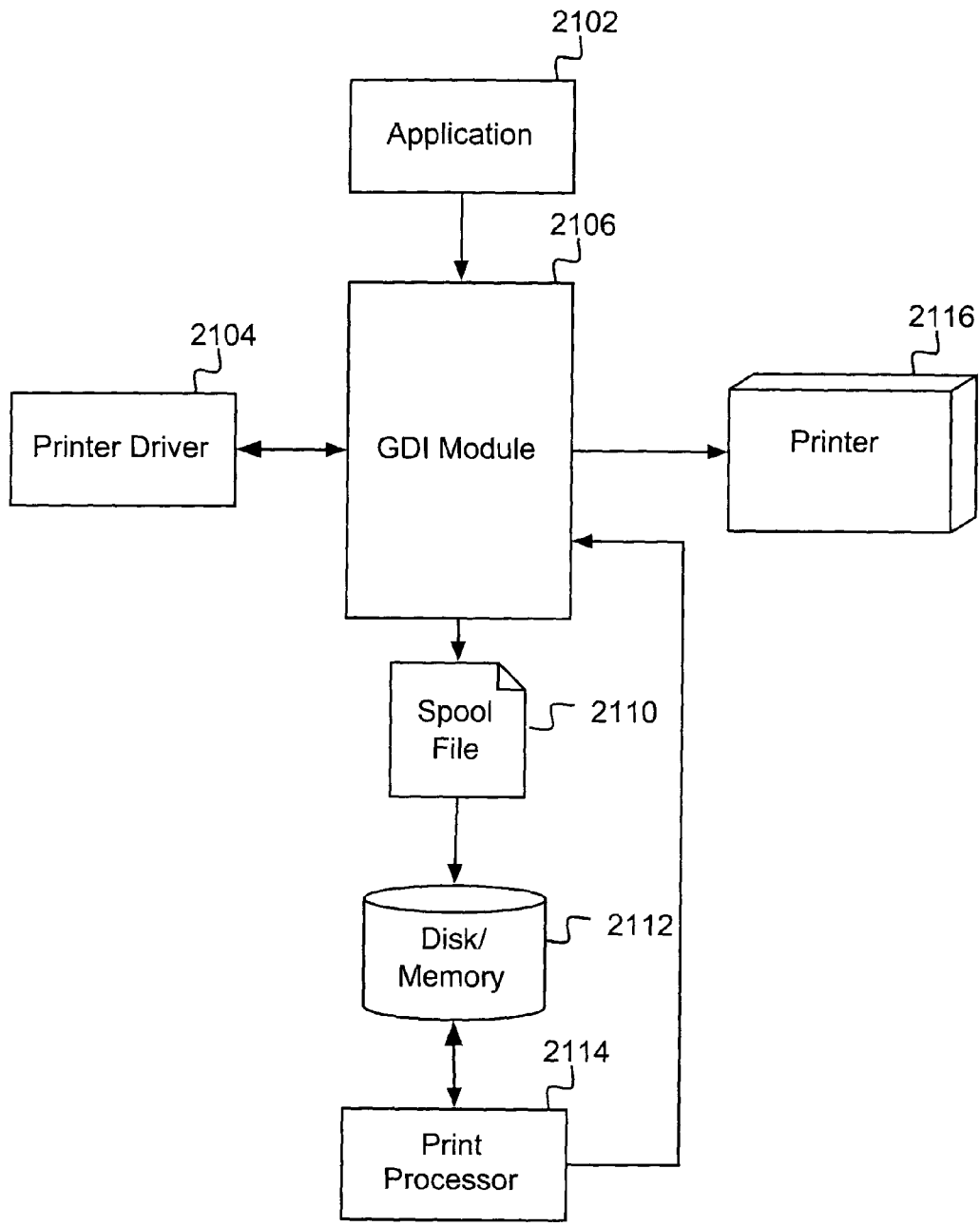
FIG. 21 is a block diagram illustrating a conventional printing process.

FIG. 21 is a block diagram illustrating a conventional printing process. FIG. 21 shows an application 2102 (corresponding to application 104 of FIG. 1) that issues a print request pertaining to a document. The print process begins with the application 2102 creating a device context and writing the objects of the document (images, text, and more) to the device context. Next, the application 2102 calls the Graphical Display Interface (GDI) module 2106 with the print request for a particular printer (printer 2116, corresponding to printer 108 of FIG. 1) using the device context. The GDI module 2106 then calls the printer driver 2104 with a request for instructions on how to render on printer 2116 the objects that were written to the device context. The printer driver 2104 returns instructions to the GDI module 2106 on how to render on printer 2116 the objects that were written to the device context. Next, the GDI module 2106 calls its internal spooler which proceeds to generate a spool file 2110. A spool file is a file holding instructions on how to render certain print objects on a particular printer. A spool file is written in a condensed format.

Next, the spooler writes the spool file 2110 to a disk or memory 2112, which resides on the computer system on which the current print process is executing. Then, a print processor 2114 proceeds to read the spool file 2110 from the disk or memory 2112 and send it to the GDI module 2106. The spool file 2110 is disassembled by the GDI module 2106 and the individual instructions on how to render certain print objects on a particular printer are sent to the printer 2116. The printer 2116 then proceeds to print the document described by the instructions in the spool file 2110.

Figure 22:
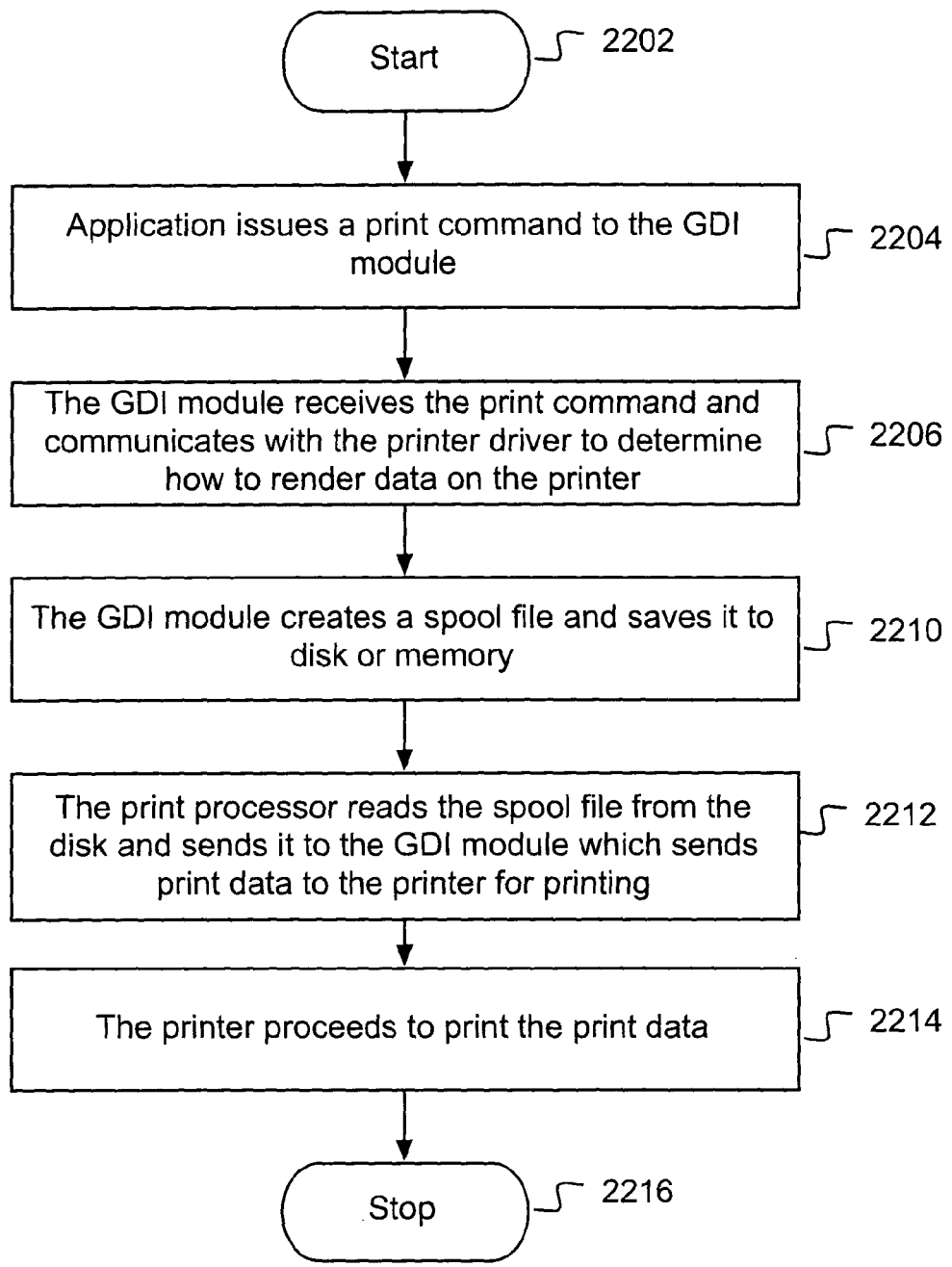
FIG. 22 is a flowchart depicting the operation and control flow of the conventional printing process of FIG. 21.

FIG. 22 is a flowchart depicting the operation and control flow of the conventional printing process of FIG. 21. The control flow of FIG. 22 begins with step 2202 and proceeds directly to step 2204. In step 2204, application 2102 (corresponding to application 104 of FIG. 1) issues a print command to the GDI module 2106 pertaining to a document.

Application 2102 creates a device context and writes the objects of the document (images, text, and more) to the device context. Application 2102 calls the GDI module 2106 with the print command for a particular printer (printer 2116, corresponding to printer 108 of FIG. 1) using the device context. In step 2206, GDI module 2106 receives the print command then calls the printer driver 2104 with a request for instructions on how to render on printer 2116 the objects that were written to the device context. The printer driver 2104 returns instructions to the GDI module 2106 on how to render on printer 2116 the objects that were written to the device context.

In step 2210, the GDI module 2106 proceeds to generate a spool file 2110 written in a condensed format. Next, the spooler writes the spool file 2110 to a disk or memory 2112, which resides on the computer system on which the current print process is executing. In step 2212, a print processor 2114 proceeds to read the spool file 2110 from the disk or memory 2112 and send it to GDI module 2106. The spool file 2110 is disassembled by the GDI module 2106 and the individual instructions on how to render certain print objects on a particular printer are sent to the printer 2116. In step 2214, the printer 2116 then proceeds to print the document described by the instructions in the spool file 2110. In step 2216, the control flow of FIG. 22 ceases.

Figure 23:
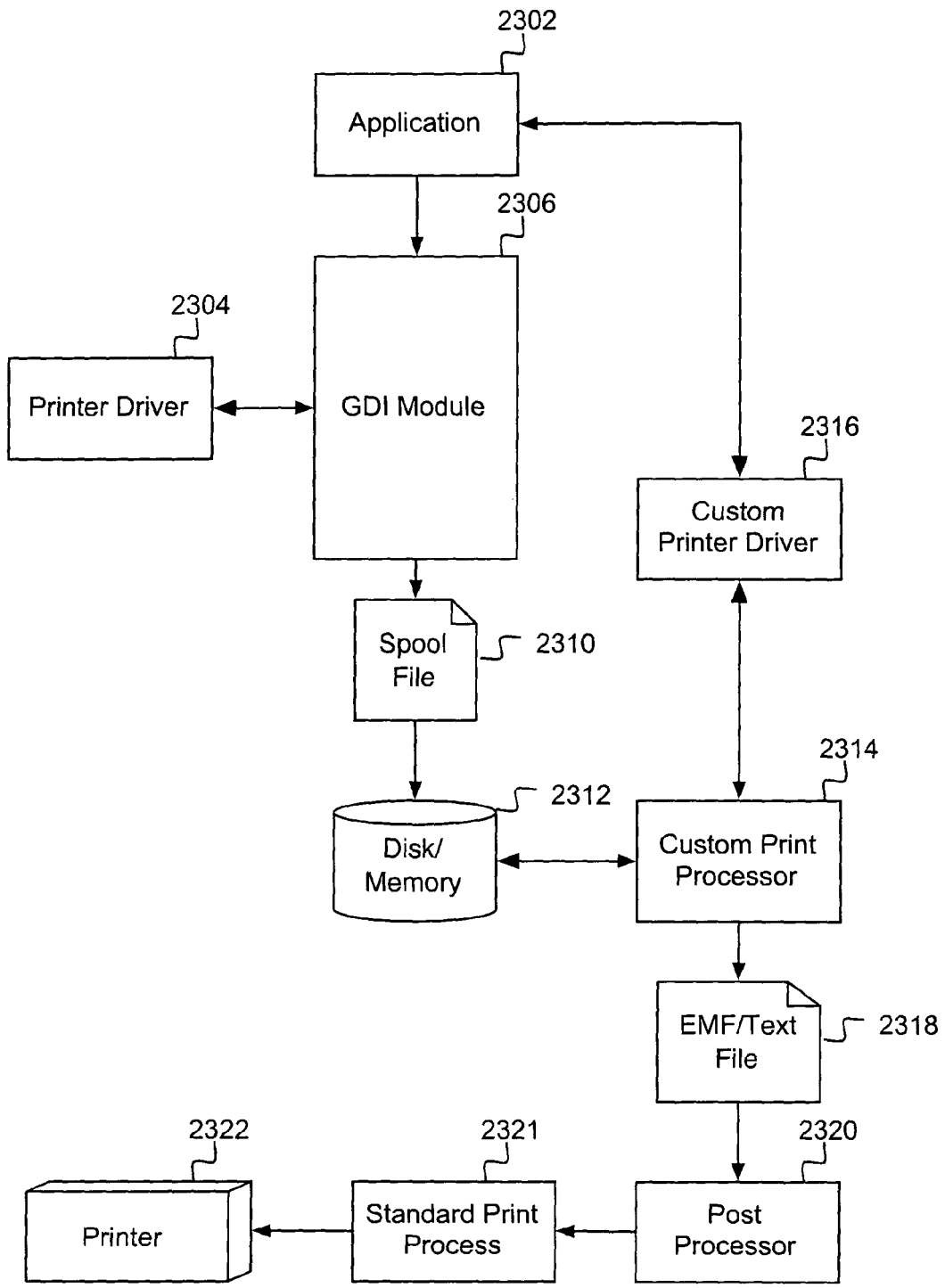
FIG. 23 is a block diagram illustrating the printing process according to one embodiment of the present invention.

FIG. 23 is a block diagram illustrating the printing process according to one embodiment of the present invention. FIG. 23 shows an application 2302 (corresponding to application 104 of FIG. 1) that issues a print request pertaining to a document. The print process begins with the application 2302 creating a device context and writing the objects of the document (images, text, and more) to the device context. Next, the application 2302 calls the GDI module 2306 with the print request for a particular printer (printer 2322, corresponding to printer 108 of FIG. 1) using the device context. The GDI module 2306 then calls the printer driver 2304 with a request for instructions on how to render on printer 2322 the objects that were written to the device context. The printer driver 2304 returns instructions to the GDI module 2306 on how to render on printer 2322 the objects that were written to the device context. Next, the GDI module 2306 calls its internal spooler which proceeds to generate a spool file 2310 written in a condensed format, such as in EMF.

Next, the spooler writes the spool file 2310 to a disk or memory 2312, which resides on the computer system on which the current print process is executing. Then, a custom print processor 2314 proceeds to read the spool file 2310 from the disk or memory 2312. The custom print processor 2314 is a process implemented in software, hardware, or a combination of both. The custom print processor 2314 communicates with the custom printer driver 2316.

The custom printer driver 2316 operates as a front end to the custom print processor 2314. The custom printer driver 2316 holds user customizable settings and instructions that are processed by the custom print processor 2314 during print processing. For example, the custom printer driver 2316 holds information regarding where (a directory path) the custom print processor 2314 writes output files. The custom printer driver 2316 also holds information regarding the format—text or EMF or both—of the custom print processor 2314 output files. The custom printer driver 2316 also holds instructions regarding when the custom print processor 2314 generates output files of a particular format. An example of such instructions are: if the destination template does not require extraction of images from the source document, then generate an output file in text format; if the destination template requires extraction of images from the source document, then generate an output file in EMF format.

FIG. 23 also shows a connection between the custom printer driver 2316 and the application 2302. This connection illustrates an interface in the application 2302 that allows the user of the system of the present invention to input user customizable settings for the custom print processor 2314 via the custom printer driver 2316. In an example, the user is provided with a dialog box via the application 2302 for inputting such settings as: location of output file, format of output file and instructions on when to use certain output file formats.

Returning to the custom print processor 2314, the custom print processor 2314 disassembles the spool file 2310 and the individual instructions on how to render certain print objects on a particular printer are read. Then, the custom print processor 2314 produces an output file 2318 containing the information in the spool file 2310. The format of the output file 2318 is dependant on the user customizable settings that are specified at the custom printer driver 2316, as described in greater detail above. In one example, if the destination template requires only text information, then an output file 2318 is generated in text format; if the destination template requires image information, then an output file 2318 in EMF format is generated.

Next, the output file 2318 is sent to the post processor 2320. The post processor 2320 encompasses any of the pre-printing processes of the present invention, as described in greater detail above. In one embodiment of the present invention, post processor 2320 encompasses the processes performed by the mapper 106, as described in step 214 of FIG. 2. In another embodiment of the present invention, post processor 2320 encompasses the processes performed by the converter 1106 of FIG. 11. In another embodiment of the present invention, post processor 2320 encompasses the processes performed by the search module 1808 of FIG. 18. In another embodiment of the present invention, post processor 2320 encompasses a process by which the text information in output file 2318 in EMF or text format is translated into a different language.

In the embodiment where the post processor 2320 encompasses the processes performed by the mapper 106, as described in step 214 of FIG. 2, information from the output file 2318 in EMF or text format is garnered using a source template 912 (see FIG. 9). During the process, coordinate information within the output file 2318 in EMF or text format is used. An EMF file contains coordinate information corresponding to text described in the EMF file. The coordinate information provides data as to the location of the corresponding text in the final printed document. The source template 912 includes coordinate information regarding the location of desired text in the source document. Thus, the coordinate information in the output file 2318 is matched with the coordinate information in the source template 912 to garner the desired text from the output file 2318. No additional information, such as a special font used in the output file 2318, is needed for garnering the desired text from the output file 2318.

Subsequent to post processing, the post processor 2320, sends the resulting data to the standard print process 2321. The standard print process 2321 is the conventional print process described in FIG. 21. The standard print process 2321 results in the printing of the data at the printer 2322.

In an embodiment of the present invention, the output file 2318 can be distributed over a network via email, FTP, virtual networking or any other mechanism for transferring information over a network. The conventional process for sending a document over a network is to save the document in a word processing format, such as Portable Document Format (PDF). Saving certain data, such as graphics, in PDF format is a lossy procedure. Subsequently, the document is transferred over a network. The recipient then receives the document and prints it out. During printing, the document is converted back to an EMF format. The conventional process described, however, incurs inefficiencies as the document must be converted from EMF to PDF and then back to EMF. Each conversion can be lossy, which results in an overall degradation of information quality over the whole process. In this embodiment, the transferring of a document in EMF format eliminates the information quality degradation problem described above.

In an embodiment of the present invention, the output file 2318 can be transferred over a network for printing purposes. In this embodiment, a user on a remote network generates an output file 2318 in EMF format and transfers the output file 2318 to another network for printing. This is advantageous as an EMF file, as opposed to a PDF file, retains high information quality (no degradation). In another embodiment of the present invention, EMF files transferred over a network for printing are compressed before transmission. This is advantageous as it allows for a reduction in network traffic for remote printing.

The foregoing aspects of the present invention, namely the use of the custom print processor 2314, are advantageous because it is not necessary to return the print data to the GDI module 2306 before further processing. The conventional print process as described in FIG. 21 shows that the print processor 22114 must return the print data to the GDI module 2106 before it is processed and sent to the printer 2116. In the present invention, the custom print processor 2314 processes the print data and then sends it to the post processor 2320 for further processing before it is subsequently printed. Thus, it is not necessary to send the print data back to the GDI module 2106 before it is processed and sent to the printer 2116. This results in a more efficient print process as it reduces the processing requirements and processing time.

In addition, the foregoing aspects of the present invention, namely the use of an EMF or text file 2320, are advantageous because the parsing of an EMF or text file 2320 requires less processing then the use of Optical Character Recognition (OCR) on a print stream. In addition, the parsing of an EMF file is completely reliable, as opposed to the use of OCR, which typically has an error rate associated with it. In an embodiment of the present invention, the parser 910, as described in FIG. 9, performs OCR on a print stream in order to extract information for further processing. In another embodiment of the present invention, however, an EMF or text file 2320 is parsed for the desired information, which is then extracted. Thus, the process of parsing of an EMF or text file 2320 for extracting information results in a more efficient system for extracting information.

Figure 24A:
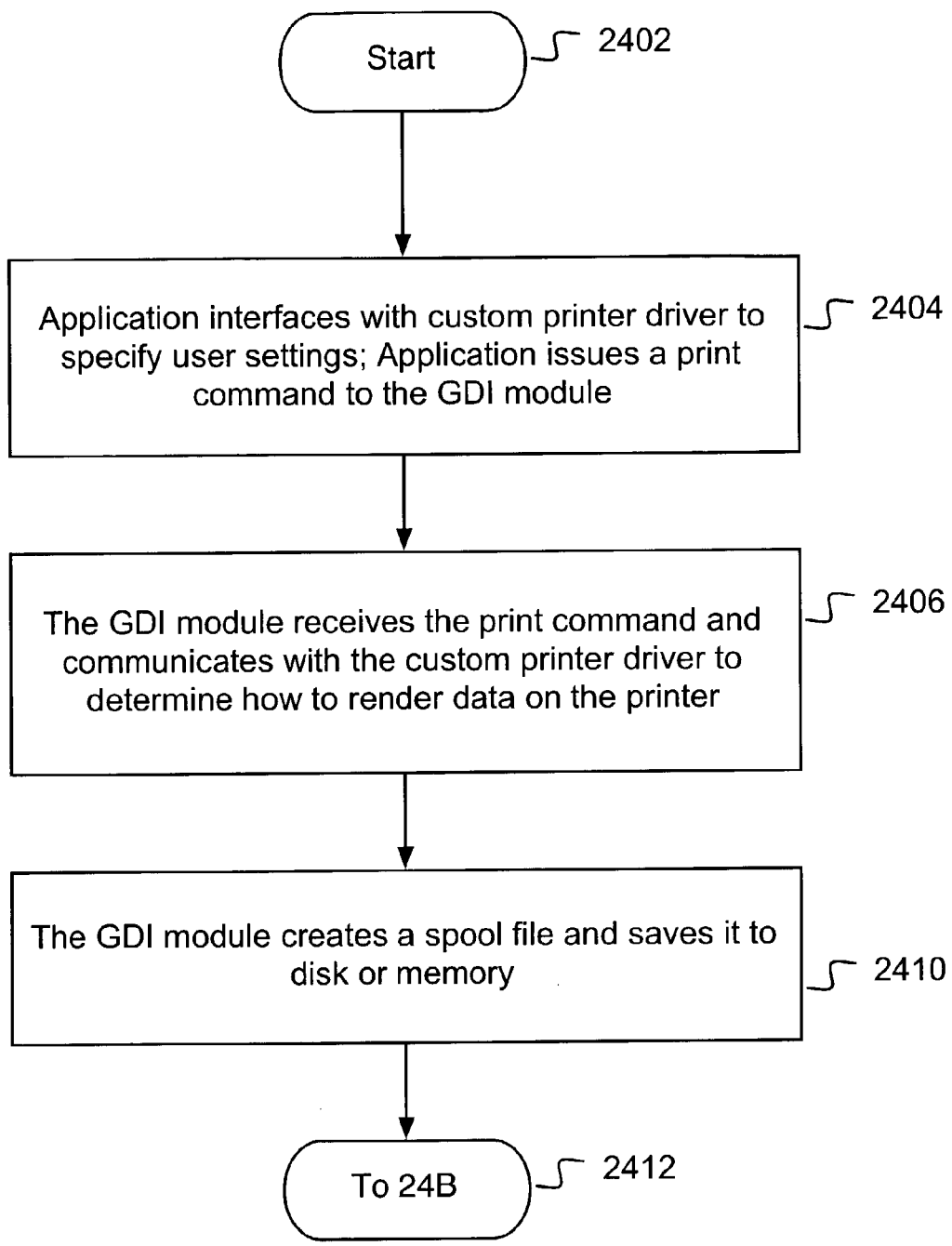
FIG. 24A and FIG. 24B are a flowchart depicting the operation and control flow of the printing process according to the embodiment of FIG. 23.
Figure 24B:
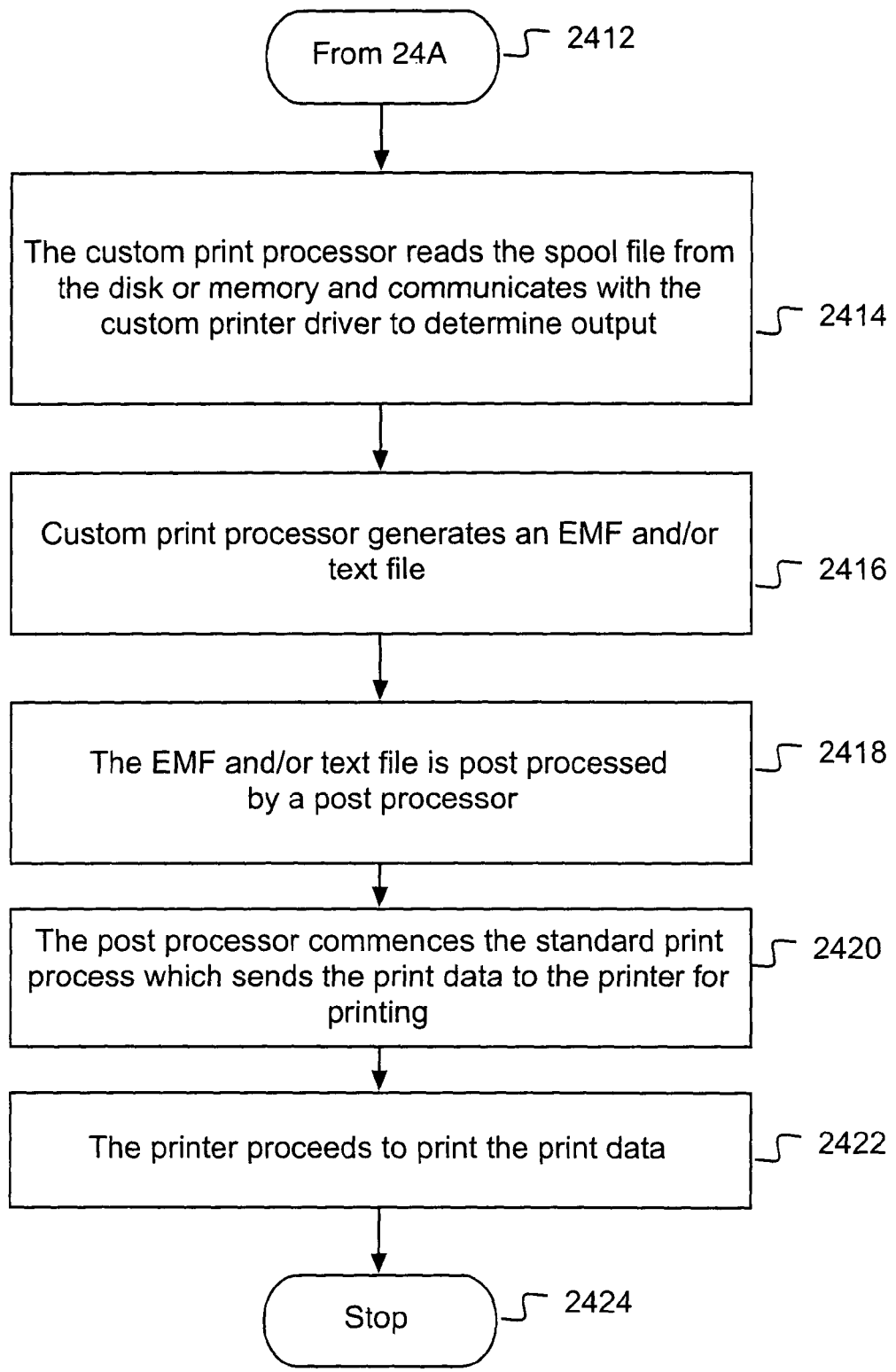

FIG. 24A and FIG. 24B are a flowchart depicting the operation and control flow of the printing process according to the embodiment of FIG. 23. The control flow of FIG. 24A and FIG. 24B begins with step 2402 and proceeds directly to step 2404. In step 2404, application 2302 issues a print command to GDI 2306 pertaining to a document. Application 2302 creates a device context and writes the objects of the document (images, text, and more) to the device context. Application 2302 calls the GDI 2306 with the print command for a particular printer (printer 2322, corresponding to printer 108 of FIG. 1) using the device context. Also in step 2404, the application 2302 interfaces with the custom printer driver 2316 to read the user specified settings used during print processing. The user specified settings are described in greater detail above.

In step 2406, GDI 2306 receives the print command and calls the custom printer driver 2316 with a request for instructions on how to render on printer 2322.the objects that were written to the device context. The custom printer driver 2316 returns instructions to the GDI 2306 on how to render on printer 2322 the objects that were written to the device context.

In step 2410, the GDI 2306 proceeds to generate a spool file 2310 written in a condensed format. Next, the GDI 2306 writes the spool file 2310 to a disk or memory 2312, which resides on the computer system on which the current print process is executing. Step 2412 of FIG. 24A corresponds to step 2412 of FIG. 24B. The control flow of FIG. 24A proceeds directly to FIG. 24B via step 2412.

In step 2414, a custom print processor 2314 proceeds to read the spool file 2310 from the disk or memory 2312. The custom print processor 2314 also communicates with the custom printer driver 2316 with regards to instructions on how to produce output files. As explained above, the custom printer driver 2316 holds user customizable settings and instructions that are processed by the custom print processor 2314 during print processing.

In step 2416, the custom print processor 2314 disassembles the spool file 2310 and the individual instructions on how to render certain print objects on a particular printer are read. Then, the custom print processor 2314 produces an output file 2318 containing the information in the spool file 2310. The format of the output file 2318 is dependant on the user customizable settings that are specified at the custom printer driver 2316, as described in greater detail above. In one example, if the destination template requires only text information, then an output file 2318 is generated in text format; if the destination template requires image information, then an output file 2318 in EMF format is generated.

In step 2418, the output file 2318 is sent to the post processor 2320. As explained above, the post processor 2320 encompasses pre-printing processes of the present invention, such as the mapper 106, the converter 1106 and the search module 1808. In step 2420, subsequent to post processing, the post processor 2320 sends the resulting data to the standard print process 2321. The standard print process 2321 is the conventional print process described in FIG. 21. The standard print process 2321 results in the printing of the data at the printer 2322 in step 2422. In step 2424, the control flow of FIG. 24A and FIG. 24B ceases.

XI. Font Pitch Adjustment During the Print Process

Figure 25:
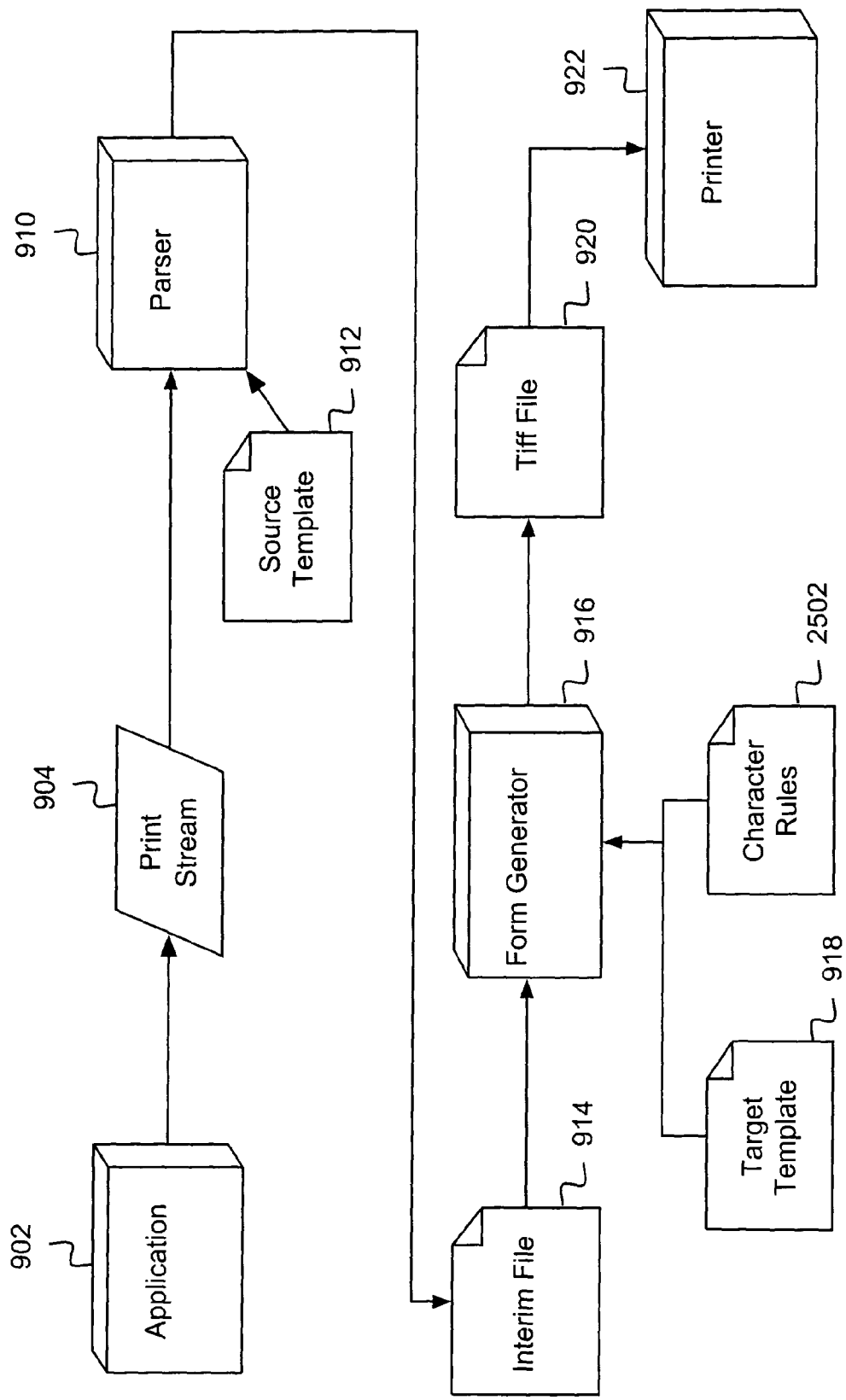
FIG. 25 is a functional diagram illustrating the font pitch adjustment process of one embodiment of the present invention.

FIG. 25 is a functional diagram illustrating the font pitch adjustment process of one embodiment of the present invention. FIG. 25 provides more detail of the process represented by step 214 of FIG. 2 (the step describing the generation of the target document by the mapper module 106). FIG. 25 shows that an application 902 (see FIG. 9), corresponding to application 104 (see FIG. 1), has sent a print stream 904 containing a source document. The print stream 904 is subsequently captured by the mapper 106. Mapper 106 is represented in FIG. 25 by functional block 910 representing the parser function and functional block 916 representing the form generating function.

The first operation performed by mapper 106 is the parsing of the print stream 904 by parser 910 using the source template 912, which was defined in the process of FIG. 3. In an embodiment of the present invention, parser 910 converts the format of the print stream 904 to a TIFF file format before parsing. In any event, the product of the operation of parser 910 is an interim file 914 containing the content that has been extracted from the print stream 904 in accordance with the source template 912. In an embodiment of the present invention, interim file 914 is a text file containing a list of source zones and the content contained in each source zone. In this embodiment, the interim file 914 is similar to the example source template file in text format shown above in the section entitled Source Template.

Form generator 916 receives interim file 914 and proceeds to populate the target template 918 using the content contained in interim file 914. The target template 918 defines the manner and format in which the content is entered into the specified target zones of the target template 918, as described in FIG. 6 above. In addition, the form generator 916 determines the type of each character in the interim file 914 using a character rule file 2502. The character rule file 2502 specifies rules that define the different types of characters and the desired font pitch of each type of character. Further, the form generator 916 adjusts the font pitch of the characters in the target document according to the determinations made above and the character rule file 2502. The font pitch adjustment process is described in greater detail below.

The product of form generator 916 is a TIFF file 920. The TIFF file 920 is then sent to printer 922 for printing. In an embodiment of the present invention, the form generator 916 spools the TIFF file 920 before it is released to the printer 922. Consequently, the spool file is released to the printer 922 at a predetermined rate in order to regulate the rate of printing by the printer 922. For example, the spool file can be released to the printer 922 at a slower-than-normal rate in order to slow the rate of printing by the printer 922. The decrease in printing rate by the printer 922 provides the benefit of accelerating fuser heat degradation in the printer 922. This is beneficial as it decreases the amount of maintenance needed by the printer 922 and prolongs the life of the printer 922.

Figure 26:
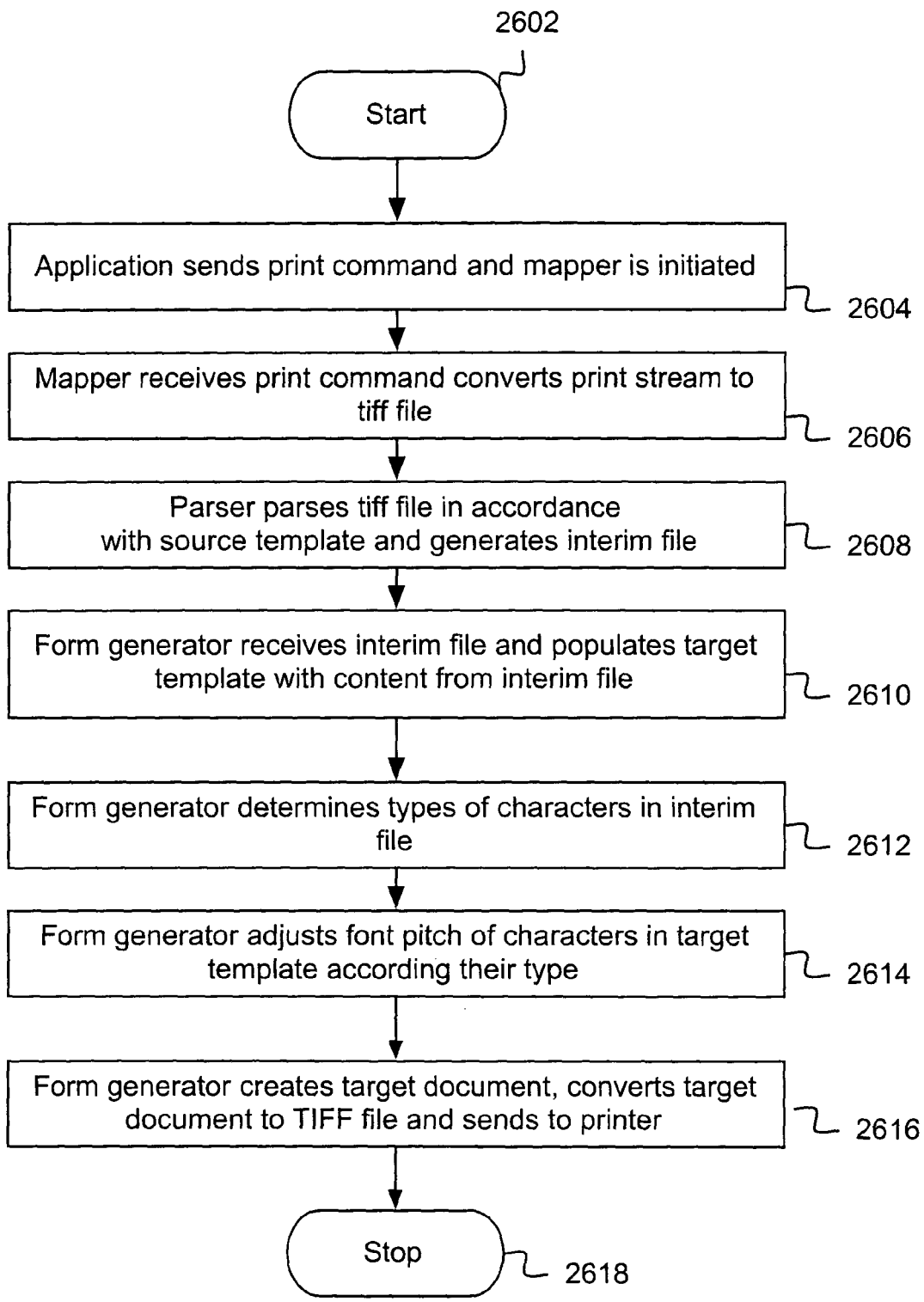
FIG. 26 is a flowchart depicting the operation and control flow of the embodiment of FIG. 25.

FIG. 26 is a flowchart depicting the operation and control flow of the embodiment of FIG. 25. FIG. 26 provides additional detail of the process represented by step 214 of FIG. 2. The control flow of FIG. 26 begins with step 2602 and flows directly to step 2604. In step 2604, the application 902 sends a print command and a print stream 904 is transmitted. Subsequently, the mapper 106 is initiated. In step 2606 the parser 910 of mapper 106 receives the print stream 904 and the parser 910 converts the format of the print stream 904 to a TIFF file format before parsing.

In step 2608, the parser 910 of mapper 106 parses the print stream 904 in accordance with a predefined source template 912. In this step, the parser 910 performs Optical Character Recognition (OCR) procedures on Text Zones of the source document as defined by the source template 912. Alternatively, the parser 910 extracts text from Text Zones of the source document in EMF format, as defined by the source template 912. In addition, the parser 910 generates image format copies for all other specified source zones of the source document as defined by the source template 912. Consequently, the output of step 2608 is an interim file 914 that contains all content (image, text, and more) extracted from the source document.

In step 2610, the form generator 916 receives interim file 914. The form generator 916 determines from the interim file 914 the target template 918 to use in generating a target document. The form generator 916 makes this determination by reviewing the text found in a Key Zone or related source zone in the source document. The form generator 916 subsequently attempts to match the text extracted from a Key Zone in the source document with text defined in target templates 918. Once a match is made, the corresponding target template 918 is used to create the target document. This is useful when there are multiple target templates 918 defined for target documents. The form generator 916 of mapper 106 produces a target document by populating the target zones of target template 918 using the content in interim file 914, as specified by the target template 918.

In step 2612, the form generator 916 determines the type of each character in the interim file 914 using a character rule file 2502. The character rule file 2502 specifies rules that define the different types of characters and the desired font pitch of each type of character. The character rule file 2502 is described in greater detail below. Generally, the form generator 916 distinguishes between two types of characters: those characters for which a variable pitch font is used and those characters for which a fixed pitch font is used.

In one example, the form generator 916 distinguishes between alphabetical characters (i.e., the letters A-Z in both the lower and upper case) and numerical characters (i.e., the numbers 0-9). In this example, a variable pitch font is used for the alphabetical characters and fixed pitch font is used for numerical characters. In another example, the form generator 916 distinguishes between currency/item number characters (e.g., $, £, DM, and more) and all other characters. In this example, a fixed pitch font is used for currency/item number characters—including those characters immediately following the currency/item number characters—and a variable pitch font is used for the remaining characters.

In step 2614, the form generator 916 adjusts the font pitch of the characters in the target document according to the determinations made above and the character rule file 2502. Thus, in the examples given above, the form generator 916 adjusts the font pitch of the characters in the target document to be a variable font pitch or a fixed font pitch according to the rules defined in the character rule file 2502.

In step 2616, the form generator 916 converts the target document to a final format, such as a TIFF file 920. In an embodiment of the present invention, the form generator 916 may also convert the target document into a printer format that is supported by printer 922, such as an EMF or other graphical format. In this case, the form generator 916 converts the target document into a printer format that is supported by printer 922. Then, the form generator 916 sends the TIFF file 920 to the printer 922 for printing. Subsequently, the printer 922 receives the TIFF file 920 and proceeds to print the file. In step 2618, the control flow of FIG. 26 ceases.

FIG. 27 is a representation of a source document 2700 in one embodiment of the present invention. As described above, a source document is any document that is printed from application 104. Specifically, a source document is a document that contains financial or account information that the user 102 desires to access. In FIG. 27, the source document 2700 is an account statement that is printed from a financial management software application, such as QuickBooks.

The source document 2700 is a standard account statement. The source document 2700 shows a sender address 2702 and other informational text 2704. The source document 2700 also shows a table including a statement of customer account activities. The table includes a date column 2706 for showing the date of each transaction, an invoice column 2708 for showing the invoice number of each transaction, an amount column 2710 for showing the amount the customer is being charged for each transaction, a payments column 2712 for showing any payments the customer has made, and an amount owed column 2714 for showing the amount owed by the customer at any given date. Lastly, the source document 2700 shows a totals row for showing the totals for columns 2710, 2712 and 2714.

Note that text areas 2702 and 2704 include standard text for simple reading and it is not necessary for these text areas to use a fixed pitch font because the alignment of the data in these areas is not desired. Therefore, in these areas, a variable pitch font can be used. A variable pitch font is pleasing to a readers eye when reading information that does not necessitate alignment of data spanning multiple rows.

Conversely, note that the data in columns 2706, 2708, 2710, 2712 and 2714 is numerical naturally lends itself to be aligned. Because the data in these columns is numerical in nature (also including currency information) and spans multiple rows, the alignment of the data in these columns makes it easier to read and absorb. Therefore, in these columns, a fixed pitch font can be used.

Figure 28:
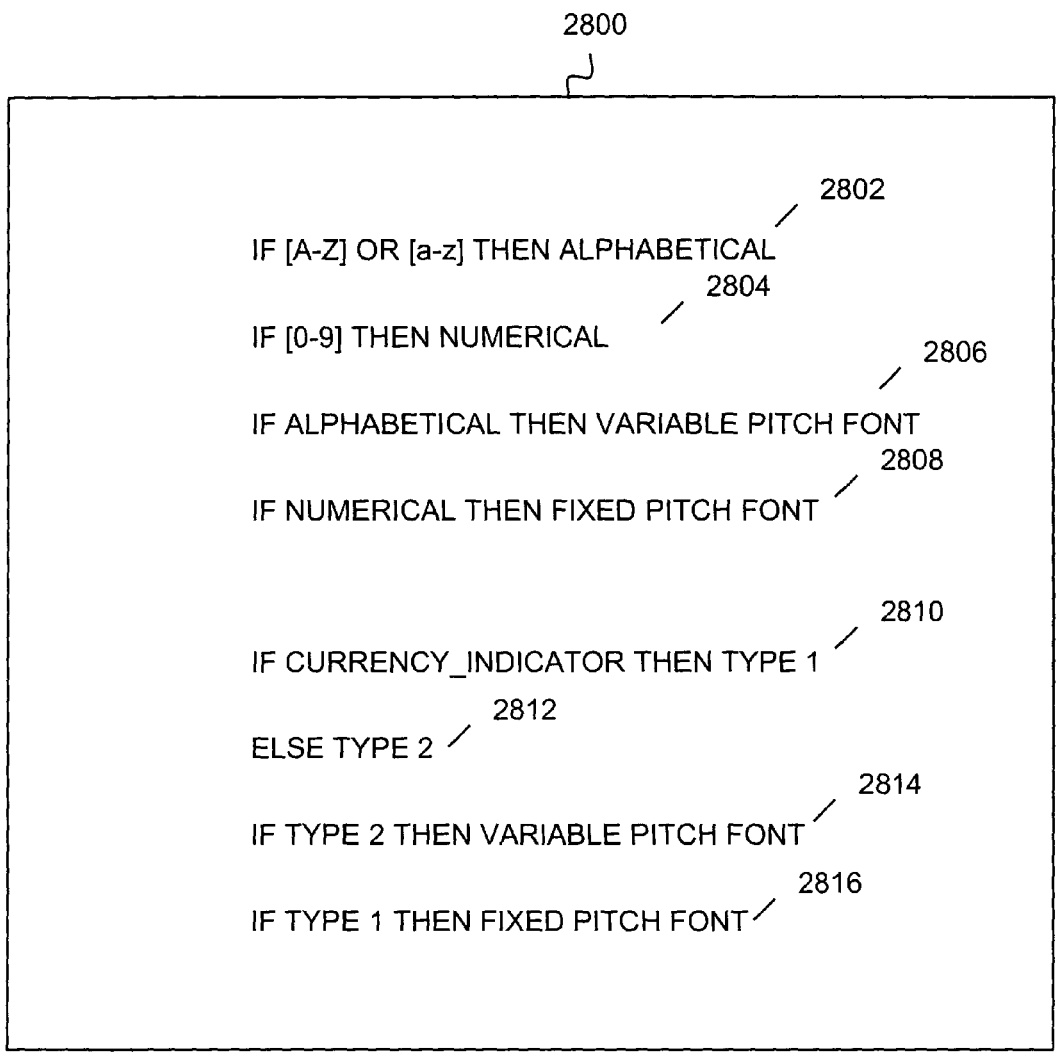
FIG. 28 is a representation of a character rule file in one embodiment of the present invention.

FIG. 28 is a representation of a character rule file 2800 in one embodiment of the present invention. As explained above, in step 2612 of FIG. 26, the form generator 916 determines the type of each character in the interim file 914 using a character rule file 2502. The character rule file 2502 specifies rules that define the different types of characters and the desired font pitch of each type of character. Generally, the form generator 916 distinguishes between two types of characters using the character rule file 2502: those characters for which a variable pitch font is used and those characters for which a fixed pitch font is used.

FIG. 28 shows a character rule file 2800 written in pseudo code. The pseudo code of character rule file 2800 includes a set of rules that 1) determine the type of character for each character in the target document and 2) determines which font pitch corresponds to each type of font pitch. For example, rule 2802 shows that certain characters (the letters A-Z in both the lower and upper case) are deemed to be alphabetical characters. Likewise, rule 2804 shows that certain characters (i.e., the numbers 0-9) are deemed to be numerical characters. Further, rule 2806 shows that a variable pitch font is used for the alphabetical characters. Also, rule 2808 shows that a fixed pitch font is used for numerical characters.

In another example, rule 2810 shows that currency indicating characters (e.g., $, £, DM, and more) are deemed to be characters of type 1. Likewise, rule 2812 shows that all other characters are deemed to be of type 2. Further, rule 2814 shows that a variable pitch font is used for characters of type 2. Also, rule 2816 shows that a fixed pitch font is used for characters of type 1—including those characters immediately following the currency characters.

Therefore, using the character rules above, the form generator 916 can adjust the font pitch of information in the target document to show certain data aligned properly. Further, the use of character rules allows for customization of alignment rules. For example, using rules 2802 to 2808 on the source document 2700 of FIG. 27, all of the data in columns 2706, 2708, 2710, 2712 and 2714, except the "$" characters would be aligned using a fixed width font. In another example, using rules 2810 to 2816 on the source document 2700, only the data in columns 2710, 2712 and would be aligned using a fixed width font because all of the items in those columns include the currency indicator "$".

XII. Floating Line Identification

Figure 29:
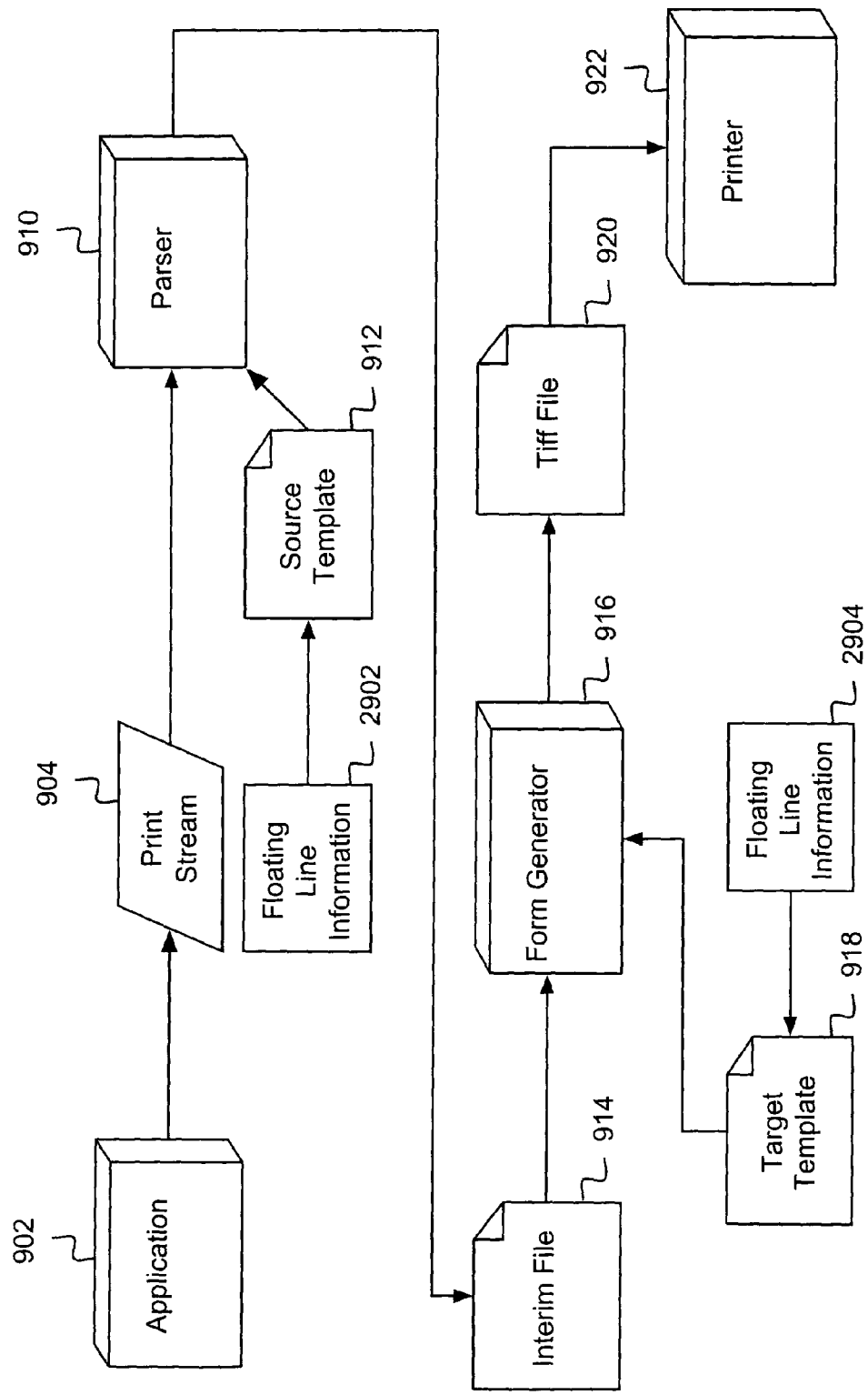
FIG. 29 is a functional diagram illustrating the floating line determination process of one embodiment of the present invention.

FIG. 29 is a functional diagram illustrating the floating line determination process of one embodiment of the present invention. FIG. 29 provides more detail of the process represented by step 214 of FIG. 2 (the step describing the generation of the target document by the mapper module 106). FIG. 29 shows that an application 902 (see FIG. 9), corresponding to application 104 (see FIG. 1), has sent a print stream 904 containing a source document. The print stream 904 is subsequently captured by the mapper 106. Mapper 106 is represented in FIG. 29 by functional block 910 representing the parser function and functional block 916 representing the form generating function.

The first operation performed by mapper 106 is the parsing of the print stream 904 by parser 910 using the source template 912, which was defined in the process of FIG. 3. In addition to defining the location of content in print stream 904, the source template 912 defines the location of floating lines in the print stream 904, using floating line information 2902. A floating line is a final row in a column or a series of columns that contains additional information, such as a "Total" row. These rows are called floating lines because the location of these rows, or lines, is dependant on the amount of information in the column. That is, the row position of a floating line depends on the length of the column of which it is a member.

In an embodiment of the present invention, parser 910 converts the format of the print stream 904 to a TIFF file format before parsing. In any event, the product of the operation of parser 910 is an interim file 914 containing the content that has been extracted from the print stream 904 in accordance with the source template 912. In an embodiment of the present invention, interim file 914 is a text file containing a list of source zones and the content contained in each source zone. In this embodiment, the interim file 914 is similar to the example source template file in text format shown above in the section entitled Source Template.

Form generator 916 receives interim file 914 and proceeds to populate the target template 918 using the content contained in interim file 914. The target template 918 defines the manner and format in which the content is entered into the specified target zones of the target template 918, as described in FIG. 6 above.

In addition, the form generator 916 identifies floating lines in the interim file 914 as parsed by the parser 910 according to the source template 912. Further, the form generator 916 adjusts the location of floating line data in the target document according to the target template 918. In addition to defining the location of content in the target document, the target template 918 defines the location of floating line data in the target document, using floating line information 2904. The floating line determination process is described in greater detail below.

The product of form generator 916 is a TIFF file 920. The TIFF file 920 is then sent to printer 922 for printing.

Figure 30:
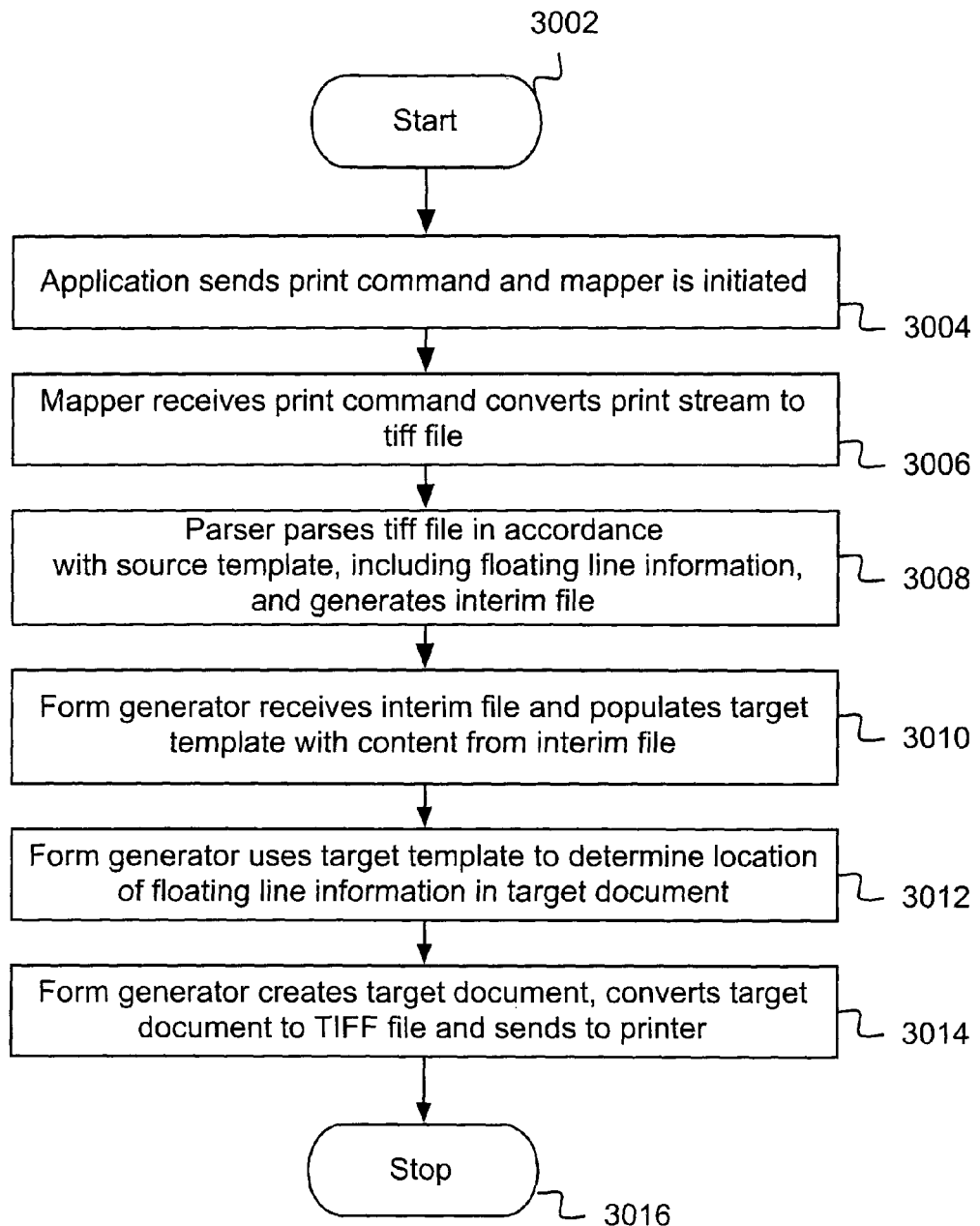
FIG. 30 is a flowchart depicting the operation and control flow of the embodiment of FIG. 29.

FIG. 30 is a flowchart depicting the operation and control flow of the embodiment of FIG. 29. FIG. 30 provides additional detail of the process represented by step 214 of FIG. 2. The control flow of FIG. 30 begins with step 3002 and flows directly to step 3004. In step 3004, the application 902 sends a print command and a print stream 904 is transmitted. Subsequently, the mapper 106 is initiated. In step 3006 the parser 910 of mapper 106 receives the print stream 904 and the parser 910 converts the format of the print stream 904 to a TIFF file format before parsing.

In step 3008, the parser 910 of mapper 106 parses the print stream 904 in accordance with a predefined source template 912. In this step, the parser 910 performs Optical Character Recognition (OCR) procedures on Text Zones of the source document as defined by the source template 912. Alternatively, the parser 910 extracts text from Text Zones of the source document in EMF format, as defined by the source template 912. In addition, the parser 910 generates image format copies for all other specified source zones of the source document as defined by the source template 912. Consequently, the output of step 3008 is an interim file 914 that contains all content (image, text, and more) extracted from the source document.

It should be noted that the source template 912 also includes floating line information 2902, which defined floating line information in the source document. As explained above, a floating line is a final row in a column or a series of columns that contains additional information, such as a "Total" row. Thus, the row position of a floating line depends on the length of the column of which it is a member. In addition, the row of a floating line can span more than one column. That is, a floating line row can be located underneath more than one column. This is explained in greater detail below in FIG. 31.

A floating line is defined as part of a table object in a Table Zone defined in the source template 912 (see Source Template section above). A table object in a Table Zone includes one or more columns, each column including multiple rows. A floating line is defined as a part of, namely a row of, a table object. Floating line information 2902 includes the starting column of the floating line row and the end column of the floating line row. Additionally, the floating line information 2902 includes a keyword, such as "Total," for identifying the floating line. The keyword is identified using OCR by the parser 910.

In step 3010, the form generator 916 receives interim file 914. The form generator 916 determines from the interim file 914 the target template 918 to use in generating a target document. The form generator 916 makes this determination by reviewing the text found in a Key Zone or related source zone in the source document. The form generator 916 subsequently attempts to match the text extracted from a Key Zone in the source document with text defined in target templates 918. Once a match is made, the corresponding target template 918 is used to create the target document. This is useful when there are multiple target templates 918 defined for target documents. The form generator 916 of mapper 106 produces a target document by populating the target zones of target template 918 using the content in interim file 914, as specified by the target template 918.

In step 3012, the form generator 916 determines the location of floating line information in the interim file 914. In this step, the floating line information is placed in the appropriate location in the table of which it is a member, according to the specification of the target template 918. Specifically, the target template 918 includes a Table Zone that specifies how the data in the table of the floating line will be arranged in the target document (see Target Template section above). The target template 918 can also include options as to how and where floating line information may be placed in the table of which it is a member.

In one example, the target template 918 includes instructions to place floating line data, such as a total number, at the bottom of a table having multiple columns, but not under any one column. In this example, the total number would be placed at the bottom of the table after all other table information is placed. In addition, the total number would not be placed under any particular column of the table, but rather in another format, such as centered underneath the table. In another example, the target template 918 includes instructions to place floating line data, such as a total number, as the last item of a column of a table having multiple columns. In this example, the total number would be placed as the last item of the column to which the value logically belongs in the table.

In step 3014, the form generator 916 converts the target document to a final format, such as a TIFF file 920. In an embodiment of the present invention, the form generator 916 may also convert the target document into a printer format that is supported by printer 922, such as an EMF or other graphical format. In this case, the form generator 916 converts the target document into a printer format that is supported by printer 922. Then, the form generator 916 sends the TIFF file 920 to the printer 922 for printing. Subsequently, the printer 922 receives the TIFF file 920 and proceeds to print the file. In step 3016, the control flow of FIG. 30 ceases.

FIG. 31 is a representation of a source document 3100 in one embodiment of the present invention. As described above, a source document is any document that is printed from application 104. Specifically, a source document is a document that contains financial or account information that the user 102 desires to access. In FIG. 31, the source document 3100 is an account statement that is printed from a financial management software application, such as QuickBooks.

The source document 3100 is a standard account statement. The source document 3100 shows a sender address 3102 and other informational text 3104. The source document 3100 also shows a table including a statement of customer account activities. The table includes a date column 3106 for showing the date of each transaction, an invoice column 3108 for showing the invoice number of each transaction and an amount column 3110 for showing the amount the customer is being charged for each transaction. Lastly, the source document 3100 shows a total row 3112 (a floating line) for showing the total for column 3110.

Note that the row (or vertical) location of floating row 3112 is dependant on the amount of information in the columns 3106, 3108 and 3110. That is, if there are only a few rows of information in the columns 3106, 3108 and 3110, then floating row 3112 is located higher up in the source document 3100. Likewise, if there are many rows of information in the columns 3106, 3108 and 3110, then floating row 3112 is located lower down in the source document 3100. Also note that floating row 3112 spans columns 3106, 3108 and 3110. That is, the width of floating row 3112 spans the width of all columns 3106, 3108 and 3110.

The information in the floating row 3112, however, is pertinent only to the column 3110. Thus, as described with reference to FIG. 30 above, the target template 918 would preferably include instructions to place the floating line data as the last item of column 3110, the column to which the value logically belongs in the table. Lastly, note that floating row 3112 includes a keyword "Total," which is used for identifying a floating row by the form generator 916.

XII. Floating Zone Identification

Figure 32:
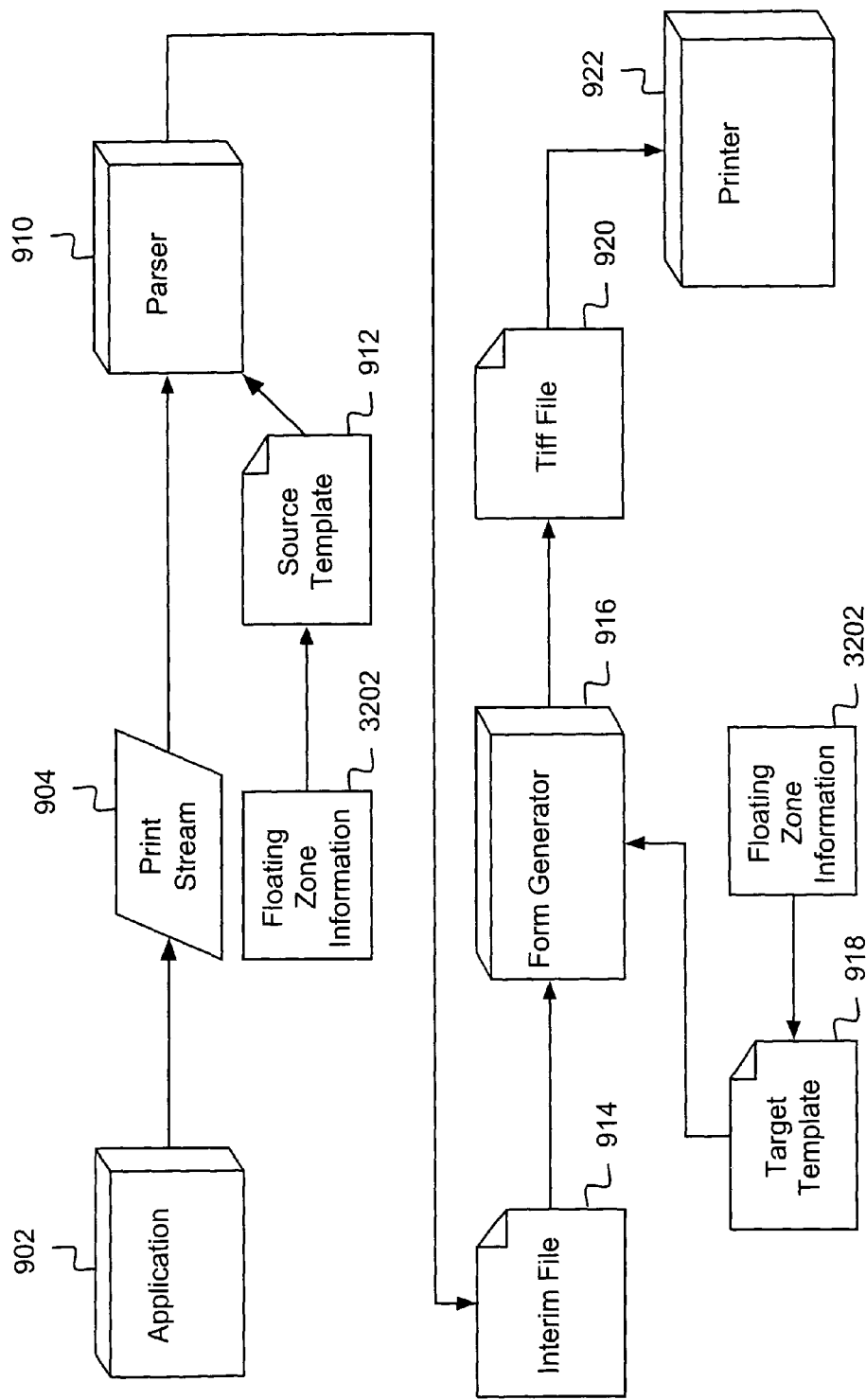
FIG. 32 is a functional diagram illustrating the floating zone determination process of one embodiment of the present invention.

FIG. 32 is a functional diagram illustrating the floating zone determination process of one embodiment of the present invention. FIG. 32 provides more detail of the process represented by step 214 of FIG. 2 (the step describing the generation of the target document by the mapper module 106). FIG. 32 shows that an application 902 (see FIG. 9), corresponding to application 104 (see FIG. 1), has sent a print stream 904 containing a source document. The print stream 904 is subsequently captured by the mapper 106. Mapper 106 is represented in FIG. 32 by functional block 910 representing the parser function and functional block 916 representing the form generating function.

The first operation performed by mapper 106 is the parsing of the print stream 904 by parser 910 using the source template 912, which was defined in the process of FIG. 3. In addition to defining the location of content in print stream 904, the source template 912 defines the location of floating zones in the print stream 904, using floating zone information 3202. A floating zone is a group of text or images that is not located in a constant position in the source document. Zones such as these are called floating zones because the location of these zones is dependant on the location and/or size of other zones. That is, the physical position of a floating zone depends on the physical position and/or size of adjacent zones in the source document. For example, a first zone may be required to be located one inch below a second zone. The size of the second zone is variable such that its length may vary according to the amount of data in the second zone. In this example, if the location of the first zone is dependant on the length of the second zone.

In an embodiment of the present invention, parser 910 converts the format of the print stream 904 to a TIFF file format before parsing. In any event, the product of the operation of parser 910 is an interim file 914 containing the content that has been extracted from the print stream 904 in accordance with the source template 912. In an embodiment of the present invention, interim file 914 is a text file containing a list of source zones and the content contained in each source zone. In this embodiment, the interim file 914 is similar to the example source template file in text format shown above in the section entitled Source Template.

Form generator 916 receives interim file 914 and proceeds to populate the target template 918 using the content contained in interim file 914. The target template 918 defines the manner and format in which the content is entered into the specified target zones of the target template 918, as described in FIG. 6 above.

In addition, the form generator 916 identifies floating zones in the interim file 914 as parsed by the parser 910 according to the source template 912. Further, the form generator 916 adjusts the location of floating zone data in the target document according to the target template 918. In addition to defining the location of content in the target document, the target template 918 defines the location of floating zone data in the target document, using floating zone information 3204. The floating zone determination process is described in greater detail below.

The product of form generator 916 is a TIFF file 920. The TIFF file 920 is then sent to printer 922 for printing.

Figure 33:
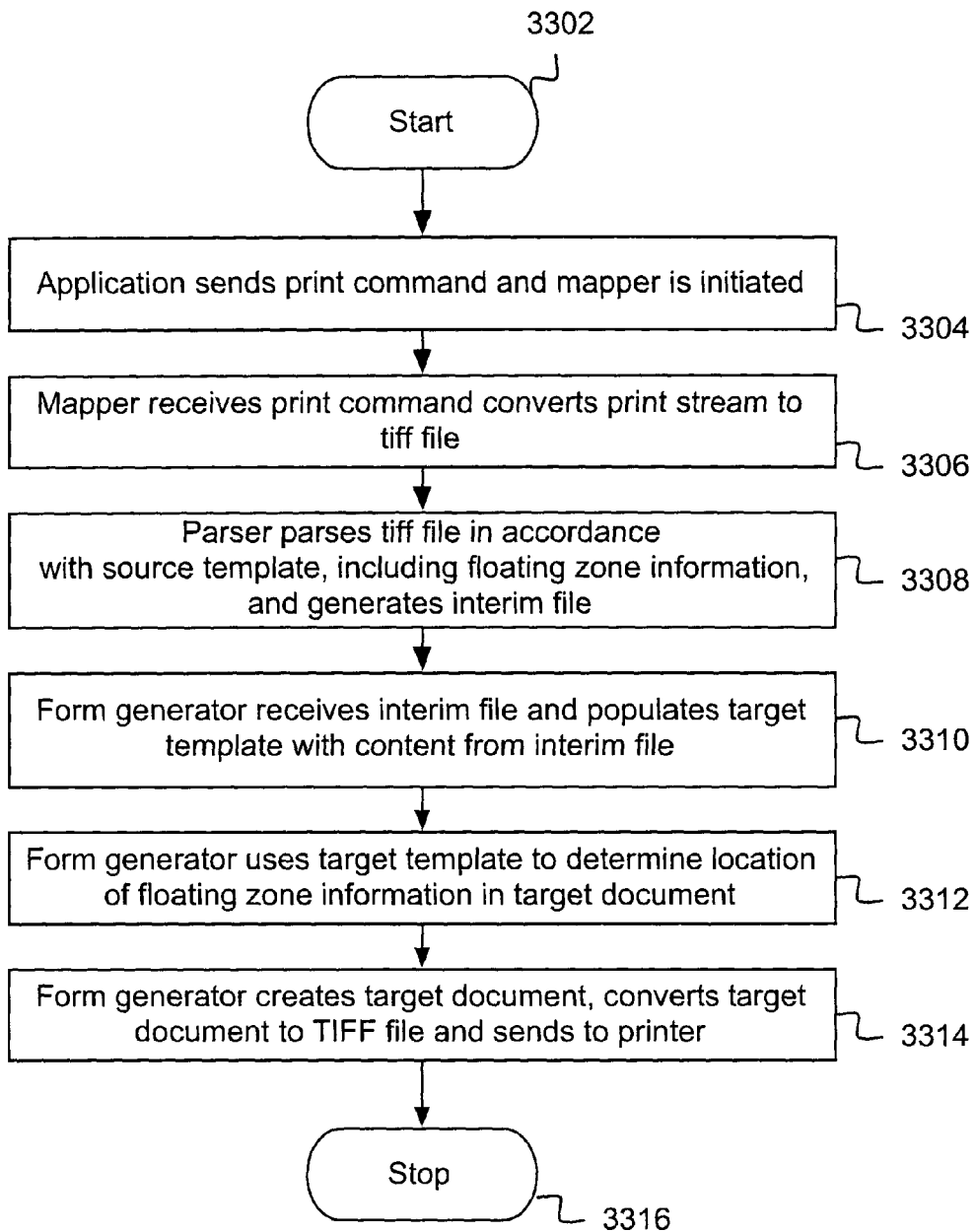
FIG. 33 is a flowchart depicting the operation and control flow of the embodiment of FIG. 32.

FIG. 33 is a flowchart depicting the operation and control flow of the embodiment of FIG. 32. FIG. 33 provides additional detail of the process represented by step 214 of FIG. 2. The control flow of FIG. 33 begins with step 3302 and flows directly to step 3304. In step 3304, the application 902 sends a print command and a print stream 904 is transmitted. Subsequently, the mapper 106 is initiated. In step 3306 the parser 910 of mapper 106 receives the print stream 904 and the parser 910 converts the format of the print stream 904 to a TIFF file format before parsing.

In step 3308, the parser 910 of mapper 106 parses the print stream 904 in accordance with a predefined source template 912. In this step, the parser 910 performs OCR procedures on Text Zones of the source document as defined by the source template 912. In addition, the parser 910 generates image format copies for all other specified source zones of the source document as defined by the source template 912. Consequently, the output of step 3308 is an interim file 914 that contains all content (image, text, and more) extracted from the source document.

It should be noted that the source template 912 also includes floating zone information 3202, which defines floating zone information in the source document. As explained above, a floating zone is a group of text or images that is not located in a constant position in the source document. This is explained in greater detail below in FIG. 33.

A floating zone is defined as part of an object such as a Floating Zone defined in the source template 912. A Floating Zone includes a group of text or images that is located in variable locations, depending on another object such as another zone. Floating zone information 3202 includes the location of the floating zone, in relation to another object, such as another zone. For example, floating zone information 3202 may specify that a floating zone is located a certain distance below another zone.

In step 3310, the form generator 916 receives interim file 914. The form generator 916 determines from the interim file 914 the target template 918 to use in generating a target document. The form generator 916 makes this determination by reviewing the text found in a Key Zone or related source zone in the source document. The form generator 916 subsequently attempts to match the text extracted from a Key Zone in the source document with text defined in target templates 918. Once a match is made, the corresponding target template 918 is used to create the target document. This is useful when there are multiple target templates 918 defined for target documents. The form generator 916 of mapper 106 produces a target document by populating the target zones of target template 918 using the content in interim file 914, as specified by the target template 918.

In step 3312, the form generator 916 determines the location of floating zone information in the interim file 914. In this step, the floating zone information is placed in the appropriate location, in relation to another object such as another zone, according to the specification of the target template 918. Specifically, the target template 918 includes a Floating Zone that specifies how the data in the floating zone will be arranged in the target document (see Target Template section above). The target template 918 can also include options as to the format of floating zone information in the target document.

In one example, the target template 918 includes instructions to place floating zone data, such as text, underneath another text zone that has a variable length. In this example, the floating zone data would be placed underneath the text zone after the length and size of the text zone has been computed and placed in the target document.

In step 3314, the form generator 916 converts the target document to a final format, such as a TIFF file 920. In an embodiment of the present invention, the form generator 916 may also convert the target document into a printer format that is supported by printer 922, such as an EMF or other graphical format. In this case, the form generator 916 converts the target document into a printer format that is supported by printer 922. Then, the form generator 916 sends the TIFF file 920 to the printer 922 for printing. Subsequently, the printer 922 receives the TIFF file 920 and proceeds to print the file. In step 3016, the control flow of FIG. 30 ceases.

FIG. 34 is a representation of a source document 3400 in one embodiment of the present invention. As described above, a source document is any document that is printed from application 104. Specifically, a source document is a document that contains financial or account information that the user 102 desires to access. In FIG. 34, the source document 3400 is an account statement that is printed from a financial management software application, such as QuickBooks.

The source document 3400 is a standard account statement. The source document 3400 shows a sender address 3402 and other informational text 3404. The source document 3400 also shows a table including a statement of customer account activities. The table includes a date column 3406 for showing the date of each transaction, an invoice column 3408 for showing the invoice number of each transaction and an amount column 3410 for showing the amount the customer is being charged for each transaction. Lastly, the source document 3400 shows a total row 3412 for showing the total for column 3110.

Note that the length of the table comprised by columns 3406, 3408 and 3410 is variable in length as it depends on the amount of information in those columns. That is, if there are only a few rows of information in the columns 3406, 3408 and 3410, then the table is relatively small in length. Likewise, if there are many rows of information in the columns 3406, 3408 and 3410, then the table is relatively long in length.

FIG. 34 also shows a text zone 3414 representing a floating zone. In FIG. 34, the zone 3414 is aligned with the table of columns 3406, 3408 and 3410 and the zone 3414 is placed a certain distance below the table. However, recall that the table is variable in length as it depends on the amount of information in those columns. Therefore, the text zone 3414 is a floating zone as the location of its placement is dependant on another object—namely, the length of a table above it. In this example, the target template would specify that the floating text zone 3414 is placed a certain distance below the table, whatever the length of the table may be.

XIV. Variable Print Alignment

As explained above, the alignment of information on a printed page can vary with each printer, even if each printer is the same model. Many factors affect the alignment of printed data on a printed page including: the specific printer on which the data is printed, the printer driver used for the printer, the printer drum used in the printer, the direction of the feed of the printer paper and the rotation of the printer paper fed into the printer.

Conventional print alignment procedures allow for the data on a printed page to be moved around the page. For example, if the printed data is too near the top of the page and is cut off during printing, print alignment procedures allow for all of the data to be moved down in small increments until the cut off problem is solved. Conventional print alignment procedures may also allow for shrinking of the data on a printed page. For example, if the data on the printed page is cut off on all sides, the print alignment procedures allow for the shrinking of all of the printed data in small increments until the cut off problem is solved.

Conventional print alignment procedures, however, are not adequate for instances where postal documents are printed. This is because postal documents have very precise requirements as to the location of certain information on the document. For example, U.S. Postal Service requires that the Facing Identification Mark (FIM—a symbol on envelopes used for facilitating the sorting and routing of mail) is located in a precise location near the upper edge of an envelope. In light of these strict postal requirements, the conventional print alignment procedures are inadequate because these procedures involve the movement or shrinkage of all data that is printed. This is disadvantageous because an attempt to remedy the cut-off of one piece of printed data can result in the movement of all other pieces of data on the printed document. This is also disadvantageous because it does not allow for the movement of individual pieces of data, but rather requires the movement or shrinkage of all pieces of data on the printed document.

The present invention describes a system for creating a target document from source information using a target template 918. The target template 918 defines the locations of target data in the target document. Target data is arranged in zones (see the section titled Target Template above for a more detailed description of zones). In one embodiment of the present invention, the zones in the target document may be moved individually without affecting the location or position of any other zones. This solves the problem discussed above wherein the movement of one zone results in the movement of all other zones.

The process of allowing the zones in the target document to be moved individually may be performed during the generation of the target document by the form generator 916 (see FIG. 32 as a reference). Form generator 916 receives interim file 914 and proceeds to populate the target template 918 using the content contained in interim file 914. The target template 918 defines the manner and format in which the content is entered into the specified target zones of the target template 918, as described in FIG. 6 above.

In an embodiment of the present invention, the form generator 916 receives information regarding print alignment. This step may be accomplished via an interface whereby a user specifies print alignment commands. This step may also be accomplished automatically whereby the form generator 916 identifies print alignment problems and determines an appropriate solution. Next, the form generator 916 adjusts the location of individual zones in the target document according to the print alignment information received by the form generator 916.

Figure 35:
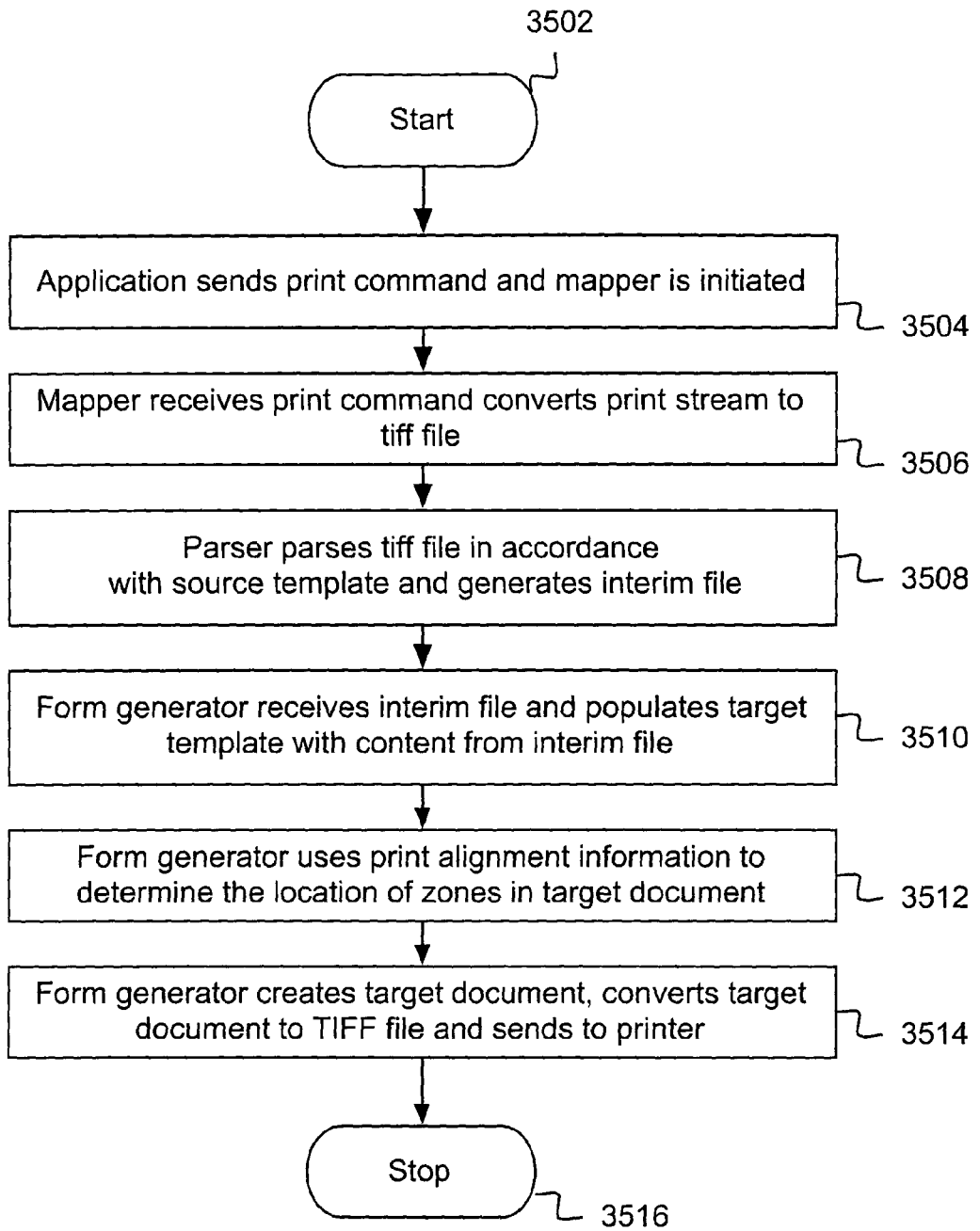
FIG. 35 is a flowchart depicting the operation and control flow of the variable print alignment process of one embodiment of the present invention.

FIG. 35 is a flowchart depicting the operation and control flow of the variable print alignment process of one embodiment of the present invention. FIG. 35 provides additional detail of the process represented by step 214 of FIG. 2. The control flow of FIG. 35 begins with step 3502 and flows directly to step 3504. In step 3504, the application 902 sends a print command and a print stream 904 is transmitted. Subsequently, the mapper 106 is initiated. In step 3506 the parser 910 of mapper 106 receives the print stream 904 and the parser 910 converts the format of the print stream 904 to a TIFF file format before parsing.

In step 3508, the parser 910 of mapper 106 parses the print stream 904 in accordance with a predefined source template 912. The output of step 3508 is an interim file 914 that contains all content (image, text, and more) extracted from the source document.

In step 3510, the form generator 916 receives interim file 914. The form generator 916 determines from the interim file 914 the target template 918 to use in generating a target document. The form generator 916 of mapper 106 produces a target document by populating the target zones of target template 918 using the content in interim file 914, as specified by the target template 918.

In step 3512, the form generator 916 uses print alignment information to determine the location of zones in the target document. As explained above, the form generator 916 receives information regarding print alignment. This step may be accomplished automatically or via an interface whereby a user specifies print alignment commands. In this step, the location or position of individual zones are modified in accordance with the received print alignment information. It should be noted that the location or position of individual zones are modified without affecting the location or position of other zones.

In step 3514, the form generator 916 converts the target document to a final format, such as a TIFF file 920. In an embodiment of the present invention, the form generator 916 may also convert the target document into a printer format that is supported by printer 922, such as an EMF or other graphical format. Then, the form generator 916 sends the TIFF file 920 to the printer 922 for printing. Subsequently, the printer 922 receives the TIFF file 920 and proceeds to print the file. In step 3516, the control flow of FIG. 35 ceases.

As explained above, when large amounts of postal documents having varying postage requirements are printed in one print job, the printed documents are placed in the exit tray of the printer in one heap. This results in an individual having to manually sort out the documents in order to separate them so that the proper postage can be applied. The present invention provides a system for automatically collating printed postal documents having different postal documents.

During the process of in-taking a source document, (described in step 3008 of FIG. 30), the parser 910 of mapper 106 parses the print stream 904 in accordance with a predefined source template 912. In this step, the parser 910 performs Optical Character Recognition (OCR) procedures on Text Zones of the source document as defined by the source template 912. Alternatively, the parser 910 extracts text from Text Zones of the source document in EMF format, as defined by the source template 912. In this step, the parser 910 is programmed to recognize postal forms requiring varying postage, such as domestic and international. This information is then used during printing to collate postal documents requiring varying postage requirements.

Figure 36:
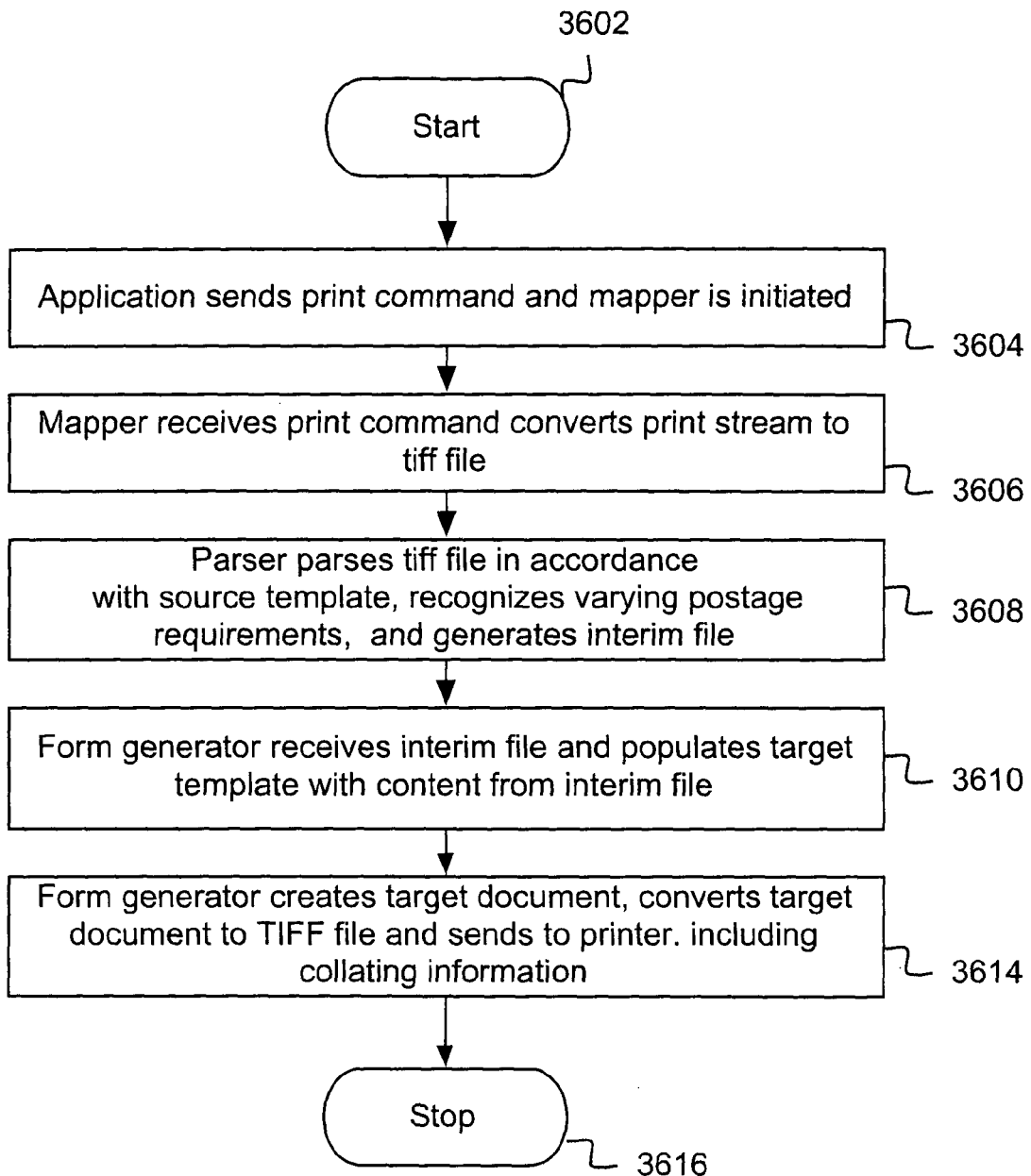
FIG. 36 is a flowchart depicting the operation and control flow of the document collation process of one embodiment of the present invention.

FIG. 36 is a flowchart depicting the operation and control flow of the document collation process of one embodiment of the present invention. FIG. 36 provides additional detail of the process represented by step 214 of FIG. 2. The control flow of FIG. 36 begins with step 3602 and flows directly to step 3604. In step 3604, the application 902 sends a print command and a print stream 904 is transmitted. Subsequently, the mapper 106 is initiated. In step 3606 the parser 910 of mapper 106 receives the print stream 904 and the parser 910 converts the format of the print stream 904 to a TIFF file format before parsing.

In step 3608, the parser 910 of mapper 106 parses the print stream 904 in accordance with a predefined source template 912. In this step, the parser 910 performs OCR procedures on Text Zones of the source document as defined by the source template 912. In this step, the parser 910 is programmed to recognize postal forms requiring varying postage, such as domestic and international. This information is then used during printing to collate postal documents requiring varying postage requirements. Consequently, the output of step 3308 is an interim file 914 that contains all content (image, text, and more) extracted from the source document.

In step 3610, the form generator 916 receives interim file 914. The form generator 916 determines from the interim file 914 the target template 918 to use in generating a target document. The form generator 916 of mapper 106 produces a target document by populating the target zones of target template 918 using the content in interim file 914, as specified by the target template 918.

In step 3614, the form generator 916 converts the target document to a final format, such as a TIFF file 920. In an embodiment of the present invention, the form generator 916 may also convert the target document into a printer format that is supported by printer 922, such as an EMF or other graphical format. In this case, the form generator 916 converts the target document into a printer format that is supported by printer 922. Then, the form generator 916 sends the TIFF file 920 to the printer 922 for printing. Subsequently, the printer 922 receives the TIFF file 920 and proceeds to print the file.

Additionally, in step 3614, the form generator 916 sends collation data to the printer 922. The collation data is garnered in step 3608 wherein postage data of the source document is recognized. Collation data may comprise a command for sending a target document to certain exit tray on the printer 922. For example, all domestic postage documents are sent to a first exit tray of the printer 922 while all international postage documents are sent to a second exit tray of the printer 922. Alternatively, the collation data may comprise a command indicating a location in the print queue of printer 922 for the current document. For example, all domestic postage documents are sent to the top of the printer queue of printer 922 while all international postage documents are sent to the bottom of the printer queue of the printer 922. Thus, the printer 922 prints all domestic postage documents first and all international postage documents last.

In step 3616, the control flow of FIG. 36 ceases.

XV. Exemplary Implementations

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 13:
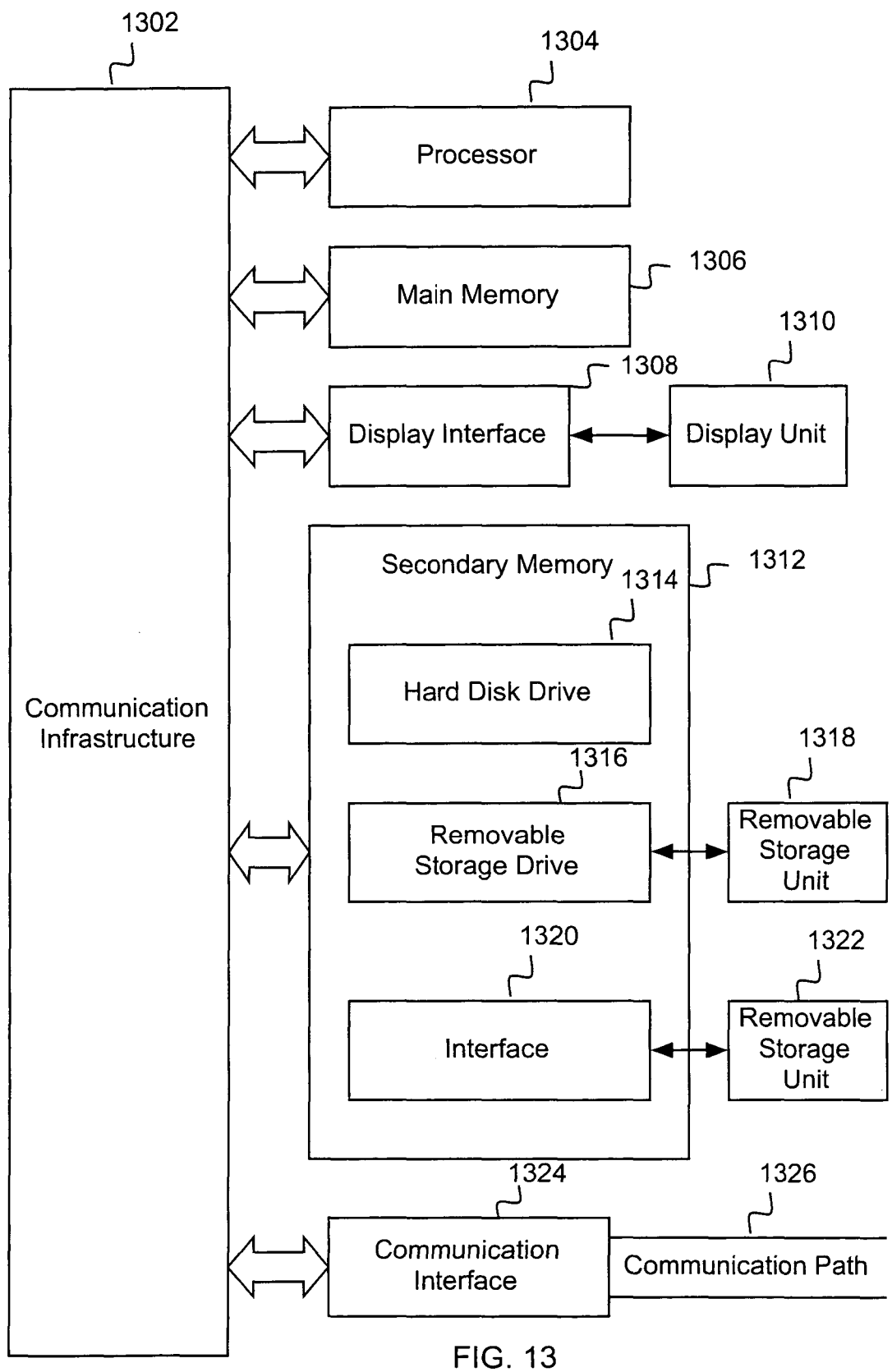
FIG. 13 is a block diagram of a computer system useful for implementing the present invention.

FIG. 13 is a block diagram of a computer system useful for implementing an embodiment of the present invention. The computer system includes one or more processors, such as processor 1304. The processor 1304 is connected to a communication infrastructure 1302 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 1308 that forwards graphics, text, and other data from the communication infrastructure 1302 (or from a frame buffer not shown) for display on the display unit 1310. The computer system also includes a main memory 1306, preferably random access memory (RAM), and may also include a secondary memory 1312. The secondary memory 1312 may include, for example, a hard disk drive 1314 and/or a removable storage drive 1316, representing a floppy disk drive, a magnetic tape drive, an optical disk drive, and more The removable storage drive 1316 reads from and/or writes to a removable storage unit 1318 in a manner well known to those having ordinary skill in the art. Removable storage unit 1318, represents a floppy disk, magnetic tape, optical disk, and more which is read by and written to by removable storage drive 1316. As will be appreciated, the removable storage unit 1318 includes a computer usable storage medium having stored therein computer software and/or data.

In alternative embodiments, the secondary memory 1312 may include other similar means for allowing computer programs or other instructions to be loaded into the computer system. Such means may include, for example, a removable storage unit 1322 and an interface 1320. Examples of such may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to the computer system.

The computer system may also include a communications interface 1324. Communications interface 1324 allows software and data to be transferred between the computer system and external devices. Examples of communications interface 1324 may include a modem, a network interface (such as an Ethernet card), a communications port, a PCMCIA slot and card, and more Software and data transferred via communications interface 1324 are in the form of signals which may be, for example, electronic, electromagnetic, optical, or other signals capable of being received by communications interface 1324. These signals are provided to communications interface 1324 via a communications path (i.e., channel) 1326. This channel 1326 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1306 and secondary memory 1312, removable storage drive 1316, a hard disk installed in hard disk drive 1314, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 1306 and/or secondary memory 1312. Computer programs may also be received via communications interface 1324. Such computer programs, when executed, enable the computer system to perform the features of the present invention as discussed herein. In particular, the computer programs, when executed, enable the processor 1304 to perform the features of the computer system. Accordingly, such computer programs represent controllers of the computer system.

XVI. Conclusion

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for setting font pitch during a print process, the method comprising:
   using a computer which is programmed to perform the following:
   displaying on a graphical user interface a target template for receiving information being parsed from a spool file generated in response to a print command being issued by an application, wherein in the target template is an image of a consumable business form with a plurality of target zones for printing at least a portion of the information from the spool file thereon;
   graphically indicating on the graphical user interface at least one of the plurality of target zones in the target template for receiving the portion of the information from the spool file thereinto;
   generating an output file based on the spool file that has been generated, the output file comprising a set of information extracted from the spool file based on a set of source zones within the spool file as defined by a source template, the set of information comprises a set of characters;
   modifying the set of information within the output file to conform to the target template by including the plurality of target zones within the output file to form an image to print onto a consumable business form;
   determining whether each character in the set of characters in the output file is a numeric type or non-numeric type;
   setting, in the output file within the plurality of target zones in to print onto the consumable business form, a font pitch of each character based on the plurality of target zones to:
      a fixed pitch font in response to the character being the numeric type, thereby aligning the characters within at least one column of the output file; or
      a variable pitch font in response to the character being the non-numeric type; and sending the output file to an output destination.

2. The method of claim 1, further comprising:
   identifying a floating line in at least one column of the output file, wherein the floating line is not at a constant position in the output file and a location of the floating line is a final row in the at least one column with the location of the final row is dependent on an amount of information that defines a length of the column; and
   wherein setting the variable pitch font of characters in the output file includes setting a location of the characters of the floating line so as to be aligned underneath the at least one column of the output file.

3. The method of claim 1, wherein determining the type of each character further comprises:
   determining whether each character in the set of characters is a currency character.

4. The method of claim 3, wherein setting the font further comprises:
setting a font pitch of the currency character including characters immediately following the currency character in the set of characters to be fixed font pitch and setting the font pitch of alphabetic characters to be variable font pitch.

5. The method of claim 1, further comprising:
identifying at least one of the target zones in the plurality of target zones as floating zone where a location of the floating zone in the output file is variably dependent on at least one other target zone in the target template; and
wherein setting the font pitch of characters in the the set of characters includes setting a location of the characters of the floating zone based upon at least one of i) a size of the at least one other target zone in the target template and ii) a location of the at least one other target zone in the template.

6. The method of claim 2, wherein the sending the output file to an output includes at least one of:
a printer;
a hard disk;
a floppy disk; and
a network.

7. The method of claim 1, wherein determining the type of each character further comprises:
determining whether each character in the output file is a numeric -type used to denote currency and/or a number of items and a non-numeric type used to denote all else.

8. The method of claim 1, wherein sending the output file to an output destination comprises a printer.

9. The method of claim 5, wherein the sending the output file to an output destination comprise at least one of:
a printer;
a hard disk;
a floppy disk; and
a network.

10. A non-transitory computer readable medium including computer instructions for setting font pitch during a print process, the computer instructions including instructions for:
displaying on a graphical user interface a target template for receiving information being parsed from a spool file generated in response to a print command being issued by an application, wherein in the target template is an image of a consumable business form with a plurality of target zones for printing at least a portion of the information from the spool file thereon;
graphically indicating on the graphical user interface at least one of the plurality of target zones in the target template for receiving the portion of the information from the spool file thereinto;
generating an output file based on the spool file that has been generated, the output file comprising a set of information extracted from the spool file based on a set of source zones within the spool file as defined by a source template, the set of information comprises a set of characters;
modifying the set of information within the output file to conform to the target template by including the plurality of target zones within the output file to form an image to print onto a consumable business form;
determining whether each character in the set of characters in the output file is a numeric type or non-numeric type;
setting, in the output file within the plurality of target zones in to print onto the consumable business form, a font pitch of each character based on the plurality of target zones to:
a fixed pitch font in response to the character being the numeric type, thereby aligning the characters within at least one column of the output file; or
a variable font pitch in response to the character being the non-numeric type; and sending the output file to an output destination.

11. The non-transitory computer readable medium of claim 10, further comprising:
identifying a floating line in at least one column of the output file, wherein the floating line is not at a constant position in the output file and a location of the floating line is a final row in the at least one column with the location of the final row is dependent on an amount of information that defines a length of the column; and
wherein setting the variable pitch font of characters in the output file includes setting a location of the characters of the floating line so as to be aligned underneath the at least one column of the output file.

12. The non-transitory computer readable medium of claim 10, wherein the instructions for modifying further comprise:
identifying at least one of the target zones in the plurality of target zones as floating zone where a location of the floating zone in the output file is variably dependent on at least one other target zone in the target template; and
wherein setting the font pitch of characters in the the set of characters includes setting a location of the characters of the floating zone based upon at least one of i) a size of the at least one other target zone in the target template and ii) a location of the at least one other target zone in the target template.

13. The non-transitory computer readable medium of claim 10, wherein the instructions for determining further comprise:
determining whether each character in the set of characters is a currency character.

14. The non-transitory computer readable medium of claim 13, wherein the instructions for setting further comprises:
setting a font pitch of the currency character including characters immediately following the currency character in the the set of characters to be fixed font pitch and setting a font pitch of alphabetic characters to be variable font pitch.

15. A computer system for setting font pitch during a print process, comprising:
a graphical user interface for displaying a target template for receiving information being parsed from a spool file generated in response to a print command being issued by an application, wherein in the target template is an image of a consumable business form with a plurality of target zones for printing at least a portion of the information from the spool file thereon;
means for graphically indicating on the graphical user interface at least one of the plurality of target zones in the target template for receiving the portion of the information from the spool file thereinto;
an output file generated based on the spool file that has been generated, the output file comprising a set of information extracted from the spool file based on a set of source zones within the spool file as defined by a source template, the set of information comprises a set of characters;
a processor for
modifying the set of information within the output file to conform to the target template by including the plurality of target zones within the output file to form an image to print onto a consumable business form;

determining whether each character in the set of characters in the output file is a numeric type or non-numeric type;

setting, in the output file within the plurality target zones to print onto the consumable business form, a font pitch of each character to based on the plurality of target zones:

a fixed pitch font in response to the character being the numeric type, thereby aligning the characters within at least one column of the output file; or a variable pitch font in response to the character being the non-numeric type; and sending the output file to an output destination.

16. The computer system of claim 15, wherein the processor determines whether each character in the set of characters is a currency character.

17. The computer system of claim 16, wherein the processor sets a font pitch of the currency character including characters immediately following the currency character in the in the set of characters to be fixed font pitch and setting a font pitch of alphabetic characters to be variable font pitch.

18. The computer system of claim 15, wherein the processor further comprises:

means for identifying a floating line in at least one column of the output file, wherein the floating line is not at a constant position in the output file and a location of the floating line is a final row in the at least one column with the location of the final row is dependent on an amount of information that defines a length of the column; and wherein setting the variable pitch font of characters in the output file includes setting a location of the characters of the floating line so as to be aligned underneath the at least one column of the output file.

19. The computer system of claim 15, wherein the processor further comprises:

means for identifying at least one of the target zones in the plurality of target zones as floating zone where a location of the floating zone in the output file is variably dependent on at least one other target zone in the target template; and wherein setting the font pitch of characters in the the set of characters includes setting a location of the characters of the floating zone based upon at least one of i) a size of the at least one other target zone in the target template and ii) a location of the at least one other target zone in the target template.

* * * * *

UNITED STATES PATENT AND TRADEMARK OFFICE
CERTIFICATE OF CORRECTION

PATENT NO.        : 7,936,476 B2
APPLICATION NO.   : 10/392240
DATED             : May 3, 2011
INVENTOR(S)       : Kofman et al.

It is certified that error appears in the above-identified patent and that said Letters Patent is hereby corrected as shown below:

Col. 43, line 13, please delete "the" after "in";
Col. 43, line 32, please delete "the" after "wherein"

Col. 44, line 26, please delete "the" after "in"
Col. 44, line 41, please delete "the" after "in"

Col. 45, line 6, please delete "to" after "character"
Col. 45, line 18, please delete "in the" after "character"

Signed and Sealed this
Twenty-first Day of June, 2011

David J. Kappos
*Director of the United States Patent and Trademark Office*